US010857942B2

(12) United States Patent
Oba

(10) Patent No.: US 10,857,942 B2
(45) Date of Patent: Dec. 8, 2020

(54) IMAGE GENERATING DEVICE, IMAGE GENERATING METHOD, AND PROGRAM

(71) Applicant: Sony Corporation, Tokyo (JP)

(72) Inventor: Eiji Oba, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/315,273

(22) PCT Filed: Jun. 29, 2017

(86) PCT No.: PCT/JP2017/023918
§ 371 (c)(1),
(2) Date: Jan. 4, 2019

(87) PCT Pub. No.: WO2018/012299
PCT Pub. Date: Jan. 18, 2018

(65) Prior Publication Data
US 2019/0248288 A1 Aug. 15, 2019

(30) Foreign Application Priority Data
Jul. 13, 2016 (JP) ................................ 2016-138364

(51) Int. Cl.
*G06T 3/00* (2006.01)
*B60R 1/00* (2006.01)
(Continued)

(52) U.S. Cl.
CPC ................. *B60R 1/00* (2013.01); *G06T 3/00* (2013.01); *G06T 3/0006* (2013.01); *G06T 5/50* (2013.01);
(Continued)

(58) Field of Classification Search
CPC .............. B60R 1/00; B60R 2300/8093; B60R 2300/303; B60R 2300/105; G06T 3/0006; G06T 3/00
See application file for complete search history.

(56) References Cited

U.S. PATENT DOCUMENTS 8,018,490 B2 * 9/2011 Yuasa ....................... B60R 1/00
348/148
8,058,980 B2 * 11/2011 Yanagi ...................... B60R 1/00
340/435

(Continued)

FOREIGN PATENT DOCUMENTS

CN 1461561 A 12/2003
CN 101396989 A 4/2009
(Continued)

OTHER PUBLICATIONS

Extended European Search Report dated Jun. 7, 2019 in connection with European Application No. 17827429.6.
(Continued)

*Primary Examiner* — Rowina J Cattungal
(74) *Attorney, Agent, or Firm* — Wolf, Greenfield & Sacks, P.C.

(57) ABSTRACT

The present technology relates to an image generating device, an image generating method, and a program which are capable of calling attention of a user quickly. An integrating unit integrates a first image and a second image and generates an integrated image. A superimposition executing unit causes an alert mark to be superimposed on the integrated image and generates a superimposed image in a case in which an object shown in the second image is positioned on a farther side than an object shown in the first image. The present technology can be applied to, for example, a Camera Monitor System (CMS) which provides,
(Continued)

for example, an image corresponding to an image observed by a side mirror or a rearview mirror or the like.

19 Claims, 44 Drawing Sheets

(51) Int. Cl.
*H04N 7/18* (2006.01)
*G06T 5/50* (2006.01)
*G06T 11/00* (2006.01)

(52) U.S. Cl.
CPC ............... *G06T 11/00* (2013.01); *H04N 7/18* (2013.01); *B60R 2300/105* (2013.01); *B60R 2300/202* (2013.01); *B60R 2300/303* (2013.01); *B60R 2300/60* (2013.01); *B60R 2300/8026* (2013.01); *B60R 2300/8093* (2013.01)

(56) References Cited

U.S. PATENT DOCUMENTS

| | | | | |
|---|---|---|---|---|
| 2002/0175999 | A1* | 11/2002 | Mutobe | H04N 7/18 348/148 |
| 2007/0165108 | A1* | 7/2007 | Yuasa | B60R 1/00 348/148 |
| 2008/0044061 | A1* | 2/2008 | Hongo | B60R 1/00 382/104 |
| 2009/0079553 | A1* | 3/2009 | Yanagi | B60R 1/00 340/435 |
| 2014/0055616 | A1* | 2/2014 | Corcoran | H04N 5/247 348/148 |
| 2014/0139676 | A1* | 5/2014 | Wierich | H04N 5/23293 348/148 |
| 2015/0103172 | A1* | 4/2015 | Shimizu | G06T 3/4038 348/148 |
| 2016/0203377 | A1* | 7/2016 | Irie | H04N 7/181 348/118 |
| 2016/0212354 | A1* | 7/2016 | Corcoran | H04N 7/181 |

FOREIGN PATENT DOCUMENTS

| | | |
|---|---|---|
| CN | 104581042 A | 4/2015 |
| JP | 2004-159268 A | 6/2004 |
| JP | 2006-025086 A | 1/2006 |
| JP | 2009-295018 A | 12/2009 |
| JP | 2010-287029 A | 12/2010 |
| JP | 4762698 B2 | 8/2011 |

OTHER PUBLICATIONS

International Search Report and English translation thereof dated Sep. 19, 2017 in connection with International Application No. PCT/JP2017/023918.

International Written Opinion and English translation thereof dated Sep. 19, 2017 in connection with International Application No. PCT/JP2017/023918.

International Preliminary Report on Patentability and English translation thereof dated Jan. 24, 2019 in connection with International Application No. PCT/JP2017/023918.

Chinese Office Action dated May 21, 2020, in connection with Chinese Application No. 201780041799.0, and English translation thereof.

* cited by examiner

| Display method of rear image and L/R side images in CMS | Individual display (first display method) | Integrated display | |
|---|---|---|---|
| | | Perform synthesis so that priority is given to L/R side images after affine transform (second display method) | |
| | | Perform layer synthesis on standing object after affine transform (fourth display method) | Arrange standing object before affine transform at position of standing object after affine transform when standing object is layer-synthesized after affine transform (fourth display method) |

FIG.10

IMAGE GENERATING DEVICE, IMAGE GENERATING METHOD, AND PROGRAM

CROSS-REFERENCE TO RELATED APPLICATIONS

This application is a U.S. National Stage under 35 U.S.C. § 371 of International Application No. PCT/JP2017/023918 filed in the Japan Patent Office on Jun. 29, 2017, which claims priority to Japanese Patent Application No. 2016-138364 filed in the Japan Patent Office on Jul. 13, 2016; the entire contents of each of these applications is incorporated by reference herein.

TECHNICAL FIELD

The present technology relates to an image generating device, an image generating method, and a program, and more particularly, to an image generating device, an image generating method, and a program which are capable of calling, for example, attention of a user quickly.

BACKGROUND ART

For example, a camera monitor system (CMS) that generates an image showing a situation behind a vehicle observed from one virtual viewpoint by combining an image captured by a camera installed in a vehicle rear part with an image obtained by transforming images captured by cameras installed in right and left rearview mirror of a vehicle, displays the generated image, and thereby provides an image with reality in its own vehicle is proposed in Patent Literature 1.

Here, hereinafter, the image provided by the CMS is also referred to as a CMS image.

CITATION LIST

Patent Literature

Patent Literature 1: JP-B-4762698

DISCLOSURE OF INVENTION

Technical Problem

In a case in which the image showing the situation behind the vehicle observed from one virtual viewpoint is generated as the CMS image by combining the image captured by the camera installed in the vehicle rear part with the image obtained by transforming the images captured by the cameras installed in the right and left rearview mirror of the vehicle in its own vehicle, a second vehicle being traveling shown in the images captured by the cameras installed in the right and left rearview mirror of the vehicle may be hidden by a first vehicle being traveling shown in the image captured by the camera1 installed in the vehicle rear part, and it may be difficult for the second vehicle to be recognized.

In this case, a user (driver) driving its own vehicle may be late in discovering that the second vehicle is approaches its own vehicle.

The present technology was made in light of the foregoing and is intended to make it possible to call the attention of the user quickly.

Solution to Problem

An image generating device and a program of the present technology are an image generating device including an integrating unit that integrates a first image and a second image and generates an integrated image and a superimposition executing unit that causes an alert mark to be superimposed on the integrated image and generates a superimposed image in a case in which an object shown in the second image is positioned on a farther side than an object shown in the first image and a program causing a computer to function as the image generating device.

An image generating method of the present technology is an image generating method including integrating a first image and a second image and generates an integrated image and causing an alert mark to be superimposed on the integrated image and generating a superimposed image in a case in which an object shown in the second image is positioned on a farther side than an object shown in the first image.

In the image generating device, the image generating method, and the program of the present technology, the first image and the second image are integrated, and the integrated image is generated. Then, in a case in which the object shown in the second image is positioned on the farther side than the object shown in the first image, the alert mark is superimposed on the integrated image, and the superimposed image is generated.

Note that the image generating device may be an independent device or an internal block constituting one device.

Further, the program may be provided such that it is transmitted via a transmission medium or recorded in a recording medium.

Advantageous Effects of Invention

According to the present technology, it is possible to call the attention of the user quickly.

Note that effects described herein are not necessarily limited, and any of effects described in the present disclosure may be obtained.

BRIEF DESCRIPTION OF DRAWINGS

FIG. 10 is a diagram for describing a display method of displaying a rear image and L/R side images as a CMS image.

MODE(S) FOR CARRYING OUT THE INVENTION

<Overview of CMS Installed in Vehicle>

Figure 1:
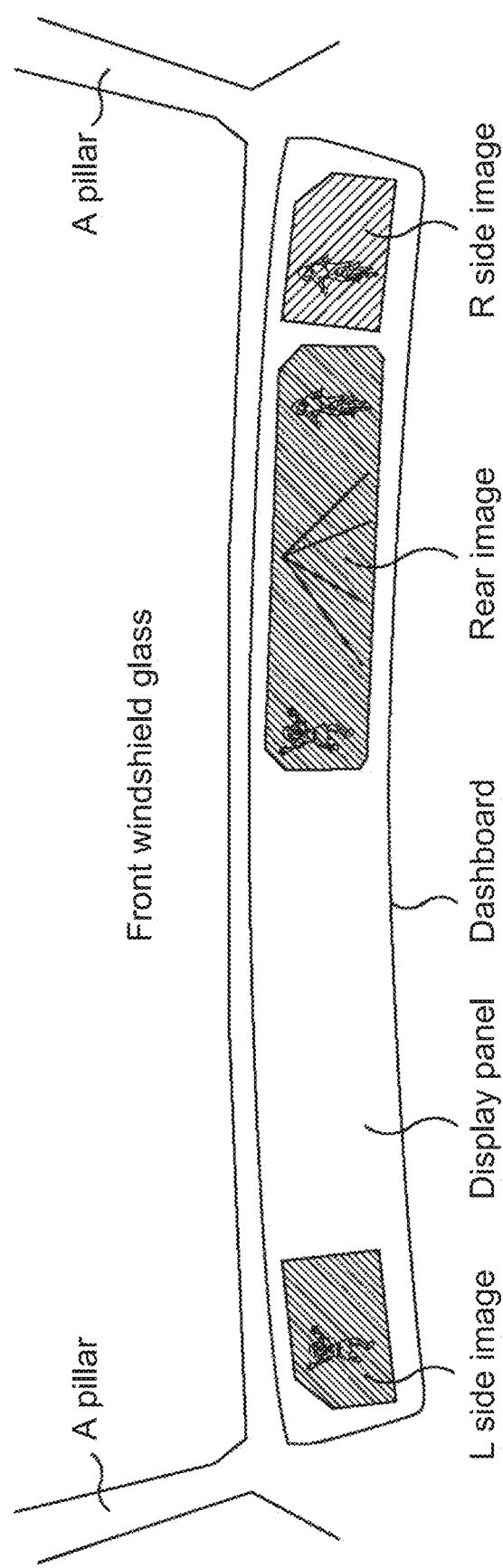
FIG. 1 is a diagram for describing an overview of a CMS installed in an automobile serving as a vehicle.

FIG. 1 is a diagram for describing an overview of a CMS installed in an automobile serving as a vehicle.

In the CMS, a camera is installed in a vehicle, and an image captured by the camera is displayed as an image corresponding to an image which can be viewed using a rearview mirror.

As the rearview mirror, there are a so-called rearview mirror (class I mirror), side mirror (a class II mirror and a class III mirror), and the like.

In the CMS, for example, at least one camera for imaging a rear view of the vehicle is installed in the rear part of the vehicle, and at least two cameras for imaging at least a left rear view and a right rear view of the vehicle are installed at positions at which the side mirrors of the vehicle are installed (hereinafter also referred to as "side mirror positions").

Here, the camera which is installed in the rear part of the vehicle and images the rear view of the vehicle is hereinafter also referred to as a "rear camera." Further, the cameras which are installed at the right and left side mirror positions of the vehicle are also referred to as an "L side camera" and an "R side camera," respectively.

Further, an image captured by the rear camera is also referred to as a "rear image," and images captured by the L side camera and the R side camera are also referred to as an "L side image" and an "R side image," respectively.

Further, the L side camera and the R side camera are referred to collectively as an "L/R side camera." Similarly, the L side image and the R side image are referred to collectively as "L/R side images."

FIG. 1 illustrates a display example of the rear image and the L/R side images.

In FIG. 1, the rear image is an image corresponding to an image (a rearview mirror image) which can be viewed using the rearview mirror, and the L/R side images are images corresponding to images (side mirror images) which can be viewed using the side mirrors.

In FIG. 1, a landscape-oriented display panel is installed on a dashboard below a front windshield glass of the vehicle, and the rear image and the L/R side images are displayed on the display panel.

In other words, in the display panel of FIG. 1, the L side image is displayed in the vicinity of a left A pillar, and the R side image is displayed in the vicinity of a right A pillar. The rear image is displayed on a position on a right side toward a driver seat slightly from a center of the display panel (the driver seat is assumed to be on the right side (toward the front of the vehicle)).

In the CMS, as described above, the rear image, the L side image, and the R side image can be individually displayed as the CMS image to be displayed by the CMS, and the rear image, the L side image, and the R side image can be integrated into one integrated image (of one frame), and the integrated image can be displayed as the CMS image as well.

Here, examples of the integration of a plurality of images include synthesis of performing alpha blending on images with a weight a of a range of 0 or more to 1 or less, combination of forming one image by arranging images side by side, and conversion of converting a plurality of images into one image.

Figure 2:
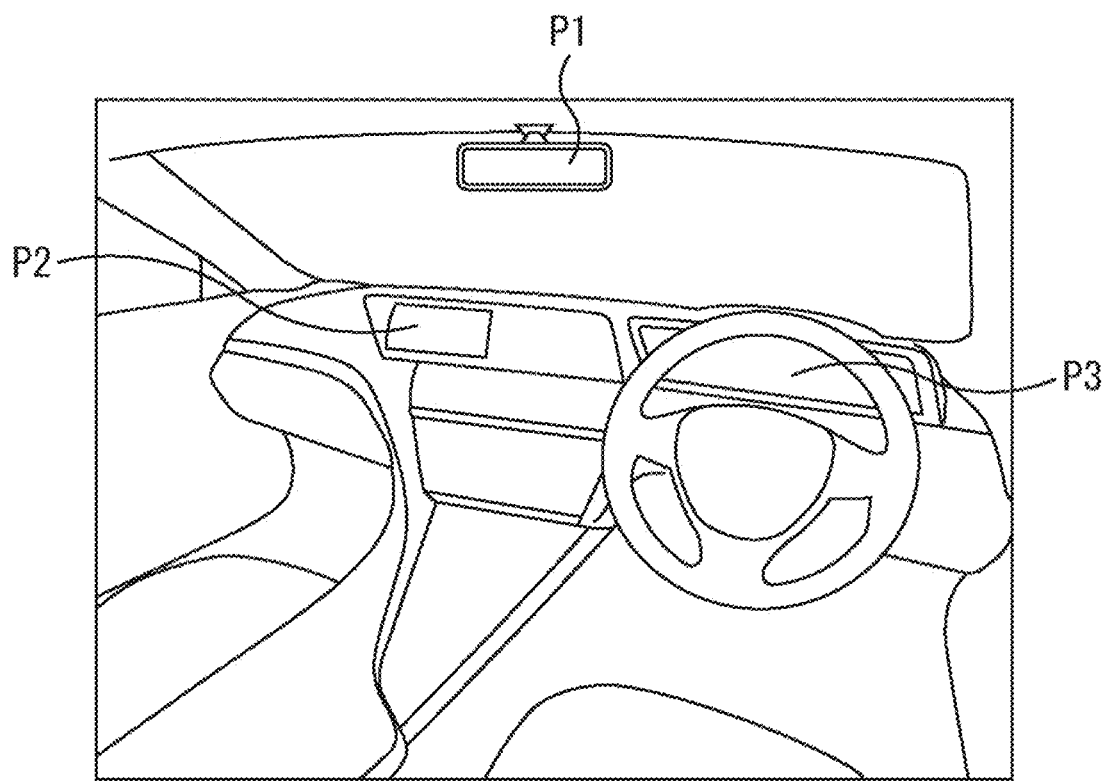
FIG. 2 is a diagram illustrating an example of a display method of an integrated image in which a rear image, an L side image, and an R side image are integrated.

FIG. 2 is a diagram illustrating an example of a display method of an integrated image in which the rear image, the L side image, and the R side image are integrated.

The integrated image can be displayed at a position P1 at which the rearview mirror is installed, a position P2 at the center of the dashboard, a position P3 on the dashboard in front of the driver seat, or the like.

In the CMS, in a case in which a situation around the vehicle is provided to the user (driver) who steers the vehicle by displaying the integrated image serving as the CMS image or the like, it is necessary to display the integrated image so that the driver can accurately understand the situation around the vehicle (hereinafter also referred to as a "peripheral situation").

Further, if the provision of the peripheral situation by the display of the integrated image is performed in addition to provision of various kinds of information by an instrument panel (instrument cluster) in the vehicle, information provided to the driver as an image is increased.

If the information provided to the driver as the image increases, the user suffers from information overload, and it is likely to affect the user's recognition on information, eventually, subsequent situation determination.

Further, in a case in which a lot of information is displayed as an image in the vehicle, it is difficult for the driver to recognize images serving as a lot of information simultaneously.

In this regard, for example, in a case in which the driver is driving the vehicle while paying attention to the front in order to cause the vehicle go straight, for example, luminance of unnecessary information, that is, the integrated image in which the rear view of the vehicle is shown may be reduced. In this case, it is possible to suppress information about the rear view of the vehicle shown in the integrated image falling within a peripheral visual field of the driver (from being recognized by the driver).

In a case in which the driver causes the vehicle to go straight without changing a course, the driver has to pay attention to, particularly, to the front. However, if the integrated image in which a situation behind the vehicle is displayed with high luminance, an arear around the visual field of the driver is continuously illuminated by the display of the integrated image, and thus the driver may pay attention to the integrated image with high luminance, and the driver may be disturbed from giving attention to the front.

In this regard, in a case in which the driver is paying attention to the front in order to cause the vehicle to go straight ahead, it is possible to prevent the display of the integrated image from disturbing the driver from paying attention to the front.

In a vehicle equipped with an optical mirror serving as a rearview mirror, the driver does not unconsciously recognize an image reflected on the rearview mirror with a peripheral visual field but returns the line of sight to the rearview mirror with intention to check the rear and recognize a peripheral situation reflected on the rearview mirror if necessary.

On the other hand, in a vehicle equipped with a CMS, even when the luminance of the integrated image is reduced in order to prevent the driver from being disturbed from paying attention to the front, the driver can turn the line of sight to the integrated image and recognize a peripheral situation shown in the integrated image.

In other words, in the vehicle equipped with the CMS, even when the luminance of the integrated image is reduced, the driver can recognize the peripheral situation through a (recognition) procedure similar to that of the vehicle equipped with the rearview mirror.

As can be understood from the above, it is desirable to adjust the luminance and display the CMS image such as the integrated image. Further, there are cases in which it is desirable to adjust the contrast and display the CMS image from a viewpoint of visibility or the like. Further, it is possible to adjust the luminance or the contrast of the CMS image depending on a state of the driver. For example, the luminance or the contrast of the CMS image may be reduced when the driver is not looking at the CMS image, whereas when the luminance or the contrast of the CMS image may be increased when the driver is looking at the CMS image.

By the way, in the vehicle, in addition to the rear camera and the L/R side camera, cameras for imaging a peripheral situation can be installed at various positions of the vehicle.

In the CMS, all the images captured by the respective cameras installed in the vehicle can be displayed individually or as the CMS image in the form of an integrated image, but it is desirable that an image to be displayed as the CMS image can be appropriately selectively switched.

Here, examples of the main use of the rearview mirror when its own vehicle travels at a high speed (a certain degree of speed) include checking a relative relation between its own vehicle and another vehicle behind it and checking a rear situation on a course change destination side when its own vehicle changes the course.

Further, for example, when its own vehicle travels in an urban area or the like at a low to medium speed, it is desirable to cause the driver to be able to understand a situation beside its own vehicle (in a right-left direction) from a relatively close position to a far side.

Further, for example, in a case in which its own vehicle starts from a parked state and travels at a low speed (slowly), in a case in which its own vehicles travels at a low speed to be parked, or in a case in which an its own vehicle leaves from a narrow road and travels at a low speed in order to take a left turn or a right turn on a T-shaped road, it is desirable to cause the driver to be able to understand a situation just behind its own vehicle (for example, near a bumper of the vehicle rear part or the like) or a situation just beside the rear part of the vehicle (for example, near the rear wheel of the vehicle or the like).

Hereinafter, for example, each of a case in which the vehicle travels at a high speed, a case in which the vehicle travels in an urban area or the like at a low to medium speed, and a case in which the vehicle travels at a low speed (slowing) for parking or the like will be taken as an example, and an example of a CMS images appropriate to be displayed in each case will be described below.

<CMS Image Displayed in a Case in which Vehicle Travels at High Speed>

Figure 3:
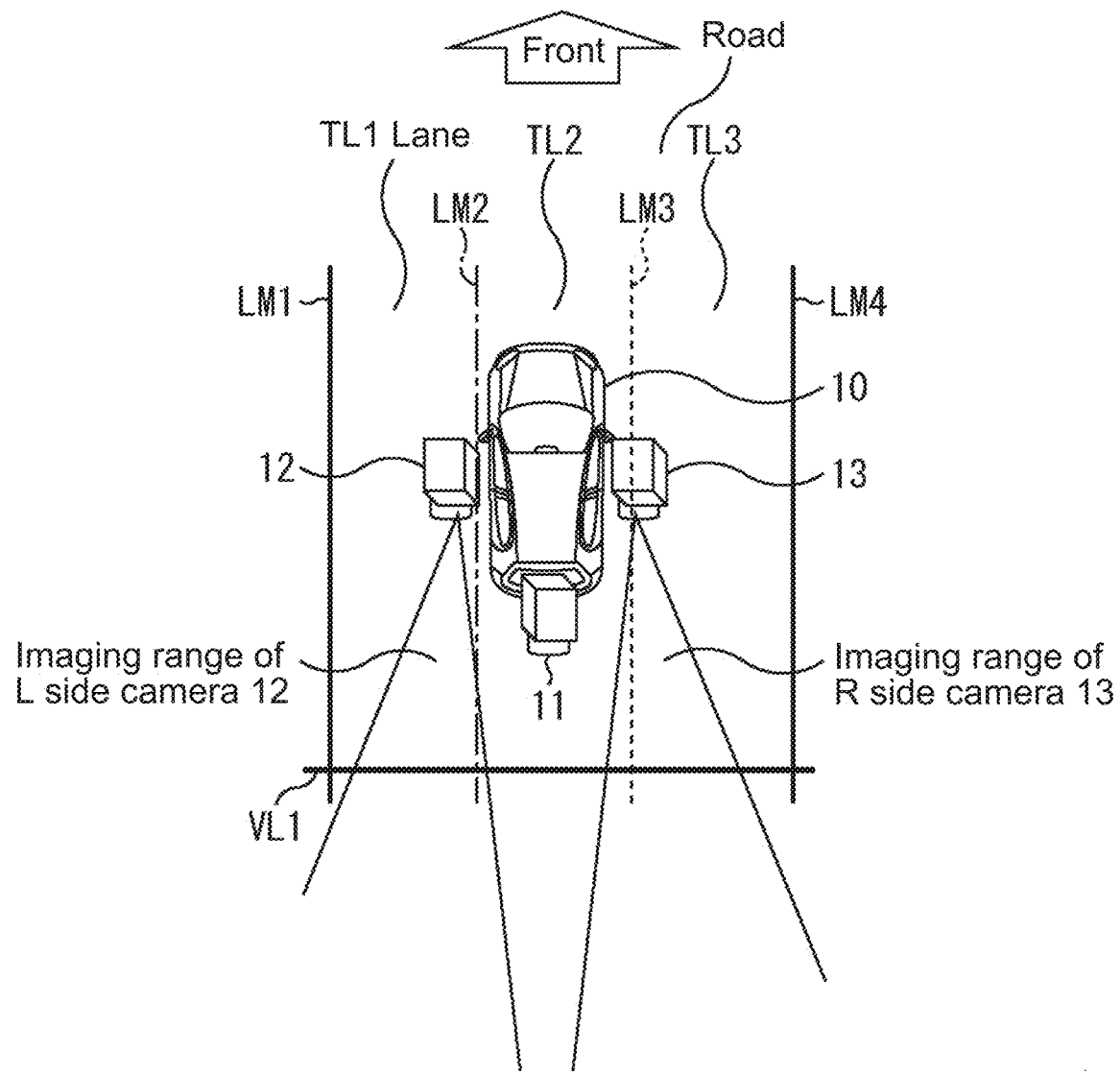
FIG. 3 is a plane view illustrating an example of an installation position at which cameras for capturing an image serving as a CMS image displayed in a case in which a vehicle travels at a high speed are installed in a vehicle.

FIG. 3 is a plane view illustrating an example of an installation position at which cameras for capturing an image serving as a CMS image displayed in a case in which the vehicle travels at a high speed (hereinafter also referred to as a "high speed CMS image") are installed in the vehicle.

In FIG. 3, for example, in a (its own) vehicle 10 which is an automobile or the like, a rear camera 11 is installed in a rear part of the vehicle 10, and an L side camera 12 and an R side camera 13 are installed at right and left side mirror positions of the vehicle 10, respectively.

Here, the side mirror position can be regarded as a position shifted from a position at which the rear camera 11 is installed (the position of the rear part of the vehicle 10) in a traverse direction with respect to a horizontal direction (a right-left direction relative to the front of the vehicle 10).

The rear camera 11 images a view behind (just behind) the vehicle 10 and outputs a rear image as an example of a first image. Note that the rear camera 11 captures, for example, a rear image in which a horizontal angle of view is a relatively wide angle of 150° or more.

The L side camera 12 images a left rear view of the vehicle 10 and outputs an L side image as an example of a second image. The R side camera 13 images a right rear view of the vehicle 10 and outputs an R side image as another example of the second image.

Since the rear camera 11, the L side camera 12, and the R side camera 13 have different installation positions, the rear image, the L side image, and the R side image are images having different viewpoints (images viewed from different viewpoints).

Note that, in this case, in order to simplify the description, the rear camera 11, the L side camera 12, and the R side camera 13 are assumed to capture images of center projection.

Here, in FIG. 3, the vehicle 10 is traveling in a lane TL2 which is a second lane from the left in a three-lane road having lanes TL1, TL2, and TL3.

Further, in FIG. 3, lane marking lines LM1, LM2, LM3, LM4 for distinguishing the lanes are drawn on the road in order from the left.

Here, there are a road center line, a lane boundary line, and a lane edge as compartments for distinguishing the lanes, but they are herein referred to collectively as a "lane marking line."

In FIG. 3, the lane TL1 is a lane between the lane marking lines LM1 and LM2, and the lane TL2 is a lane between the lane marking lines LM2 and LM3. The lane TL3 is a lane between the lane marking line LM3 and LM4.

Further, in FIG. 3, although it is not a compartment line actually drawn on road, in the figure to be described later, in order to facilitate understanding of a correspondence between the rear image and the L/R side images, a virtual line VL1 serving as a compartment line which is virtually drawn on the road is illustrated.

In FIG. 3, the virtual line VL1 is positioned behind the vehicle 10 and is imaged by all of the rear camera 11, the L side camera 12, and the R side camera 13.

Here, in this specification, unless otherwise set forth herein, a direction is considered in a state in which it faces the front of its own vehicle.

Figure 4:
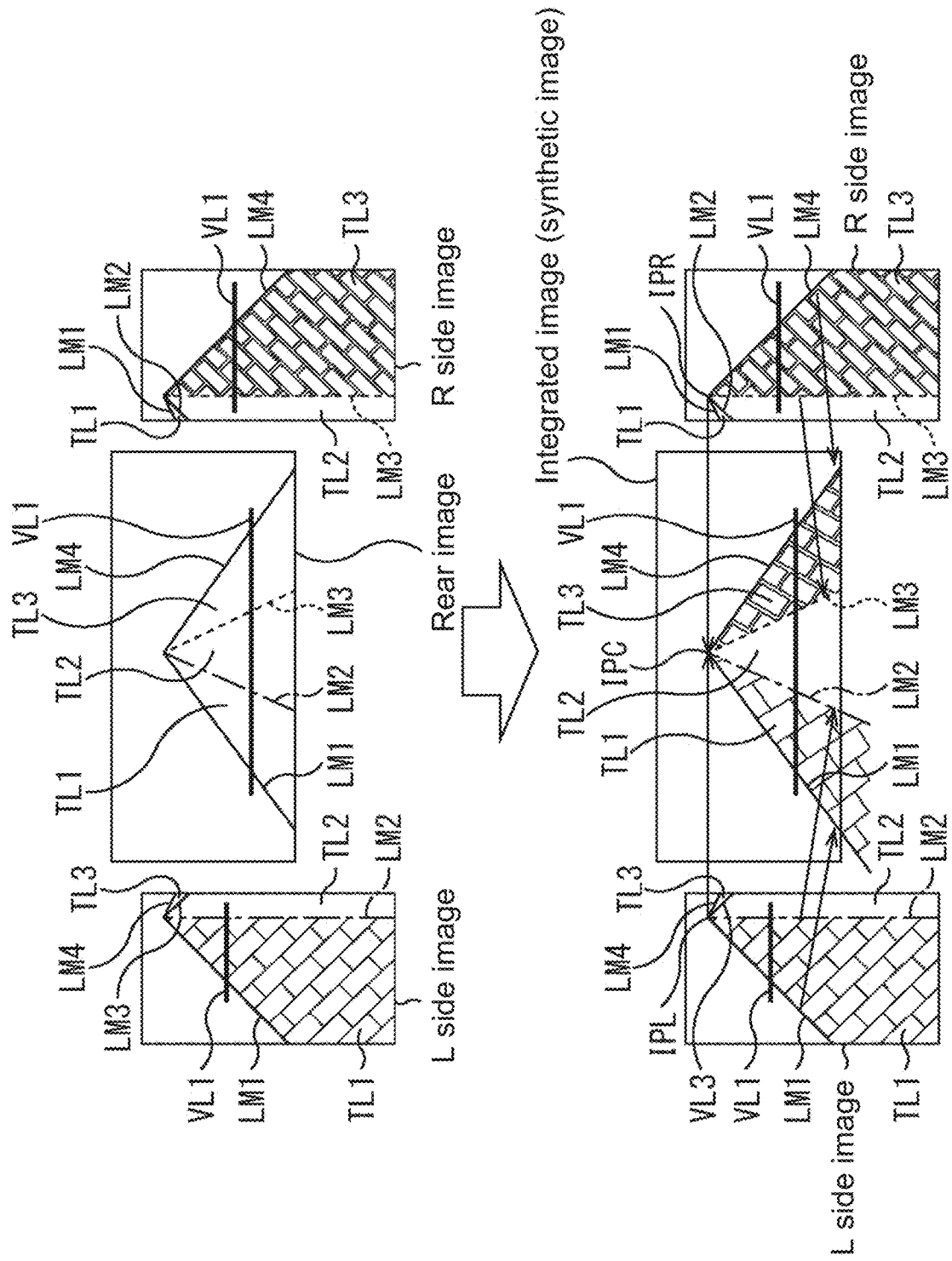
FIG. 4 is a diagram illustrating an example of a rear image, L/R side images, and an integrated image generated by integrating the rear image and the L/R side images.

FIG. 4 is a diagram illustrating an example of the rear image, the L/R side images, and the integrated image generated by integrating the rear image and the L/R side images.

The lane TL1 to TL3 behind vehicle 10, the lane marking lines LM1 to LM4, and the virtual line VL1 are shown in the rear image and the L/R side images of FIG. 4. Note that, for the sake of description, a positional relation of its own vehicle 10 and the road is described in a state in which the lane TL2 is shown in the rear camera 11, the lane TL1 is shown in the L side camera 12, and the lane TL3 is shown in the R side camera 13. Since an actual positional relation of the vehicle and the road is freely decided, the positional relation described in this specification is only based on a virtual positional relation, and each corresponding process need not be necessarily performed while identifying a lane while traveling.

As a method of integrating the rear image and the L/R side images and generating the integrated image, for example, there is a method of performing affine transform on all or some of the rear image and the L/R side images so that sizes of the same subjects shown in the rear image and the L/R side images coincide with each other, and infinite points of the rear image and the L/R side images coincide with each other, performing positioning so that the same subjects shown in the rear image and the L/R side images overlap, and synthesizing the rear image and the L/R side images. Here, in order to synthesize the rear image and the L/R side images consecutively without giving any uncomfortable feeling, it is desirable to performing synthesis using lines along a traveling lane or a vehicle lane of its own vehicle 10, that is, line near the line segment LM2 and the line segment LM3 under the assumption of the above lane positional relation as synthesis boundary lines.

Here, the affine transform can be performed on all of the rear image and the L/R side images or can be performed only on, for example, the L/R side images. For example, in a case in which an integrated image viewed from an arbitrary viewpoint is generated, the affine transform is performed on all of the rear image and the L/R side images so that the infinite points of the rear image and the L/R side images coincide with the infinite point for the viewpoint. Further, for example, in a case in which an integrated image having the installation position of the rear camera 11 as a viewpoint is generated, the affine transform is performed on the L/R side images so that the infinite points of the L/R side images coincide with the infinite point of the rear image.

In the following description, the affine transform is assumed to be performed only on the L/R side images out of the rear image and the L/R side images. Further, the affine transform is assumed to be performed so that a size of a subject shown in each of the L/R side images coincides with a size of the same subject shown in the rear image, and infinite points IPL and IPR of the rear image and the L/R side images coincide with an infinite point IPC of the rear image. According to such an affine transform, the L/R side images are converted into images viewed (captured) from the installation position of the rear camera 11 that captures the rear image, that is, images having the installation position of the rear camera 11 as the viewpoint. With the affine transform, camera focal distances of the L/R side images and the rear image become equal, a display arrangement by a difference in an installation position in a vehicle body traveling direction is corrected, and the L/R side images become images corresponding to images which are captured by cameras which have the same focal distance as the rear image and have the same arrangement position in the traveling direction of the vehicle 10. As the transform is performed, it is possible to cause the virtual line VL1 in the rear image to coincide with the virtual line VL1 in the L/R side images which have undergone the affine transform.

Note that a size to which the size of the subject is changed or a viewpoint of an image into which the subject is converted are not particularly limited by the affine transform.

Further, in the following description, in order to simplify the description, it is assumed that the sizes of the same subjects in the rear image and the L/R side images before the affine transform coincide with each other, and thus the affine transform for the L/R side images is performed so that each of the infinite point IPL of the L side image and the infinite point IPR of the R side image coincide with the infinite point IPC of the rear image.

In the generation of the integrated image, as described above, the L/R side images undergo affine transform, the L/R side images which have undergone the affine transform are aligned with the rear image and synthesized with the rear image, so that the integrated image is generated. In the synthesis of L/R side images and rear image, the synthesis is performed such that the L/R side images are overwritten on the rear image as images displaying a range of the rear of the vehicle which is mainly imaged by each camera.

In the integrated image of FIG. 4, the lane TL1 to TL3, the lane marking lines LM1 to LM4, and the virtual line VL1 shown in the rear image coincide with the lane TL1 to TL3, the lane marking lines LM1 to LM4, and the virtual line VL1 shown in the L/R side images which have undergone the affine transform, respectively.

Figure 5:
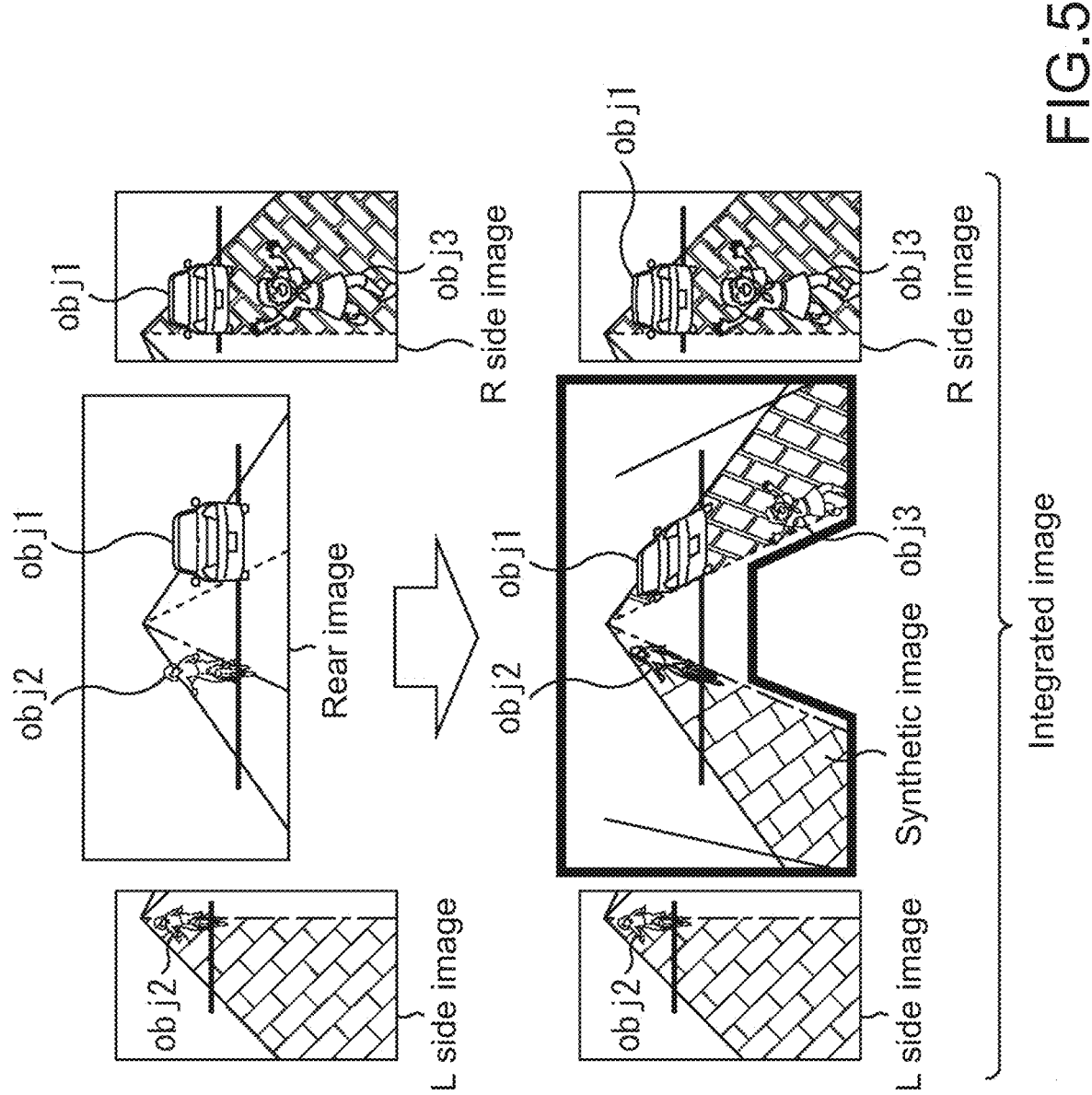
FIG. 5 is a diagram illustrating another example of a rear image, L/R side images, and an integrated image generated by integrating the rear image and the L/R side images.

FIG. 5 is a diagram illustrating another example of the rear image, the L/R side images, and the integrated image generated by integrating the rear image and the L/R side images.

Note that, in the following description, in order to avoid the complication of the drawing, reference numerals TL1 to TL3, LM1 to LM4, and VL1 indicating the lanes TL1 to TL3, the lane marking lines LM1 to LM4, and the virtual line VL1 are not illustrated.

In FIG. 5, an automobile, a motorcycle, and a pedestrian as standing objects obj1, obj2, and obj3 standing on the road are present on the road.

Further, the standing objects obj1 and obj2 are shown in the rear image. Further, the standing object obj2 is shown in the L side image, and the standing objects obj1 and obj3 are shown in the R side image.

In the generation of the integrated image, the affine transform for the L/R side images is performed on the assumption that all the subjects shown in the L/R side images are present within a plane on the road. For this reason, in a case in which another vehicle (an automobile, a motorcycle, or the like) on the road, a pedestrian, or any other standing object standing on the load is shown in the L/R side images which are to undergo the affine transform as the subject, the standing object shown in the L/R side images which have undergone the affine transform is inclined with respect to the road.

In FIG. 5, the standing object obj2 shown in the L side image which has undergone the affine transform and the standing objects obj1 and obj3 shown in the R side image which has undergone the affine transform are inclined.

Here, in the generation of the integrated image, a synthetic image obtained by performing affine transform on the L/R side images, aligning the L/R side images which have undergone the affine transform with the rear image, and combining the L/R side images with the rear image can be used as the integrated image.

Further, in the generation of the integrated image, an image obtained by arranging the L side image and the R side image (L/R side images) before the affine transform side by side on the right and left of the synthetic image and combining them can be used as the integrated image.

As described above, since the standing object shown in the L/R side images which have undergone the affine transform is inclined, the standing object shown in the L/R side images is also inclined in the synthetic image obtained by synthesizing the L/R side images which have undergone the affine transform with the rear image.

In a case in which an integrated image including such a synthetic image, that is, the image obtained by combining the L/R side images before the affine transform on the right and left of the synthetic image is displayed as the CMS image, the driver views the CMS image in which the awkwardly inclined standing object is shown and is likely to have an uncomfortable feeling.

Figure 6:
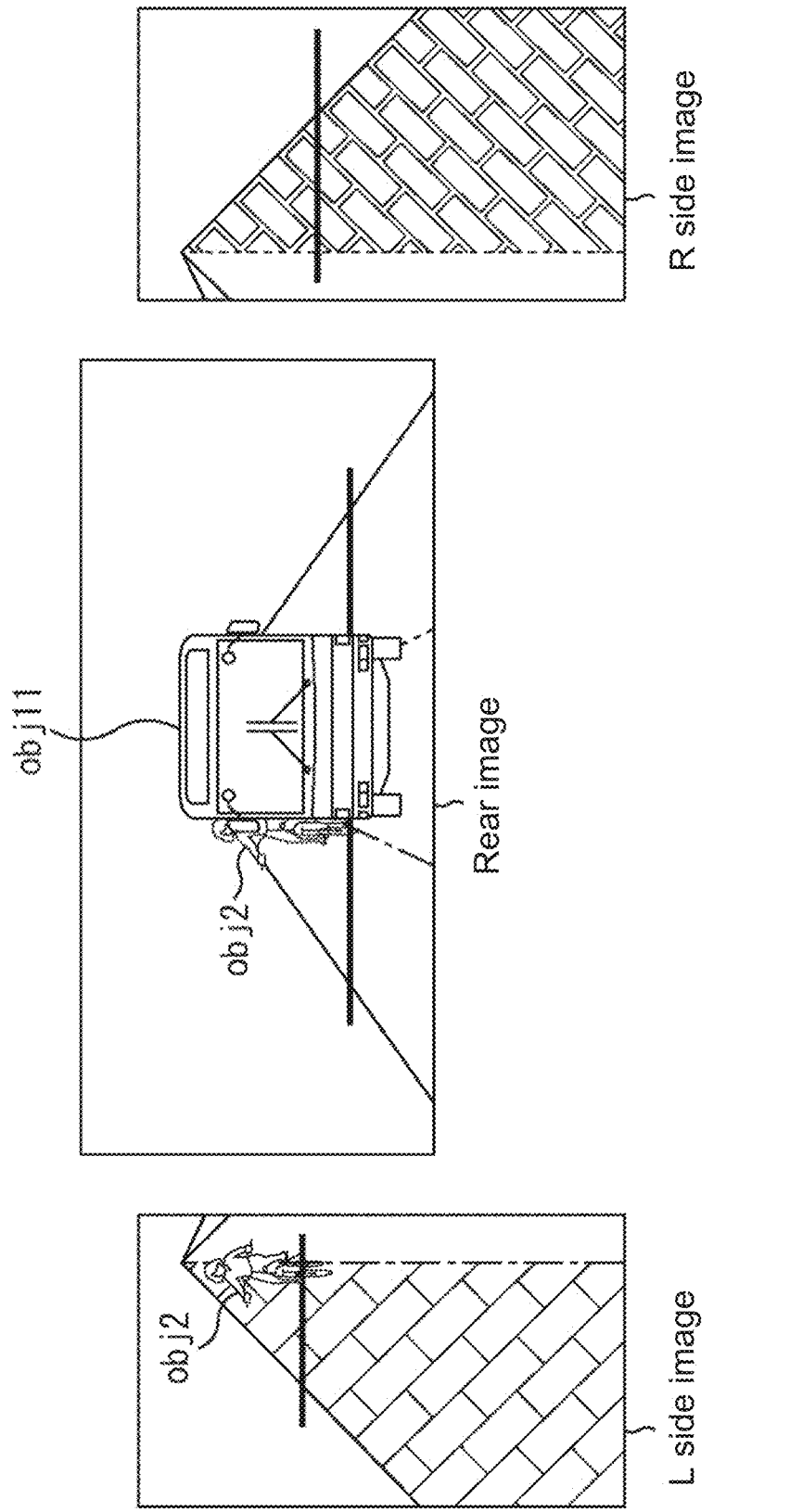
FIG. 6 is a diagram illustrating an example of a rear image and L/R side images.

FIG. 6 is a diagram illustrating an example of the rear image and the L/R side images.

In FIG. 6, a motorcycle and a large vehicle serving as the standing objects obj2 and obj11 are present on the load.

Further, the standing objects obj2 and obj11 are shown in the rear image, and the standing object obj2 is shown in the L side image. A standing object is not shown in the R side image.

Further, the standing object obj2 is positioned on the left behind the standing object obj11, and a part of the standing object obj2 is hidden by the standing object obj11 and not visible in the rear image.

On the other hand, the entire standing object obj2 is shown in the L side image.

Figure 7:
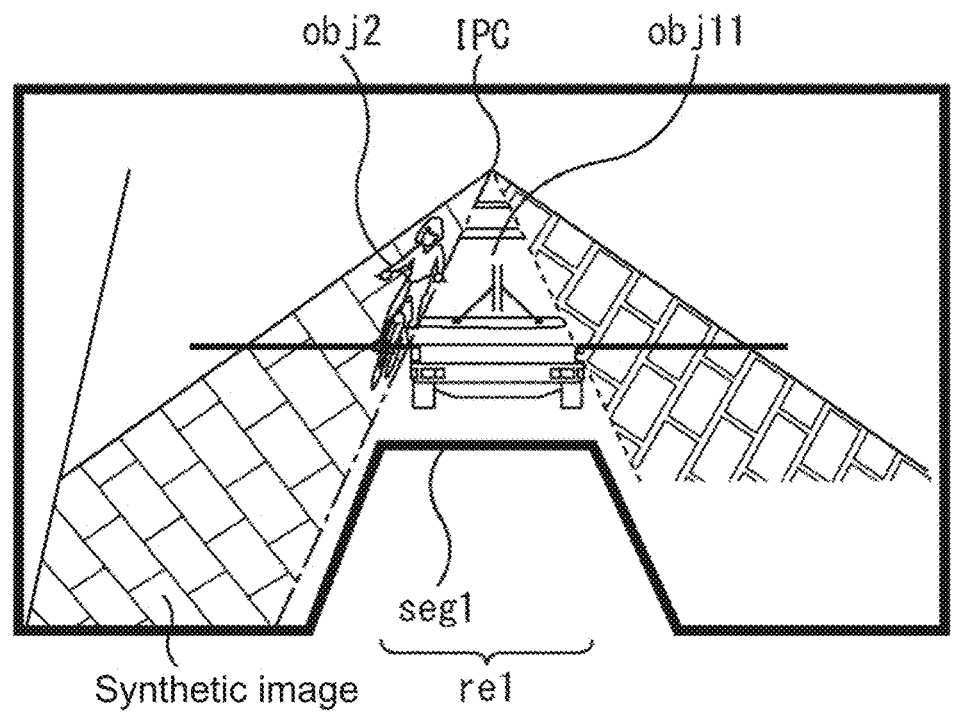
FIG. 7 is a diagram illustrating an example of a synthetic image obtained by performing affine transform on L/R side images and synthesizing L/R side images after affine transform into a rear image.

FIG. 7 is a diagram illustrating an example of a synthetic image obtained by performing the affine transform on the L/R side images of FIG. 6 and synthesizing the L/R side images which have undergone the affine transform with the rear image of FIG. 6.

In the generation of the integrated image, in a case in which the synthetic image is generated by performing the affine transform on the L/R side images, aligning the L/R side images which have undergone the affine transform with the rear image, and combining the L/R side images with the rear image, the L/R side images and the rear image are synthesized, for example, such that 1.0 is set as a weight of the L/R side images, and 0.0 is set as a weight of the rear image in an overlapping part of the L/R side images and the rear image.

In other words, the overlapping part of the L/R side images which have undergone the affine transform and the rear image is overwritten with the L/R side images.

FIG. 7 illustrates an example of a synthetic image obtained by overwriting the overlapping part with the L/R side images as described above.

In the synthetic image obtained by overwriting the overlapping part of the L/R side images and the rear image with the L/R side images, an area excluding a triangular area re1 configured by connecting the infinite point IPC of the rear image and end points of a line segment seg1 on the lower edge of the rear image corresponding to a line segment connecting the L side camera 12 with the R side camera 13 in the rear image is overwritten with the L/R side images. In other words, the rear image is overwritten with tile-shaped areas which are largely shown in the L/R side images.

Due to the overwriting of the L/R side images described above, all or part of the standing object shown in the rear image may be erased in the synthetic image.

In FIG. 7, in the synthetic image, a part of the standing object obj11 shown in the rear image is erased by the overwriting of the L/R side images and not shown.

In a case in which the integrated image including such a synthetic image is displayed as the CMS image, the driver views the CMS image in which the standing object which is awkwardly partly missing and is likely to have an uncomfortable feeling.

Figure 8:
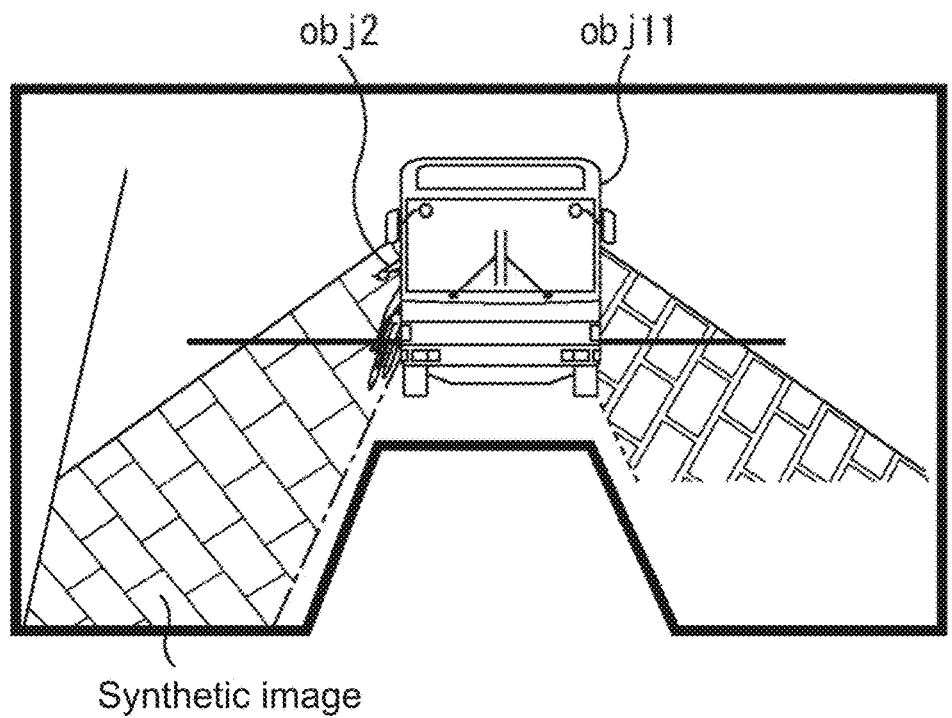
FIG. 8 is a diagram illustrating another example of a synthetic image obtained by performing affine transform on L/R side images and synthesizing L/R side images after affine transform with a rear image.

FIG. 8 is a diagram illustrating another example of a synthetic image obtained by performing the affine transform on the L/R side images of FIG. 6 and synthesizing the L/R side images which have undergone the affine transform with the rear image of FIG. 6.

In FIG. 8, in the generation of the integrated image, a synthetic image similar to that of FIG. 7 is generated, whereas (images of) standing objects shown in the rear image and the L/R side images which have undergone the affine transform are extracted from the rear image and the L/R side images which have undergone the affine transform used for the generation of the synthetic image.

For the rear image and the L/R side images of FIG. 6, for example, the standing object obj11 is extracted from the rear image, and the standing object obj2 is extracted from the L side image which has undergone the affine transform.

Further, for the standing object obj11 extracted from the rear image, the position of the standing object obj11 shown in the rear image is detected, and for the standing object obj2 extracted from the L side image which has undergone the affine transform, a position of the standing object obj2 shown in the L side image which has undergone the affine transform is detected.

Further, for the standing object obj11 extracted from the rear image and the standing object obj2 extracted from the L side image which has undergone the affine transform, a distance from its own vehicle 10 is detected.

Then, the standing object obj11 extracted from the rear image and the standing object obj2 extracted from the L side image are layer-synthesized with the synthetic image in accordance with the distances to the respective standing objects obj11 and obj2 and the positions of the standing objects obj11 and obj2.

Here, the layer synthesis of the image means synthesis in which images are drawn in the descending order of distances. Therefore, in the layer synthesis, in a case in which two standing objects overlap at least partially, for the overlapping part, a standing object on a far side out of the two standing objects is overwritten with a standing object on a near side.

Further, in the layer synthesis of the standing object obj11 into the synthetic image, the standing object obj11 is synthesized at a position on the synthetic image corresponding to the position of the standing object obj11 shown in the rear image. Similarly, in the synthesis of the standing object obj2 into the synthetic image, the standing object obj2 is synthesized at a position on the synthetic image corresponding to the position of the standing object obj2 shown in L side image which has undergone the affine transform.

In FIG. 6, the standing object obj11 shown in the rear image is ahead of the standing object obj2 shown in the L side image. Further, the standing object obj11 extracted from the rear image partially overlaps the standing object obj2 extracted from the L side image which has undergone the affine transform.

For this reason, in the layer synthesis, for the overlapping portion of the standing object obj11 extracted from the rear image and the standing object obj2 extracted from the L side image, the standing object obj2 on the far side is overlapped with the standing object obj11 on the rear side.

As described above, a synthetic image similar to that in FIG. 7 is generated from the rear image and the L/R side images, and images of extraction areas of the standing objects shown in the rear image and the L/R side images which have undergone the affine transform are layer-synthesized with the synthetic image, and thus it is possible to prevent the generation of the CMS image in which the standing object being awkwardly partly missing is shown as shown in FIG. 7.

Note that the detection of the standing objects shown in the rear image and the L/R side images can be carried out, for example, by a method of segmenting an area in which the standing objects are integrated in accordance with a distance obtained by a distance sensor such as, for example, a stereo camera, a Light Detection and Ranging, Laser Imaging Detection and Ranging, laser radar (LIDAR), or a Time Of Flight (TOF) distance sensor. The segmentation of the image area is image processing of surrounding an area serving as an aggregate within an image.

Further, the detection of the standing object shown in the rear image and the L/R side images is performed by a method of segmenting the area of the standing object by image processing such as, for example, optical flow analysis or texture analysis of the rear image and L/R side images.

Further, in the detection of the standing object shown in the rear image and the L/R side images, it is possible to estimate a road surface (road) on the rear image and the L/R side images using, for example, a motion stereo technique and detect an area with no road surface as an area of the standing object.

Further, in the CMS installed in the vehicle 10, in a case in which a bird's eye view image obtained by overlooking an area around the vehicle 10 including the vehicle 10 can be generated from above the vehicle 10 using the images or the like captured with the rear camera 11, the L side camera 12, the R side camera 13, and other cameras installed in the vehicle 10, it is possible to detect the standing objects shown in the rear image and the L/R side images using the bird's eye view image.

In other words, in a case in which a difference SS between a frame at a time t+1 and a frame obtained by shifting (motion compensation) a frame at a time t by a motion vector corresponding to movement of the vehicle 10 for one hour is obtained for the frame of the time t and the frame of the time t+1 serving as, for example, two adjacent frames of the bird's eye view image, the difference SS of the area of the road surface (road) is (substantially) zero. In this regard, it is possible to detect the standing objects shown in the rear image and the L/R side image by detecting an area in which the difference SS is a threshold value or more as the area of the standing object from the bird's eye view image and detecting the standing object from the rear image and the L/R side images.

Further, the distances to the standing objects shown in the rear image and the L/R side images can be detected by a method using a distance sensor such as a stereo camera, an LIDAR, a TOF sensor, or the like.

Further, the distances to the standing objects shown in the rear image and the L/R side images can be estimated, for example, by a method of performing image processing on a plurality of frames in each of the rear image and the L/R side images.

The detection of the standing object shown in the rear image and the L/R side images or the detection of the distances to the standing objects can be performed by a combination of arbitrary methods including the above-described methods.

Figure 9:
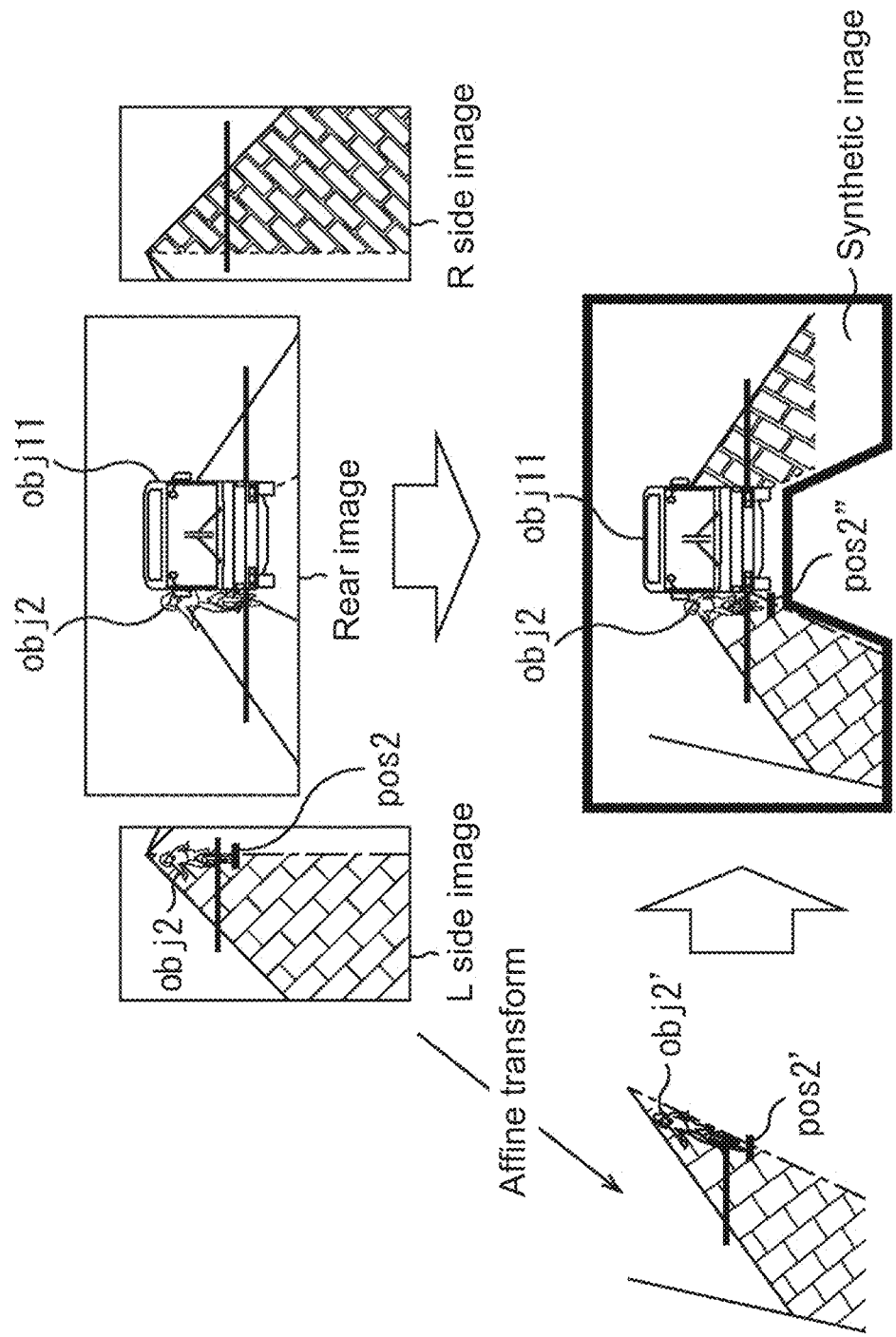
FIG. 9 is a diagram illustrating an example of a synthetic image.

FIG. 9 is a diagram illustrating an example of the synthetic image.

As described in FIG. 8, it is possible to prevent a part of the standing object from being missed by layer-synthesizing the standing objects shown in the rear image and the L/R side images which have undergone the affine transform into the synthetic image.

Here, in FIG. 8, the standing objects shown in the rear image and the L/R side images which have undergone the affine transform are layer-synthesized. In this case, since the standing objects shown in the L/R side images which have undergone the affine transform are inclined as described with reference to FIG. 5, an uncomfortable feeling may be given to the driver.

In this regard, for the standing object shown in each of the L/R side images, instead of extracting the standing object from the L/R side images which have undergone the affine transform, it is possible to extract the standing object from the L/R side images before the affine transform and uses the standing object extracted from L/R side images before the affine transform for the layer synthesis.

FIG. 9 illustrates an example of a synthetic image obtained by using the standing object extracted from the L/R side images before the affine transform for the layer synthesis.

In FIG. 9, similarly to FIG. 6, the standing objects obj2 and obj11 are shown in the rear image, and the standing object obj2 is shown in the L side image. A standing object is not shown in the R side image.

In FIG. 9, similar to FIG. 8, a synthetic image similar to that of FIG. 7 is generated, whereas the standing object obj11 is extracted from the rear image, and a standing object obj2' is extracted from the L side image which has undergone the affine transform.

Here, the standing object obj2 shown in the L side image which has undergone the affine transform is also referred to as the standing object obj2'.

For the standing object obj11 extracted from the rear image, a position of the standing object obj11 shown in the rear image is detected. Similarly, for the standing object obj2' extracted from the L side image which has undergone the affine transform, a position pos2' of the standing object obj2' shown in the L side image which has undergone the affine transform is detected.

Further, for the standing object obj11 extracted from the rear image and the standing object obj2' extracted from the L side image which has undergone the affine transform, a distance from its own vehicle 10 is detected.

Further, the standing object obj2 is extracted from the L side image before the affine transform.

Then, the standing object obj11 extracted from the rear image and the standing object obj2 extracted from the L side image before the affine transform are layer-synthesized into a synthetic image, similarly to FIG. 8.

In other words, in FIG. 9, instead of the standing object obj2' extracted from the L side image which has undergone the affine transform, the standing object obj2 extracted from the L side image before the affine transform is synthesized into a synthetic image as a layer synthesis target.

Further, the standing object obj2 extracted from the L side image before the affine transform is synthesized at a grounding position pos2" on the synthetic image corresponding to a grounding position pos2' of the standing object obj2' shown in the L side image which has undergone the affine transform other than the grounding position pos2 of the standing object obj2 shown in the L side image before the affine transform. The grounding position with the road surface is simply referred to as a "position" unless otherwise set forth below.

As described above, the standing object extracted from the L/R side images before the affine transform is lay-synthesized at the position on the synthetic image corresponding to the position of the standing object shown in the L/R side images which have undergone the affine transform, and thus it is possible to prevent generation of a CMS image in which the standing object is inclined awkwardly.

FIG. 10 is a diagram illustrating a display method of displaying the rear image and the L/R side images as the CMS images.

A display method of displaying the rear image and the L/R side images as the CMS image can be roughly divided into an individual display and an integrated display.

In the individual display, the rear image and the L/R side images are individually displayed as the CMS image, for example, as illustrated in FIG. 1. The display method of individually displaying the rear image and the L/R side images as the CMS image is also referred to as a first display method.

In the integrated display, the integrated image in which the rear image and the L/R side images are integrated such as the image including the synthetic image in which the rear image and the L/R side images are synthesized is displayed as the CMS image, for example, as illustrated in FIGS. 7 to 9.

The integrated display includes, for example, a second display method, a third display method, and a fourth display method.

In the second display method, as described in FIG. 7 or the like, the L/R side images which have undergone the affine transform and the rear image are synthesized such that the overlapping part of the L/R side images and the rear image is overwritten with the L/R side images, and the integrated image including the synthetic image obtained accordingly is displayed as the CMS image.

In the second display method, as described in FIG. 7, all or a part of the standing object shown in the rear image may be missing (erased) in the synthetic image due to the overwriting of the L/R side images.

In the third display method, as described in FIG. 8, the standing objects shown in the rear image and the L/R side images which have undergone the affine transform are layer-synthesized with the synthetic image, and the integrated image including the synthetic image obtained accordingly is displayed as the CMS image.

In the third display method, as described in FIG. 8, since the standing objects shown in the L/R side images which have undergone the affine transform are inclined, the standing object on the synthetic image in which the standing objects are layer-synthesized are also inclined.

In the fourth display method, as described in FIG. 9, the standing object extracted from the L/R side images before the affine transform is layer-synthesized at the position on the synthetic image corresponding to the position of the standing object shown in the L/R side images which have undergone the affine transform, and the integrated image including the synthetic image obtained accordingly is displayed as the CMS image.

In the CMS installed in the vehicle 10, in a case in which the integrated image including the synthetic image is displayed as the CMS image, the third display method or the fourth display method is useful.

Hereinafter, it is assumed that, in a case in which the integrated image including the synthetic image is displayed as the CMS image, the third display method or the fourth display method is employed.

By the way, the synthetic image is, for example, an image whose viewpoint is the installation position of the rear camera 11 that captures the rear image.

Therefore, even the standing object which is entirely shown in the L/R side images before the affine transform having the side mirror position as the viewpoint may be partially or entirely hidden by another standing object shown in the rear image and not been viewed.

Figure 11:
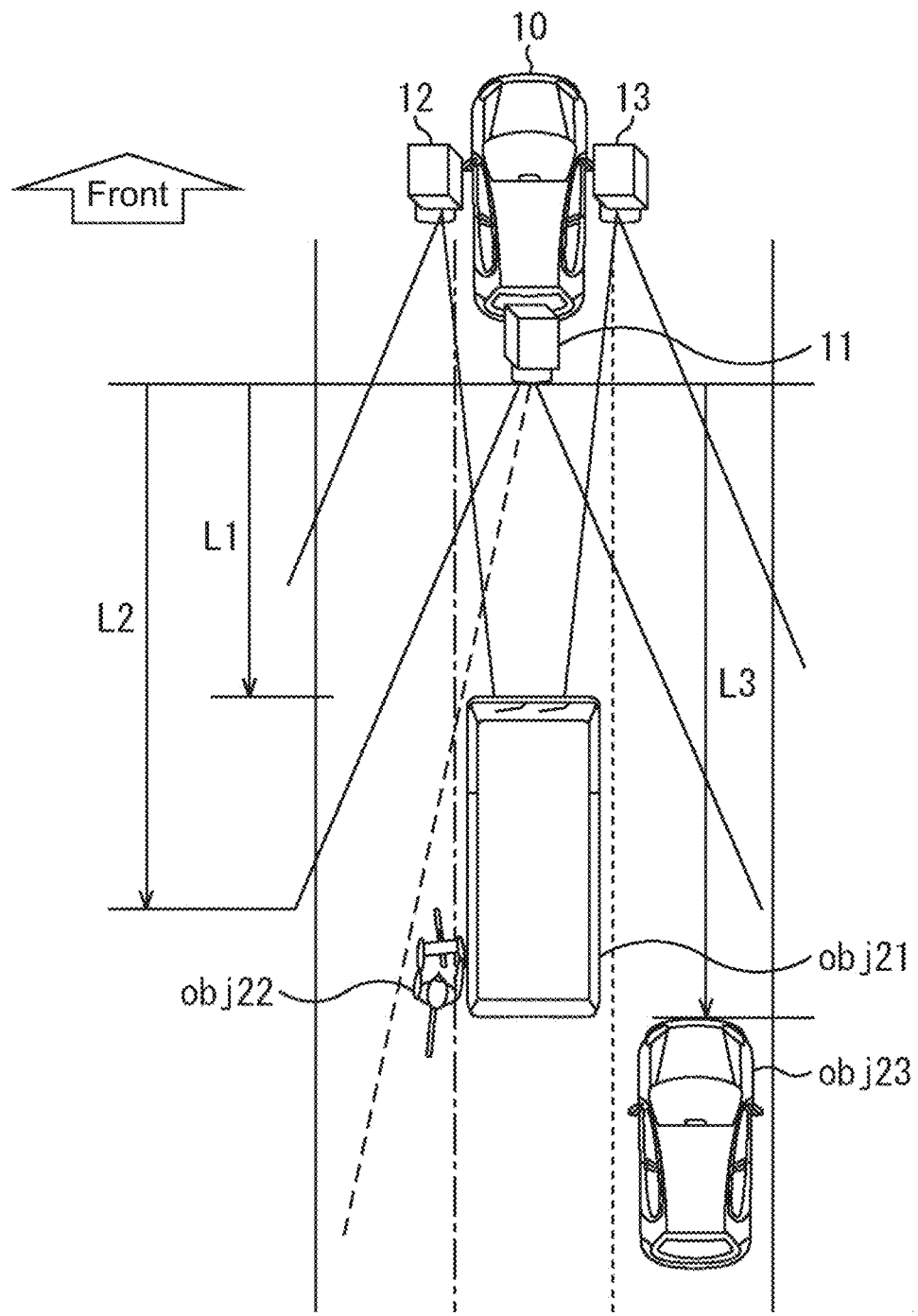
FIG. 11 is a plane view illustrating an example of a situation on a road.

FIG. 11 is a plane view illustrating an example of a situation on the road.

In FIG. 11, a standing object obj21 such as a bus, a standing object obj22 such as a motorcycle, and a standing object obj23 such as a compact car or the like are traveling following the vehicle 10 in which the rear camera 11, the L side camera 12, and the R side camera 13 are installed.

The standing object obj21 is positioned just behind the vehicle 10. The standing object obj22 is positioned on the left behind the standing object obj21, and the standing object obj23 is positioned on the right behind the standing object obj21 and is behind the standing object obj22.

Therefore, if it is assumed that distances (from the vehicle 10) to the standing objects obj21, obj22, and obj23 are indicated by L1, L2, and L3, the distances L1 to L3 have a relation of Formula L1<L2<L3.

The standing objects obj21 to obj23 are shown in the rear image captured by the rear camera 11. However, for the object obj21 on the very front, the entire standing object obj21 is shown in the rear image, but for the standing objects obj22 and obj23 on the farther side than the standing object obj21, parts of the standing objects obj22 and obj23 are hidden by the standing object obj21 on the near side and not visible in the rear image.

On the other hand, the standing objects obj21 and obj22 are shown in the L side image captured by the L side camera 12. In the vehicle 10, since the L side camera 12 is installed on the left side further than the rear camera 11, the entire standing object obj22 positioned on the left behind the standing object obj21 is shown in the L side image (without being hidden by the standing object obj21).

The standing objects obj21 and obj23 are shown in the R side image captured by the R side camera 13. In the vehicle 10, since the R side camera 13 is located on the right side further than the rear camera 11, the entire standing object obj23 positioned on the right side behind the standing object obj21 is shown in the R side image (without being hidden by the standing object obj21).

As described above, the entire standing object obj22 is shown in the L side image, and the entire standing object obj23 is shown in the R side image.

However, the synthetic image obtained by performing the affine transform on the L/R side images, synthesizing the L/R side images which have undergone the affine transform with the rear image, and layer-synthesizing the standing object obj21 shown in the rear image and the standing objects obj22 and obj23 shown in the L/R side images before affine transform or the L/R side images which have undergone the affine transform is an image having the installation position of the rear camera 11 capturing the rear image as the viewpoint.

Therefore, in the synthetic image, similarly to the rear image, some (or all) of the standing object obj22 and obj23 are hidden by the standing object obj21 and not visible.

Therefore, in a case in which the integrated image including the synthetic image is displayed as the CMS image, the driver of the vehicle 10 is unlikely to notice the standing object obj22 or the standing object obj23 which is partially hidden by the standing object obj21 when viewing the integrated image.

As described above, at least a part of the standing object which is entirely shown in the L/R side images may be hidden by the standing object shown in the rear image and not visible in the synthetic image in a case in which the distance to the standing object shown in the L/R side images is larger than the distance to the standing object shown in the rear image, that is, in a case in which the standing object shown in the L/R side images is on the farther side than the standing object shown in the rear image.

In this regard, in the CMS, in a case in which the standing object shown in the L/R side images is on the farther side than the standing object shown in the rear image, an alert for warning that the standing object is hidden by another standing object (an occlusion alert) can be output.

In FIG. 11, the occlusion alert can be output in a case in which the distances L1 to L3 satisfy Formula L1<L2 or Formula L1<L3.

As the occlusion alert, an output of a buzzer sound or other sounds, display blinking, or other image displays can be employed. Note that the buzzer sound is output after sensing that the driver turns the line of sight to a monitor, and thus the buzzer sound can be prevented from being carelessly frequently output.

Figure 12:
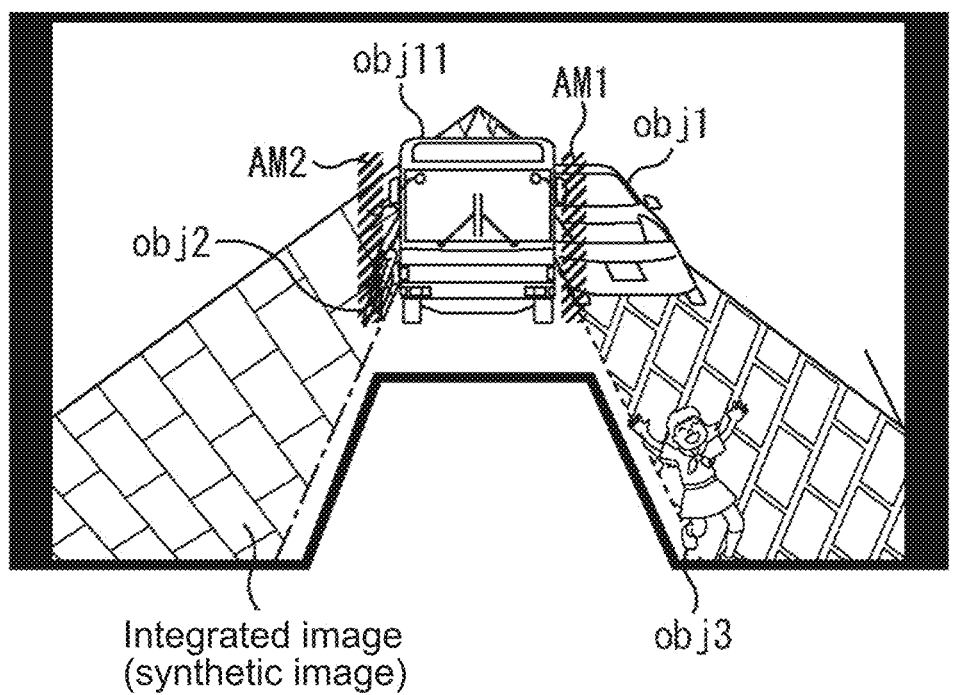
FIG. 12 is a diagram illustrating a display example of an integrated image in which an image serving as an occlusion alert is displayed.

FIG. 12 is a diagram illustrating a display example of an integrated image in which an image serving as an occlusion alert is displayed.

In FIG. 12, the synthetic image itself is an integrated image, and the integrated image is an integrated image of the third display method (FIGS. 8 and 10).

Further, standing objects obj1, obj2, obj3, and obj11 are shown in the synthetic image serving as the integrated image.

Note that the entire standing object obj11 is shown in the rear image used for generating the synthetic image. Further, the entire standing object obj2 is shown in the L side image used to generate the synthetic image, and the entire standing objects obj1 and obj3 are shown in the R side image used for generating the synthetic image.

Further, the standing objects obj1 and obj2 are positioned on the farther side than the standing object obj11, and the standing object obj3 is positioned on the nearer side than the standing object obj11.

For this reason, in the synthetic image, the entire standing object obj3 is shown, but the standing objects obj1 and obj2 are partially hidden by the standing object obj11 and not visible.

Here, hereinafter, the standing object shown in the rear image is also referred to as a "rear standing object," and the standing object in the L/R side images is also referred to as an "L/R side standing object."

In the CMS installed in the vehicle 10, in a case in which the L/R side standing object is positioned on the farther side than the rear standing object, an alert mark serving as the occlusion alert for waring the presence of the L/R side standing object which is partially (or entirely) not visible in the synthetic image can be superimposed on the integrated image.

In FIG. 12, an alert mark AM2 serving as the occlusion alert is superimposed at the position of the L side standing object obj2 on the farther side than the rear standing object obj11, and an alert mark AM1 serving as the occlusion alert is superimposed at the position of the R side standing object obj1 on the farther side than the rear standing object obj11.

For example, the superimposition of the alert mark on the integrated image can be carried out such that 1.0 is set as a weight of the alert mark, 0.0 is set as a weight of the integrated image, and the alert mark is synthesized with the integrated image.

According to the alert mark AM1 or AM 2, it is possible to call the attention of the driver quickly and cause the driver to recognize the presence of the R side standing object obj1 or the L side standing object obj2 which is partially invisible in the synthetic image quickly and reliably.

In other words, according to the alert marks AM 1 and AM 2, it is possible to urge the driver to turn the line of sight to the integrated image being present within the peripheral visual field of the driver and cause the driver to recognize the presence of the R side standing object obj1 or the L side standing object obj2 which is partially invisible in the synthetic image quickly and reliably.

As the alert mark serving as the occlusion alert, for example, it is possible to employ an image of a stripe pattern in which the stripe pattern is a color stripe pattern of two (or more) colors (zebra pattern) such as the alert mark AM1 or AM 2 of FIG. 12, and one color out of the two colors (a part of the stripe pattern) is transparent.

Even in a case in which the alert mark is superimposed at the position of the L/R side standing object on the farther side than the rear standing object on the synthetic image by employ the image in which one color (part) is transparent as the alert mark, the driver can check the L/R side standing object from the transparent part of the alert mark.

Further, an image in which a transparent part moves can be employed as the alert mark. In other words, for example, an image in which a stripe pattern apparently moves as in a sign pole of a barber shop can be employed as the alert mark.

In a case in which the image in which a transparent part moves is employed as the alert mark, a visible part of the L/R side standing object changes in a part on which the alert mark is superimposed in the synthetic image, the driver can easily recognize what kind of subject the L/R side standing object on which the alert mark is superimposed is. Here, when the alert mark of the stripe pattern of the two colors is superimposed on the integrated image, there is a merit in that it is possible to cause the background (the integrated image) to be clearly visible while giving an alert by setting 1.0 as a superimposition weight of one color serving as a valid part of the stripe and 1.0 as a weight of the integrated image reversely in the other color of a transparent part serving as an invalid part of the stripe although it is not a translucent. On the other hand, in a case in which the stripe pattern as the alert mark is translucent and superimposed on the integrated image, there is a risk that the translucent superimposition part of the integrated image and the alert mark becomes ambiguous, and efforts for determination and recognition are necessary as well.

Note that, in a case in which the alert mark is superimposed on the integrated image, a sound serving as the occlusion alert can be output at the same time. In this case, it is possible to call the attention of the user more. Here, a sound alert is usefully performed in a situation in which the rear situation is important, that is, a situation in which the driver starts situation assessment by moving the line of sight to the integrated image or is performing situation assessment since it is regarded as being important for traveling of the vehicle. In this regard, the occlusion alert by sound can be performed when the driver is determined to start a backward checking sequence on the basis of analysis for movement of the line of sight or the head of the driver.

Further, as the color of the alert mark, for example, a color reminding danger such as red or yellow or other colors of attention can be employed.

Further, in a case in which the L/R side standing object is position on the farther side than the rear standing object, the alert mark is not necessarily superimposed on the integrated image, and in a case in which the L/R side standing object is position on the farther side than the rear standing object, and the L/R side standing object on the farther side is hidden by the rear standing object on the nearer side, the alert mark can be superimposed on the integrated image.

Further, a collision risk of whether or not the vehicle 10 collides with the L/R side standing object if the vehicle 10 changes the course to the left or the right is determined, and in a case in which the L/R side standing object is positioned on the farther side than the rear standing object, and there is collision risk, the alert mark can be superimposed on the integrated image.

Further, in a case in which the L/R side standing object is positioned on the farther side than the rear standing object, and the L/R side standing object on the far side is hidden by the rear standing object on the near side, and there is collision risk, the alert mark can be superimposed on the integrated image.

The determination of whether or not the vehicle 10 collides with the L/R side standing object if the vehicle 10 changes the course to the left or the right can be performed using, for example, a distance from the vehicle 10 to the L/R side standing object and a relative speed of the L/R standing object (with respect to the vehicle 10) based on the vehicle.

In other words, for example, a time required for collision until the vehicle 10 collides with the L/R side standing object if the vehicle 10 changes the course to the left or the right is estimated from the distance from the vehicle 10 to the L/R side standing object and the relative speed of the L/R standing object, and the determination of the collision risk can be performed on the basis of the time required for collision.

The distance to the L/R side standing object can be detected using a distance sensor such as a millimeter wave radar, a LIDAR, a TOF sensor (TOF type two-dimensional distance measuring device), a sonar device, or the like or can be estimated from the L/R side images in which the L/R side standing object is shown.

The relative speed of the L/R standing object can be detected (calculated) from a time series of the distance to the L/R side standing object directly or indirectly by any of the above measures.

Figure 13:
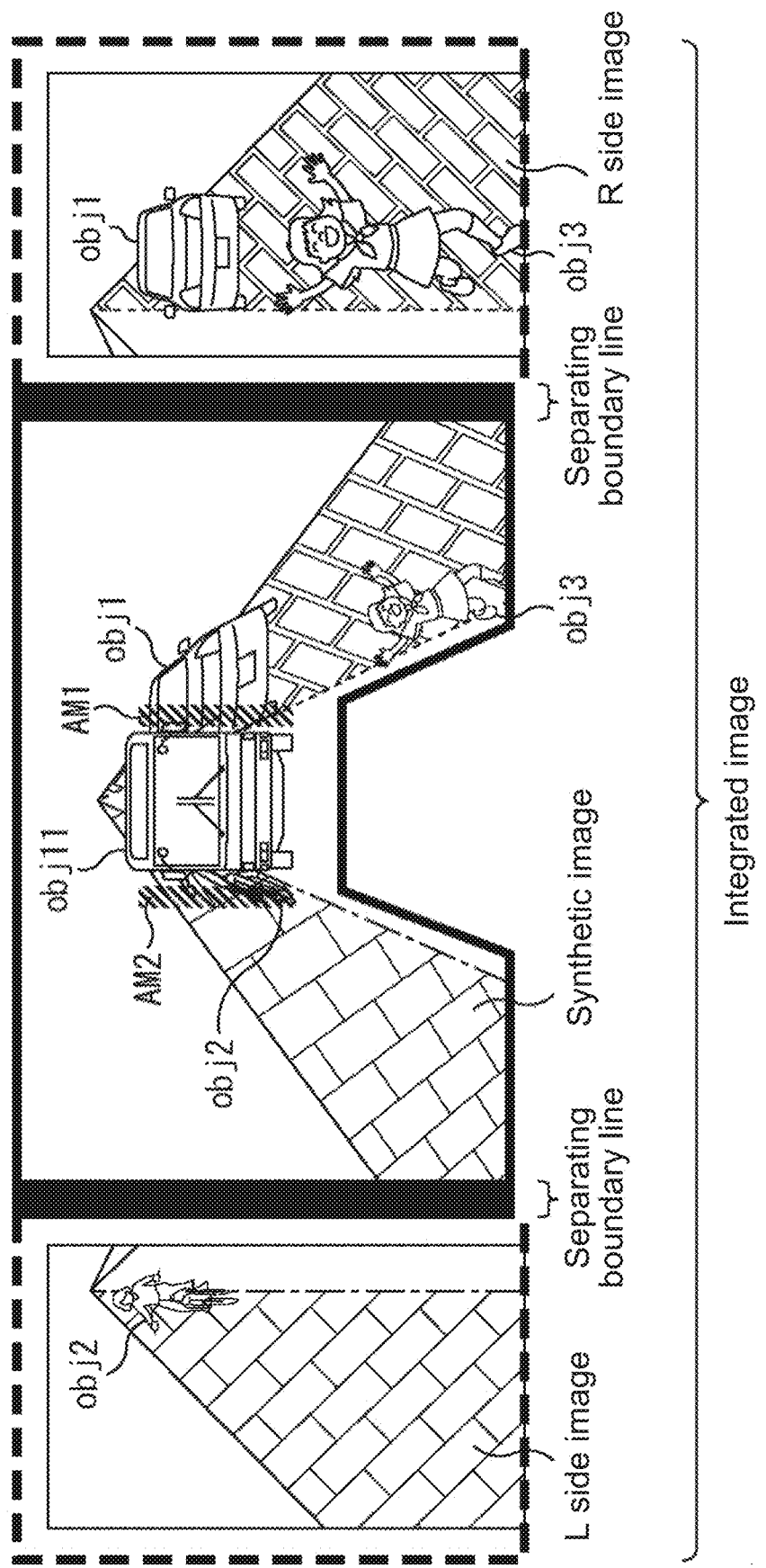
FIG. 13 is a diagram illustrating another display example of an integrated image in which an image serving as an occlusion alert is displayed.

FIG. 13 is a diagram illustrating another display example of the integrated image in which the image serving as the occlusion alert is displayed.

In FIG. 13, an image in which the L side image and the R side image (before the affine transform) are arranged on the left side and the right side of the synthetic image of FIG. 12 and combined is the integrated image.

Further, the integrated image of FIG. 13 includes separating boundary lines of a predetermined width for separating the synthetic image from the L/R side images between the synthetic image and the L/R side images.

According to the separating boundary lines between the synthetic image and the L/R side images, the driver can easily and consciously separate and recognize each of the synthetic image and the L/R side images arranged in the integrated image.

As described with reference to FIG. 12, in a case in which the alert mark is an image which is partially transparent, although the alert mark is superimposed at the position of the L/R side standing object on the synthetic image, the driver can check the L/R side standing object from the transparent part of the alert mark, but the L/R side standing object on the synthetic image is still hidden by the non-transparent part of the alert mark.

In a case in which the integrated image is configured by combining the L/R side images with the synthetic image, when the alert mark is displayed, the driver can turn the line of sight from the synthetic image of the integrated image to the L/R side images combined with the integrated image and clearly check the L/R side standing object.

Note that, as widths of the separating boundary lines between the synthetic image and the L/R side images, a width which is ergonomically appropriate for a human to consciously separates the synthetic image and the L/R side images, turn the line of sight from the synthetic image to the L/R side images, and perform recognition and thinking for understanding a situation shown in the L/R side images. For example, a width corresponding to an angle of 0.5° or more (in the horizontal direction) from the head of the driver can be employed as the width of the separating boundary line.

Figure 14:
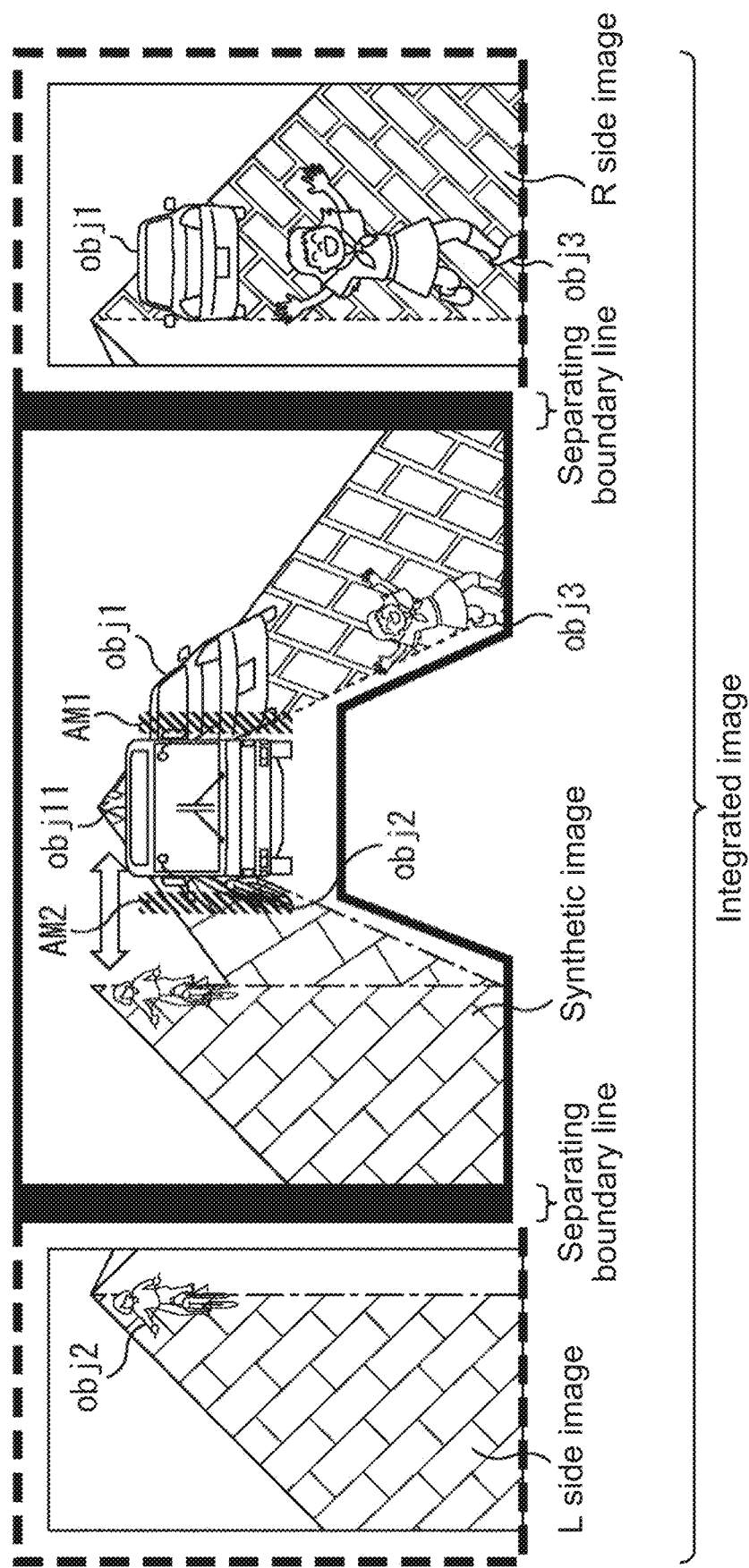
FIG. 14 is a diagram illustrating yet another display example of an integrated image in which an image serving as an occlusion alert is displayed.

FIG. 14 is a diagram illustrating yet another display example of the integrated image in which the image serving as the occlusion alert is displayed.

The integrated image of FIG. 14 is configured, similarly to FIG. 13.

Here, in the integrated image of FIG. 14, a degree in which the infinite points of the L/R side images which have undergone the affine transform used for generating the synthetic image coincide with the infinite point of the rear image is changed.

The degree in which the infinite points of the L/R side images which have undergone the affine transform coincide with the infinite point of the rear image in the synthetic image can be changed in accordance with, for example, a state of the driver.

For example, the degree in which the infinite points of the L/R side images which have undergone the affine transform coincide with the infinite point of the rear image in the synthetic image can be seamlessly changed in accordance with rotational movement or parallel movement (movement of viewpoint) of the head of the driver or the like as indicated by a double-headed arrow of FIG. 14.

For example, if a state of the head of the driver in which the driver is carefully driving ahead is assumed to be a default state, it is possible to cause the degree in which the infinite points of the L/R side images which have undergone the affine transform coincide with the infinite point of the rear image in the synthetic image to decrease (coincidence thereof to decrease) as the movement amount of the rotational movement or the parallel movement of the head of the driver from the default state increases.

In this case, for example, since the L side standing object obj2 not hidden by the rear standing object obj11 is displayed in the synthetic image due to the movement of the head of the driver, the driver can recognize the L side standing object obj2 positioned behind the rear standing object obj11 quickly and accurately. The same applies to the R side standing object obj1.

Note that, in the synthetic image, instead of seamlessly changing the degree in which the infinite points of the L/R side images which have undergone the affine transform coincide with the infinite point of the rear image in accordance with the state of the driver, the L/R side images used in the synthetic image can be switched to the L/R side images which have undergone the affine transform so that the infinite point coincides with the infinite point of the rear image or the L/R side images before the affine transform is performed (the L/R side images before the affine transform).

In other words, for example, the L/R side images to be synthesized into the synthetic image can be switched to the L/R side images before the affine transform or the L/R side images which have undergone the affine transform in accordance with the position of the head of the driver.

In this case, for example, when the driver notices that the alert mark AM1 or AM2 is superimposed on the integrated image and moves the head to turn the line of sight to the integrated image, the L/R side images to be synthesized into the synthetic image can be switched from the L/R side images which have undergone the affine transform to the L/R side images before the affine transform.

Therefore, the driver can clearly check the L/R side standing object through the L/R side images before the affine transform synthesized into the synthetic image.

<CMS Image to be Displayed in a Case in which Vehicle Travels at Low Speed (Slowly)>

Figure 15:
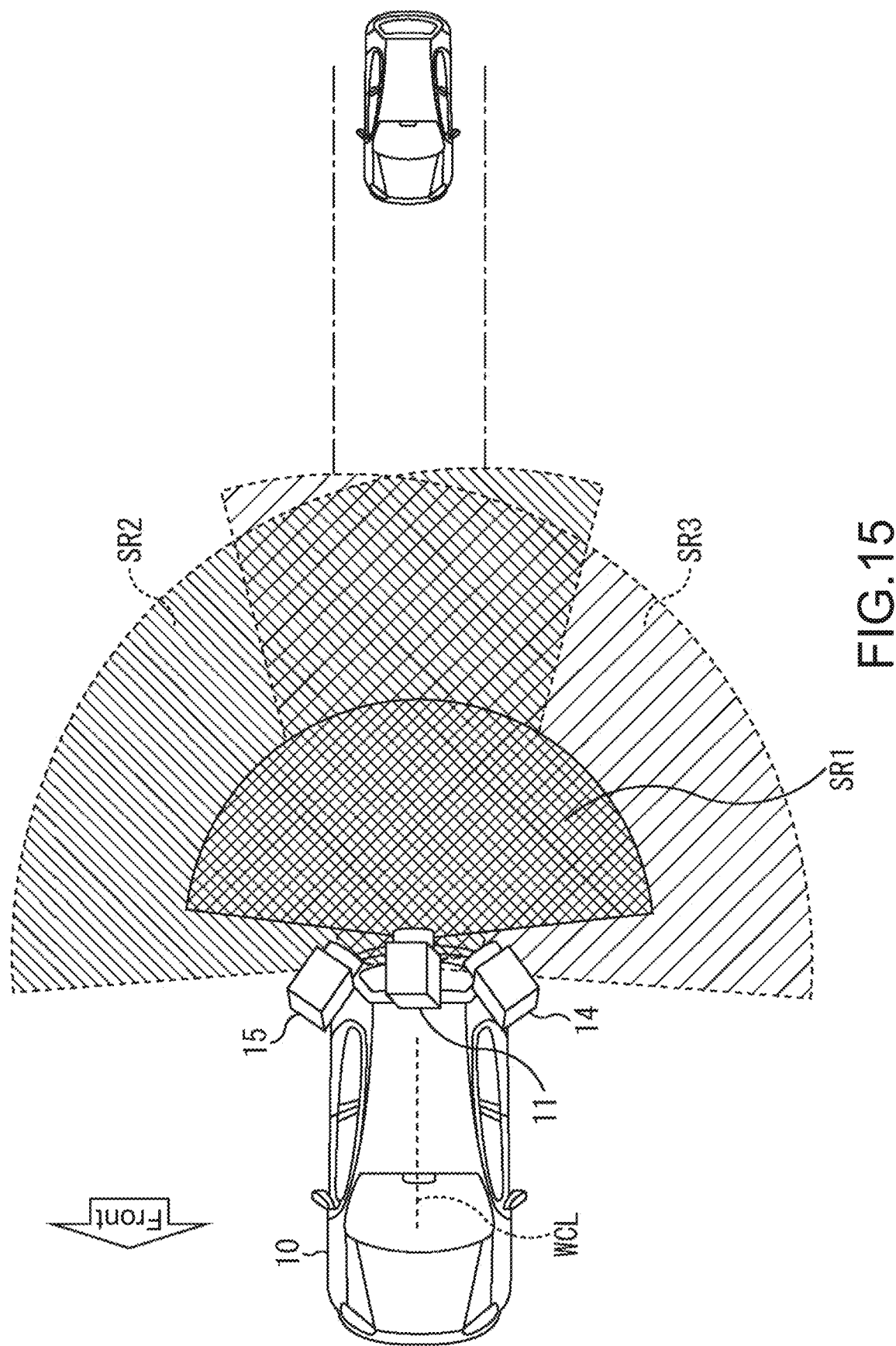
FIG. 15 is a plane view illustrating an example of an installation position at which cameras for capturing an image serving as a CMS image displayed in a case in which a vehicle travels at a low speed are installed in a vehicle.

FIG. 15 is a plane view illustrating an example of an installation position at which cameras for capturing an image serving as a CMS image displayed in a case in which a vehicle travels at a low speed (hereinafter also referred to as a "low-speed CMS image") are installed in a vehicle.

Figure 16:
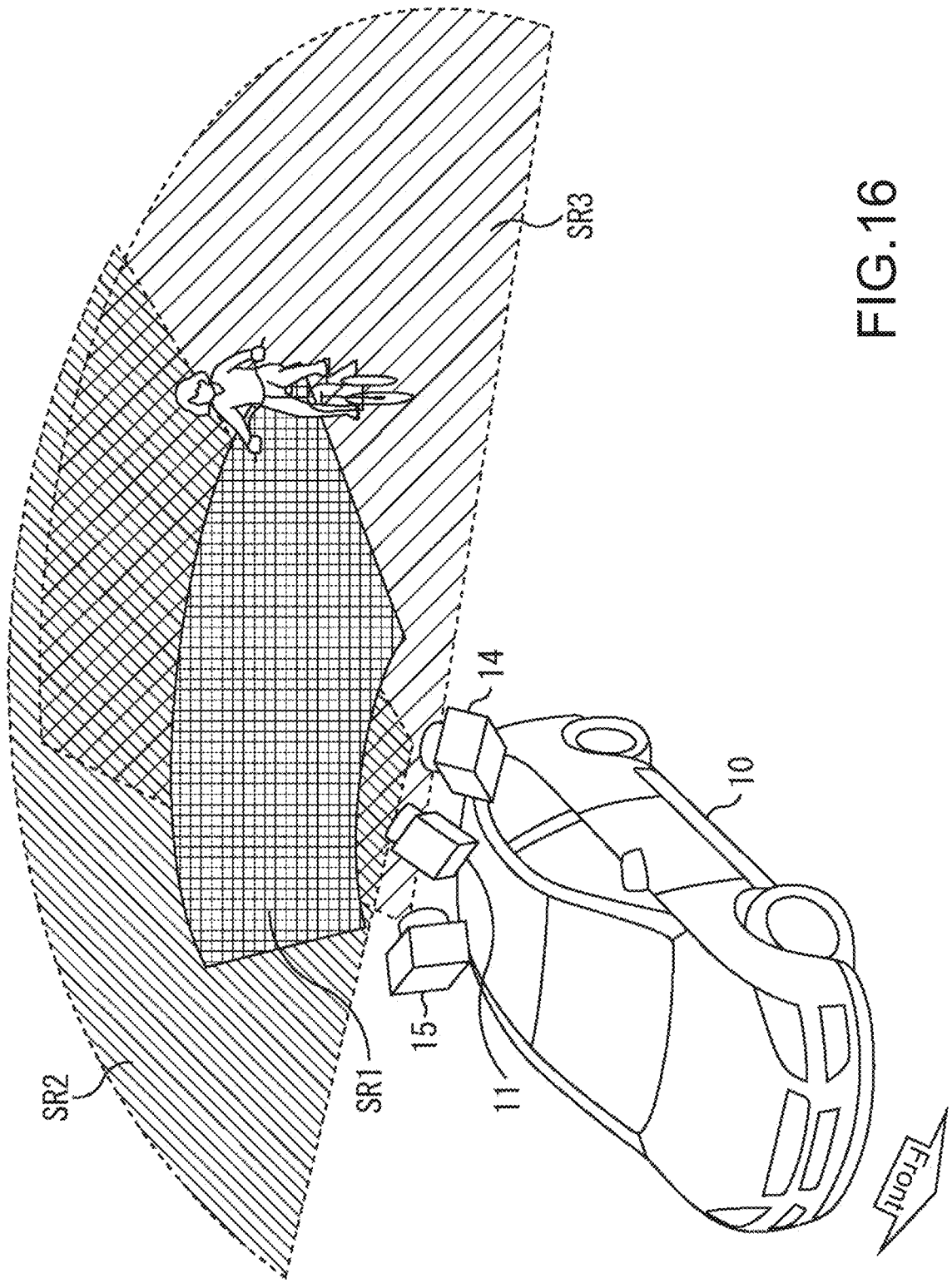
FIG. 16 is a perspective view illustrating an example of an installation position at which cameras for capturing an image serving as a low-speed CMS image are installed in a vehicle.

FIG. 16 is a perspective view illustrating an example of an installation position at which cameras for capturing an image serving as the low-speed CMS image are installed in the vehicle.

Note that, in FIGS. 15 and 16, portions corresponding to those of FIG. 3 are denoted by the same reference numerals, and the description thereof will be appropriately omitted below.

In FIGS. 15 and 16, similarly to FIG. 3, a rear camera 11 is installed on a rear part of a vehicle 10. Further, in the vehicle 10, an L rear side camera 14 is installed at a rear left position of the vehicle 10, and an R rear side camera 15 is installed at a rear right position of the vehicle 10.

Note that the L side camera 12 and the R side camera 13 of FIG. 3 are not illustrated in FIGS. 15 and 16.

For example, the L rear side camera 14 captures an image of the center projection having a horizontal angle of view of about 90° to 100° and outputs the image. Here, the image captured by the L rear side camera 14 is also referred to as an "L rear side image."

In order to image a right rear situation just behind the vehicle 10, that is, to cause the right rear situation just behind the vehicle 10 to be shown in the L rear side image, the L rear side camera 14 is installed at a left rear position of the vehicle 10 which is an opposite side to a right rear direction which is an imaging direction with respect to a width-direction center line WCL which is the center in the vehicle width direction of the vehicle 10 so that an optical axis faces in the imaging direction (the right rear direction).

Note that the L rear side camera 14 is installed so that, for example, (a part of) the rear part of the vehicle 10 is shown in the rear side image.

For example, the R rear side camera 15 captures an image of the center projection having a horizontal angle of view of about 90° to 100° and outputs the image, similarly to the L rear side camera 14. Here, the image captured by the R rear side camera 15 is also referred to as an "R rear side image."

The R rear side camera 15 is installed to be line-symmetrical to the L rear side camera 14 with respect to the width-direction center line WCL.

In order to image a left rear situation just behind the vehicle 10, that is, to cause the left rear situation just behind the vehicle 10 to be shown in the R rear side image, the R rear side camera 15 is installed at a right rear position of the vehicle 10 which is an opposite side to a left rear direction which is an imaging direction with respect to the width-direction center line WCL so that an optical axis faces in the imaging direction (the left rear direction).

Note that the R rear side camera 15 is installed so that, for example, (a part of) the rear part of the vehicle 10 is shown in the rear side image.

Further, the optical axes of the L rear side camera 14 and the R rear side camera 15 intersect on the width-direction center line WCL.

Since the L rear side camera 14 and the R side camera 15 are installed at the rear positions of the vehicle 10 which are the opposites to the imaging directions with respect to the width-direction center line WCL so that the optical axes face in the imaging directions as described above, it is possible to image a wide range of situation behind the vehicle 10 including the situation just behind the vehicle 10 and the right and left rear situations of the vehicle 10 (near the rear side of the rear wheel of the vehicle 10 or the like). In other words, since the L rear side camera 14 and the R side camera 15 are installed in an oblique direction from one side in the rear of the vehicle body, it is possible to image a range serving as a viewing angle in which the rear part of the vehicle body can be included at an infinite distance on the rear side in the vehicle traveling direction.

As a result, it is possible to provide a combined image with little blind spot for the rear part of vehicle 10.

In FIGS. 15 and 16, SR1, SR2, and SR3 indicate imaging ranges of the rear camera 11, the L rear side camera 14, and the R rear side camera 15.

According to the imaging ranges SR2 and SR3, it is possible to check that a wide range of situations behind the vehicle 10 can be imaged through the L rear side camera 14 and the R rear side camera 15.

Note that the L rear side image and the R rear side image are hereinafter referred to collectively as "L/R rear side images."

Figure 17:
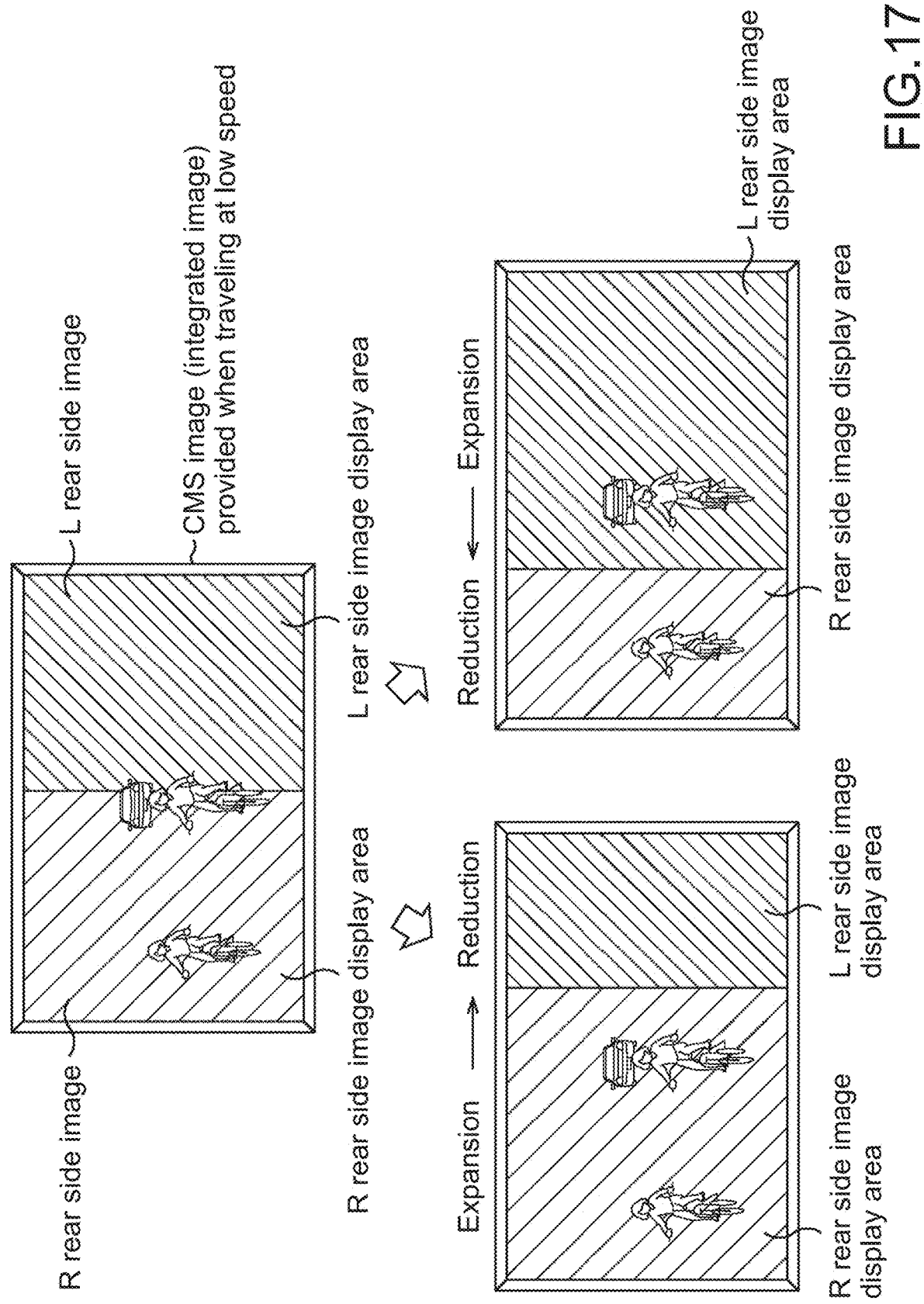
FIG. 17 is a diagram illustrating an example of an integrated image serving as a low-speed CMS image.

FIG. 17 is a diagram illustrating an example of the integrated image serving as the low-speed CMS image.

In FIG. 17, the integrated image is constructed by arranging the R rear side image and the L rear side image in the left area and the right area of the integrated image serving as the CMS image.

In other words, the integrated image of FIG. 17 is generated such that the R rear side image and the L rear side image are arranged on the left side and the right side, respectively, and combined.

Here, since the "left" rear situation of the vehicle 10 is shown in the "R" rear side image, the R rear side image is arranged on the "left" side of the integrated image. Similarly, since the "right" rear situation of the vehicle 10 is shown in the "L" rear side image, the L rear side image is arranged on the "right" side of the integrated image.

Hereinafter, an area in which the R rear side image of the integrated image serving as the CMS image is arranged is also referred to as an "R rear side image display area," and an area in which the L rear side image is arranged is also referred to as an "L rear side image display area."

In the R rear side image display area, a range of an angle of view corresponding to the R rear side image display area is clipped from the R rear side image captured by the R rear side camera 15, and the rear side image of the range is arranged. Similarly, in the L rear side image display area, a range of an angle of view corresponding to the L rear side image display area is clipped from the L rear side image captured by the L rear side camera 14, and the L rear side image of the range is arranged.

A boundary between the R rear side image display area and the L rear side image display area can be fixed, for example, to a position of a midpoint of the integrated image in the horizontal direction.

Further, the boundary between the R rear side image display area and the L rear side image display area can be moved in the right-left direction (horizontal direction) in accordance with the state of the driver such as the position of the head of the driver or a direction of the line of sight.

In a case in which the boundary between the R rear side image display area and the L rear side image display area is moved to the right side, the R rear side image display area is expanded in the horizontal direction, and the L rear side image display area is reduced in the horizontal direction.

In this case, the angle of view of the R rear side image arranged in the R rear side image display area in the horizontal direction is increased, and thus the driver can check a wide range of left rear situation shown in the R rear side image.

On the other hand, in a case in which the boundary between the R rear side image display area and the L rear side image display area is moved to the left side, the R rear side image display area is reduced in the horizontal direction, and the L rear side image display area is expanded in the horizontal direction.

In this case, the angle of view of the L rear side image arranged in the L rear side image display area in the horizontal direction is increased, and the driver can check a wide range of right rear situation shown in the L rear side image.

Figure 18:
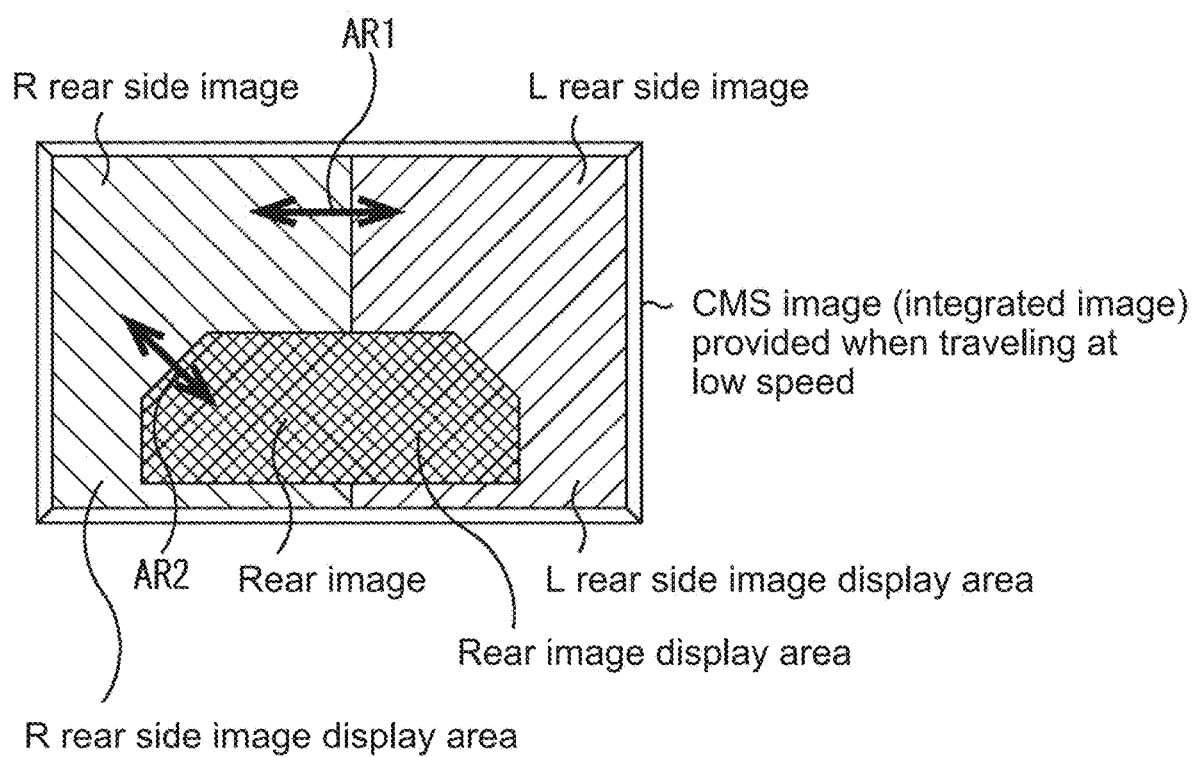
FIG. 18 is a diagram illustrating another example of an integrated image serving as a low-speed CMS image.

FIG. 18 is a diagram illustrating another example of the integrated image serving as the low-speed CMS image.

In FIG. 18, the integrated image is configured by arranging the R rear side image and the L rear side image in the left area and the right area of the integrated image serving as the CMS image and placing the rear image in the central area of the integrated image.

In other words, the integrated image of FIG. 18 is generated such that the R rear side image and the L rear side image are arranged on the left side and the right side, respectively, and combined, and the rear image is synthesized (superimposed) at the center of the image obtained by the combining.

Here, the area of the combined image in which the rear image is arranged is also referred to as a "rear image display area."

In the rear image display area, a range of an angle of view corresponding to the rear image display area is clipped from the rear image captured by the rear camera 11, and the rear image of the range is arranged.

In the combined image of FIG. 18, similarly to the example of FIG. 17, the boundary between the R rear side image display area and the L rear side image display area can be fixed to the position of the midpoint of the integrated image in the horizontal direction and can be moved in the right-left direction in accordance with the state of the driver as indicated by an arrow AR1.

Further, in the combined image of FIG. 18, the rear image display area may be a fixed area or a variable area.

In a case in which the rear image display area is a variable area, for example, the entire rear image display area can be expanded or reduced in accordance with the state of the driver such as the position of the head of the driver as indicated by an arrow AR2.

In other words, for example, in a case in which the head of the driver moves forward from the default state, the rear image display area can be expanded in accordance with the movement amount of the movement. In this case, the angle of view of the rear image arranged in the rear image display area is increased, and thus the driver can check a wide range of rear situation shown in the rear image.

Further, for example, in a case in which the head of the driver moves backward from the default state, the rear image display area can be reduced in accordance with the movement amount of the movement.

For example, the combined image of FIGS. 17 and 18 is useful particularly for the purpose of Cross Traffic Alert (CTA) in a case in which the vehicle 10 moves backward in order to move into or out of a parking lot.

<CMS Image Displayed in a Case in which Vehicle Travels at Low to Medium Speed>

Figure 19:
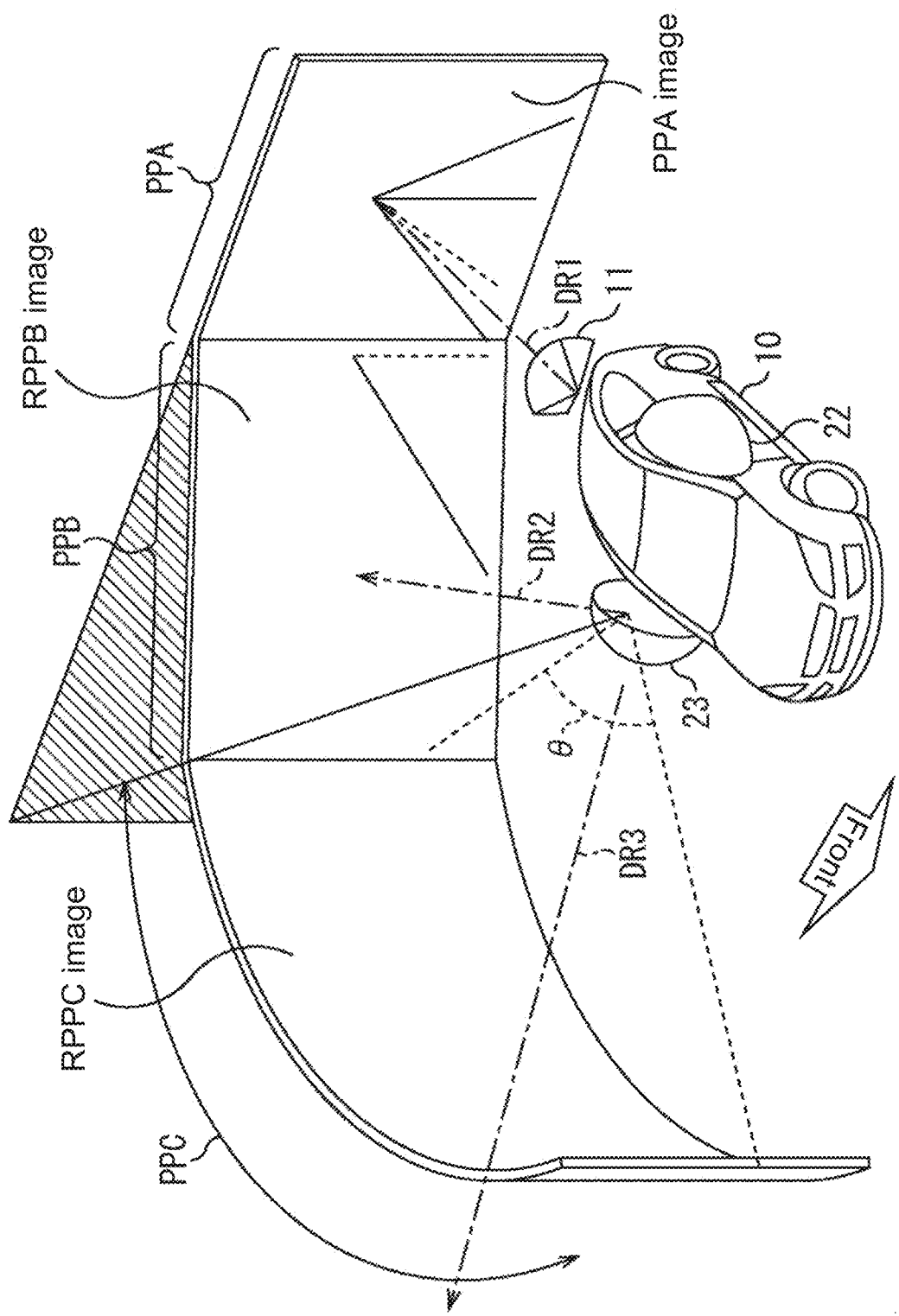
FIG. 19 is a perspective view illustrating an example of an installation position at which cameras for capturing an image serving as a CMS image displayed in a case in which a vehicle travels at a low to medium speed are installed in a vehicle.

FIG. 19 is a perspective view illustrating an example of an installation position at which cameras for capturing an image serving as a CMS image displayed in a case in which the vehicle travels at a low to medium speed (hereinafter also referred to as a "medium-speed CMS image") are installed in the vehicle.

Note that, in FIG. 19, portions corresponding to those of FIG. 3 are denoted by the same reference numerals, and the description thereof will be appropriately omitted below.

In FIG. 19, similarly to FIG. 3, a rear camera 11 is installed on a rear part of a vehicle 10. Further, in the vehicle 10, an L side camera 22 is installed at a left side mirror position of the vehicle 10, and an R side camera 23 is installed at a right side mirror position of the vehicle 10.

The L side camera 22 is a spherical camera capable of performing (almost) omnidirectional imaging such as, for example, a fish eye camera and is installed so that an optical axis faces in the left direction of the vehicle 10.

The L side camera 22 captures an image in which an omnidirectional (360°) situation around an axis extending in the left direction of the vehicle 10 is shown, and outputs the image as the L side image. A wide range of situation ranging from the left front to the left direction of the vehicle 10 and further from the left direction to the left rear is shown in the L side image.

Similarly to the L side camera 22, for example, the R side camera 23 is a spherical camera capable of performing (almost) omnidirectional imaging such as, for example, a fish eye camera and is installed so that an optical axis faces in a right direction DR3 of the vehicle 10.

The R side camera 23 captures an image in which an omnidirectional situation around an axis extending in the right direction DR3 of the vehicle 10 is shown, and outputs the image as the R side image. A wide range of situation ranging from the right front to the right direction of the vehicle 10 and further from the right direction to the right rear is shown in the R side image.

Here, a plane of a predetermined size perpendicular to a direction DR1 of the optical axis of the rear camera 11 (a rear direction of the vehicle 10) is defined at a position which is apart from the installation position of the rear camera 11 by a predetermined distance in the direction DR1 as a projection plane PPA.

Further, a plane of a predetermined size perpendicular to a right rear direction DR2 of the vehicle 10 is defined at a position which is apart from the installation position of the R side camera 23 by a predetermined distance in the direction DR2 as a projection plane PPB. Here, a vertical length of the projection plane PPB coincides with a vertical length of the projection plane PPA. A horizontal length of the projection plane PPB need not necessarily coincide with a horizontal length of the projection plane PPA.

Further, a curved projection plane PPC is defined at a position which is apart from the installation position of the R side camera 23 by a predetermined distance in a right direction DR3 of the vehicle 10.

A vertical length of the projection plane PPC coincides with the vertical lengths of the projection planes PPA and PPB.

The projection plane PPC is a part of a side surface of a cylinder having a radius of a predetermined distance centering on the installation position of the R side camera 23.

Note that the projection plane PPC can be defined so that a right direction DR3 of the vehicle 10 is a direction in which an angle θ formed by right and left end points of the projection plane PPC and the installation position of the R side camera 23 is equally divided.

Here, an image of the center projection projected onto the projection plane PPA when viewed from the installation position of the rear camera 11 is referred to as a "PPA image." Further, an image of the center projection projected onto the projection plane PPB when viewed from the installation position of the R side camera 23 is referred to as an "RPPB image." Further, an image of center projection projected onto the projection plane PPC when viewed from the installation position of the R side camera 23 is referred to as an "RPPC image."

A situation behind the vehicle 10 is shown in the PPA image. A right rear situation of the vehicle 10 is shown in the RPPB image. A situation in (the range in the horizontal direction corresponding to the angle θ centering on) the right direction DR3 of the vehicle 10 is shown in the RPPC image.

The PPA image can be obtained from the rear image captured by the rear camera 11. The RPPB image and the RPPC image can be obtained from the R side image captured by the R side camera 23.

Similarly, images corresponding to the RPPB image and the RPPC image can be obtained from the L side image captured by the L side camera 22.

Hereinafter, an image corresponding to the RPPB image obtained from the L side image is referred to as an "LPPB image," and an image corresponding to the RPPC image obtained from the L side image is referred to as an "LPPC image."

Since the right rear situation of the vehicle 10 is shown in the RPPB image as described above, for example, the RPPB image corresponds to the R side image captured by the R side camera 13 of FIG. 3. Similarly, for example, the LPPB image corresponds to the L side image captured by the L side camera 12 of FIG. 3.

Further, the PPA image is the rear image, and thus according to the PPA image, the LPPB image, and the RPPB image, the integrated image of the third display method (FIGS. 8 and 10), the integrated image of the fourth display method (FIGS. 9 and 10), the integrated image on which the alert mark is superimposed (FIG. 12 and the like), and further the synthetic images included in these integrated images can be generated.

Figure 20:
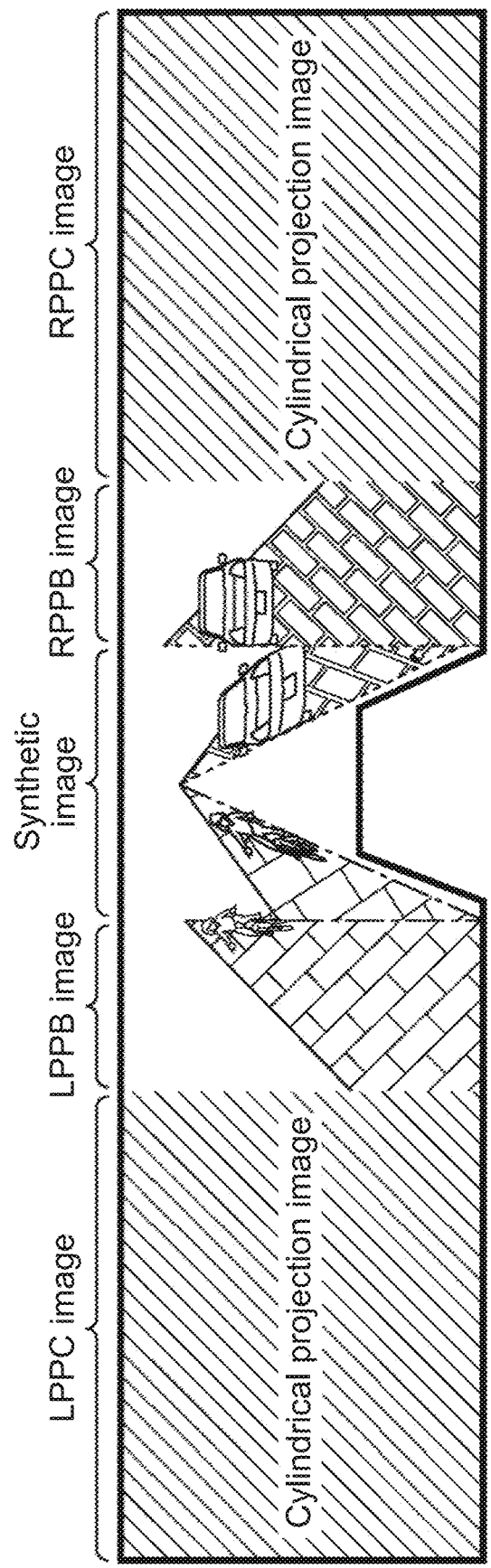
FIG. 20 is a diagram illustrating a first example of an integrated image serving as a medium-speed CMS image.

FIG. 20 is a diagram illustrating a first example of an integrated image serving as a medium-speed CMS image.

The integrated image of FIG. 20 can be generated by generating the synthetic image using the PPA image (rear image), the LPPB image, and the RPPB image, arranging the LPPB image and the LPPC image on the left side of the synthetic image, combining the LPPB image and the LPPC image, arranging the RPPB image and the RPPC image on the right side of the synthetic image, and combining the RPPB image and the RPPC image.

According to the integrated image of FIG. 20, the driver can check the rear (just rear), left rear, right rear, left, and right situations of the vehicle 10.

Further, according to the combined image of FIG. 20, since the LPPC image and the RPPC image are images of the cylindrical projection, a wide range of left side and right side of the vehicle can be shown, and the driver can check such a wide range.

Note that the integrated image can be configured without arranging the LPPB image and the RPPB image, that is, can be configured by arranging the LPPC image on the left side of the synthetic image and arranging the RPPC image on the right side of the synthetic image.

Further, for the integrated image of FIG. 20, the PPA image (rear image) itself can be arranged instead of the synthetic image in which the PPA image is synthesized.

Figure 21:
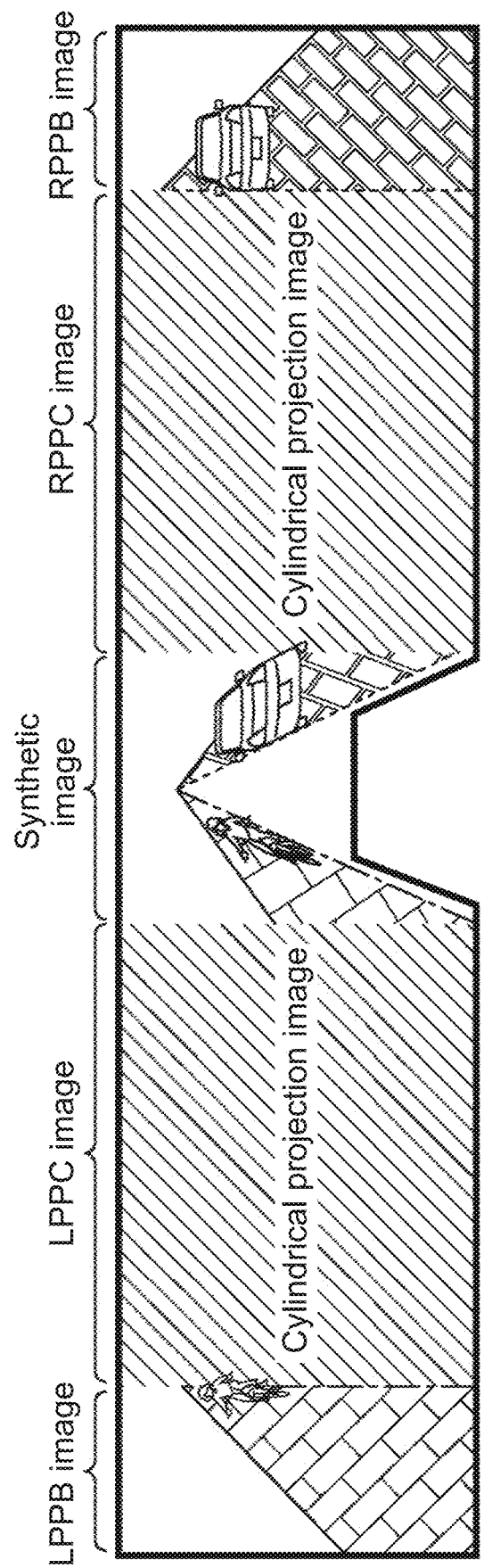
FIG. 21 is a diagram illustrating a second example of an integrated image serving as a medium-speed CMS image.

FIG. 21 is a diagram illustrating a second example of the integrated image serving as the medium-speed CMS image.

In the integrated image of FIG. 21, as compared with the example of FIG. 20, the arrangement positions of the LPPB image and the LPPC image are switched, and the arrangement positions of the RPPB image and the RPPC image are switched.

Figure 22:
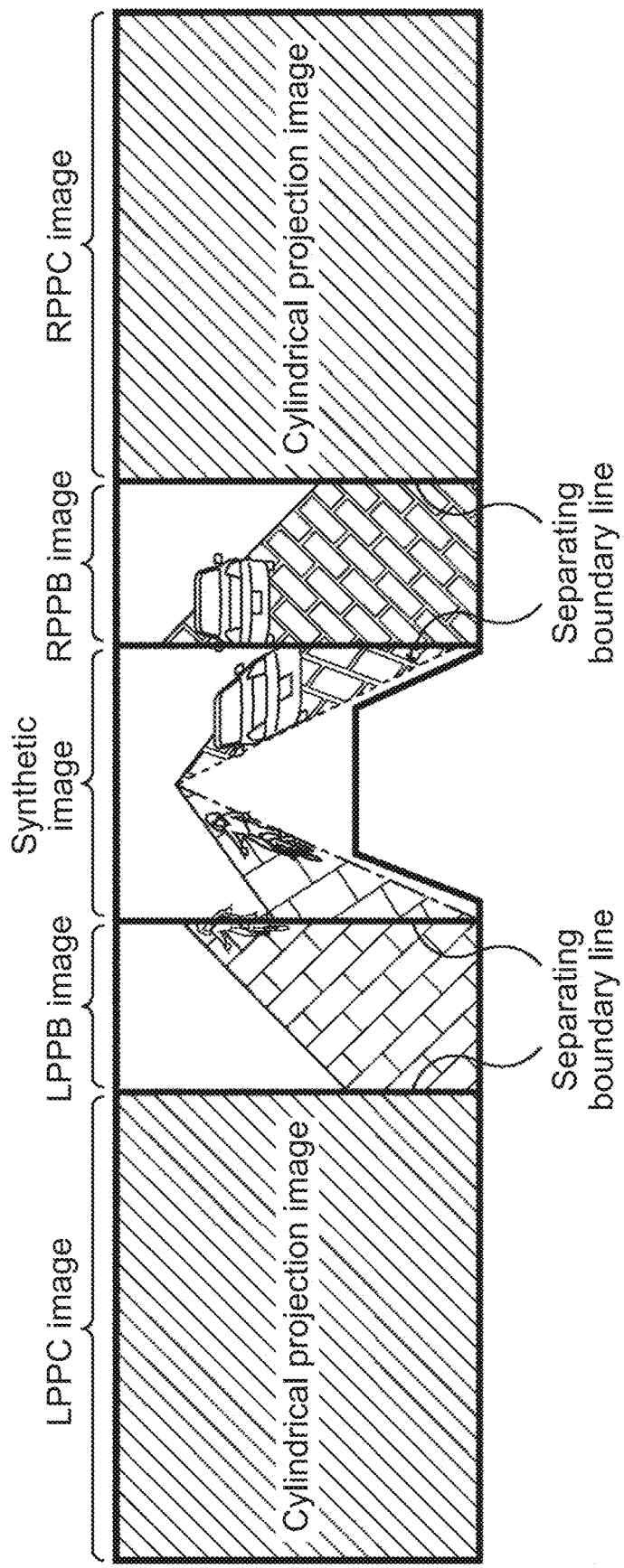
FIG. 22 is a diagram illustrating a third example of an integrated image serving as a medium-speed CMS image.

FIG. 22 is a diagram illustrating a third example of the integrated image serving as the medium-speed CMS image.

In the integrated image of FIG. 22, the separating boundary lines described with reference to FIG. 13 are arranged between the synthetic image and the LPPB image, between the synthetic image and the RPPB image, between the LPPB image and the LPPC image, and between the RPPB image and the RPPC image.

Accordingly, the driver can easily and consciously separate and recognize the synthetic image, the LPPB image, the RPPB image, the LPPC image, and the RPPC image arranged in the integrated image.

Note that the separating boundary lines can be arranged even in the integrated image of FIG. 21.

Figure 23:
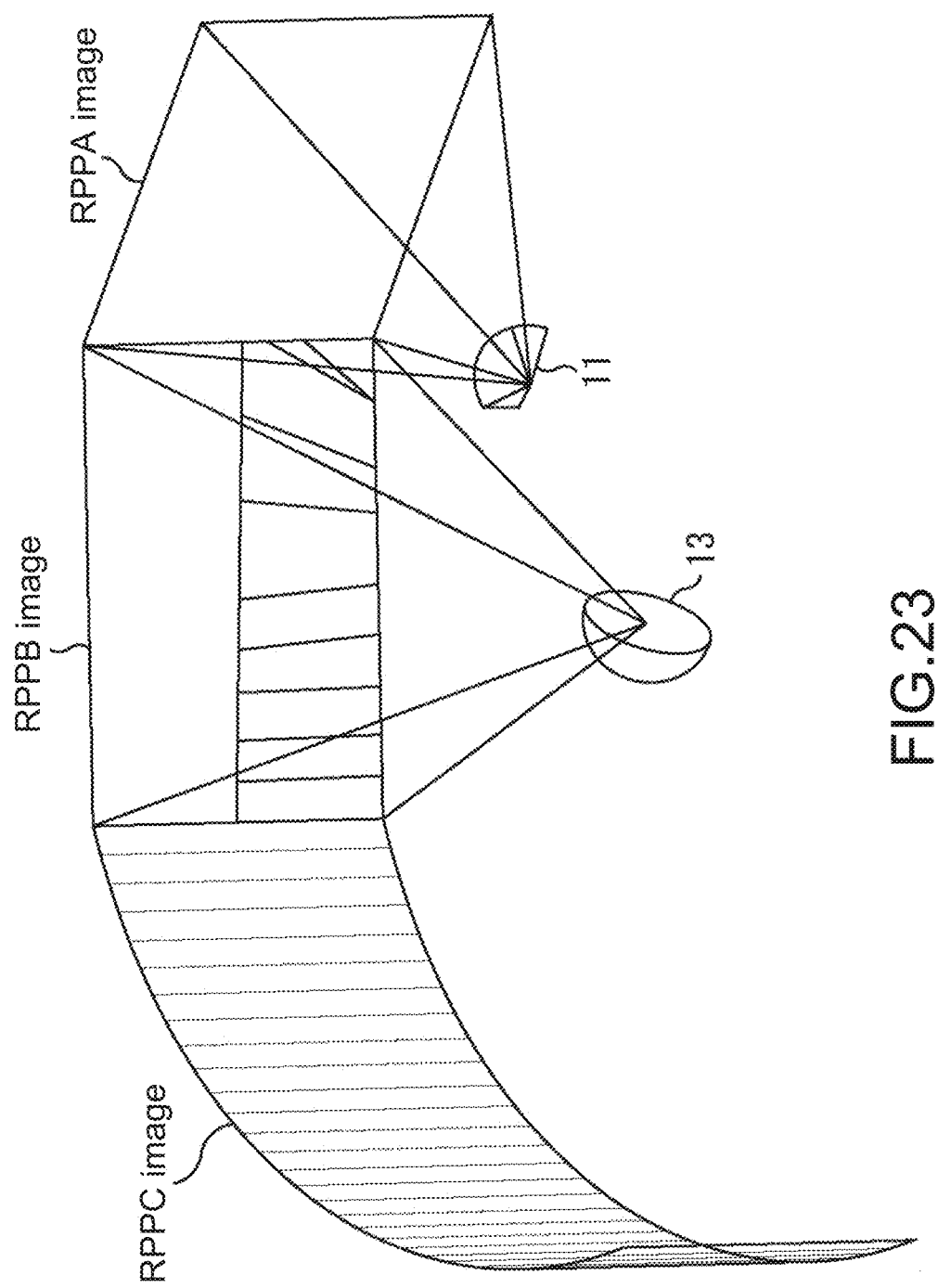
FIG. 23 is a diagram for describing a fourth example of an integrated image serving as a medium-speed CMS image.

FIG. 23 is a diagram for describing a fourth example of the integrated image serving as the medium-speed CMS image.

For example, an RPPB image on which the affine transform has been performed so that an infinite point of an area closer to the PPA image in a lower half of the RPPB image gets closer to an infinite point of the PPA image can be arranged in the integrated image. The arrangement of the infinite point is decided depending on the viewing angle of the camera actually installed in the vehicle, and the "lower half" of the RPPB image corresponds to a part below a horizontal line.

In FIG. 23, the lower half of the RPPB image is divided into substantially strips, and the affine transform (hereinafter also referred to as "stripe affine transform") is performed so that an infinite point of a stripe-like area closer to the PPA image is closer to the infinite point of the PPA image. Although not illustrated, the same applies to the LPPB image.

For example, in a case in which the integrated image is generated such that the LPPB image and the RPPB image are arranged on the left side and the right side of the PPA image or the synthetic image in which the PPA image is synthesized, the LPPC image is arranged on the left side of the LPPB image, and the RPPC image is arranged on the right side of the RPPB image, the LPPB image and the RPPB image which have undergone the stripe affine transform are employed as the LPPB image and the RPPB image to be arranged on the left side and the right side of the PPA image or the synthetic image, and thus an integrated image in which the infinite point seamlessly (gradually) gets closer to the infinite point of the PPA image or the synthetic image from each of the LPPB image and the RPPB image to the PPA image or the synthetic image, and a visually uncomfortable feeling is suppressed can be obtained.

Figure 24:
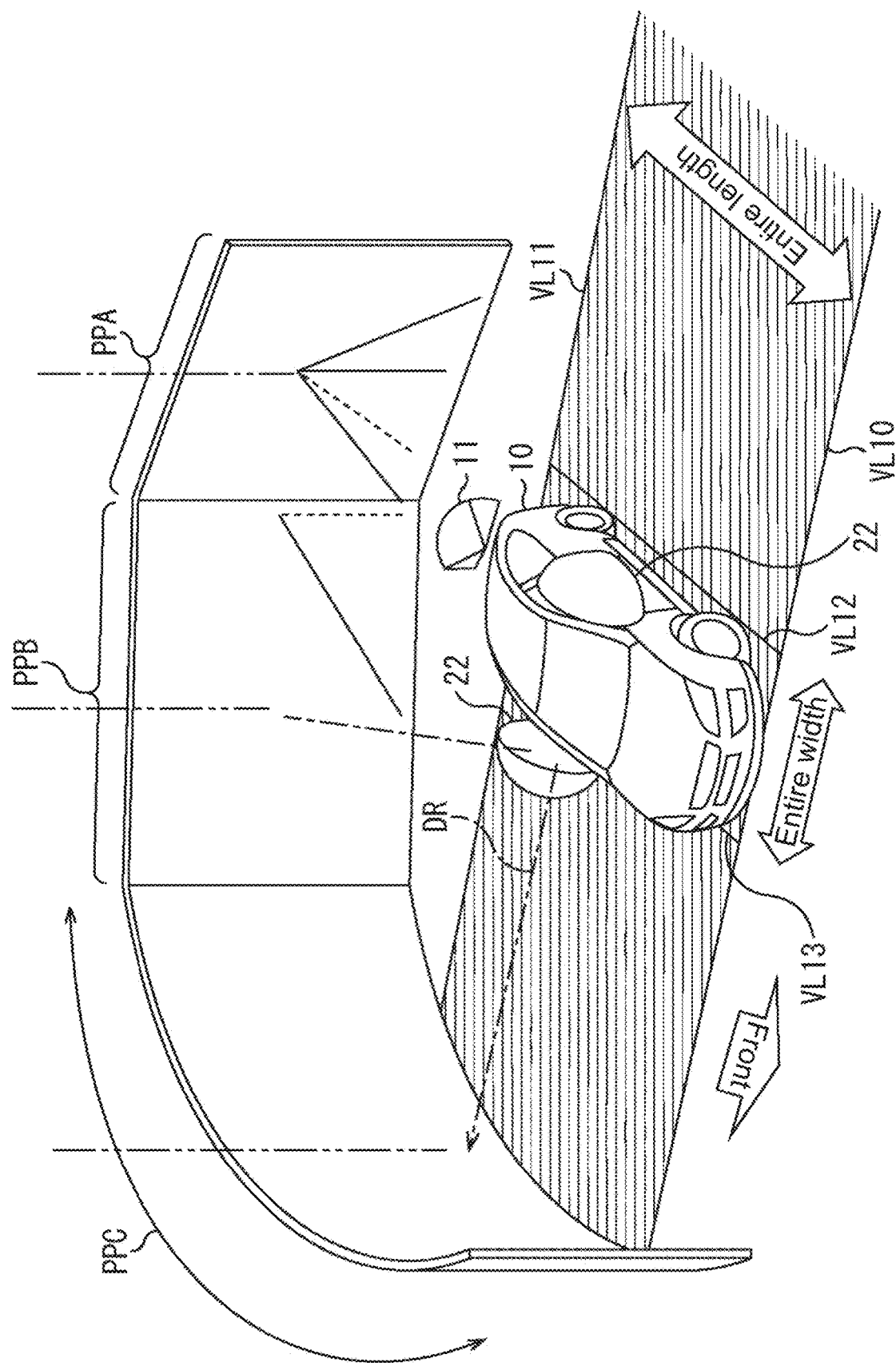
FIG. 24 is a diagram illustrating a fifth example of an integrated image serving as a medium-speed CMS image.

FIG. 24 is a diagram for describing a fifth example of the integrated image serving as the medium-speed CMS image.

In the integrated image serving as the medium-speed CMS image, virtual boundary lines VL10, VL11, VL12, and VL13 which are virtual boundary lines surrounding the vehicle 10 can be superimposed on the LPPC image and the RPPC image of the cylindrical projection.

Here, the virtual boundary line VL10 is a virtual straight line which comes into contact with a most protruding part in the front of the vehicle 10 and extends in the right-left direction, and the virtual boundary line VL11 is a virtual straight line which comes into contact with a most protruding part in the rear of the vehicle 10 and extends in the right-left direction.

The virtual boundary line VL12 is a virtual straight line which comes into contact with a most protruding part on the left side of the vehicle 10 and extends in the front-rear direction, and the virtual boundary line VL13 is a virtual straight line which comes into contact with a most protruding part on the right side of the vehicle 10 and extends in the front-rear direction.

Figure 25:
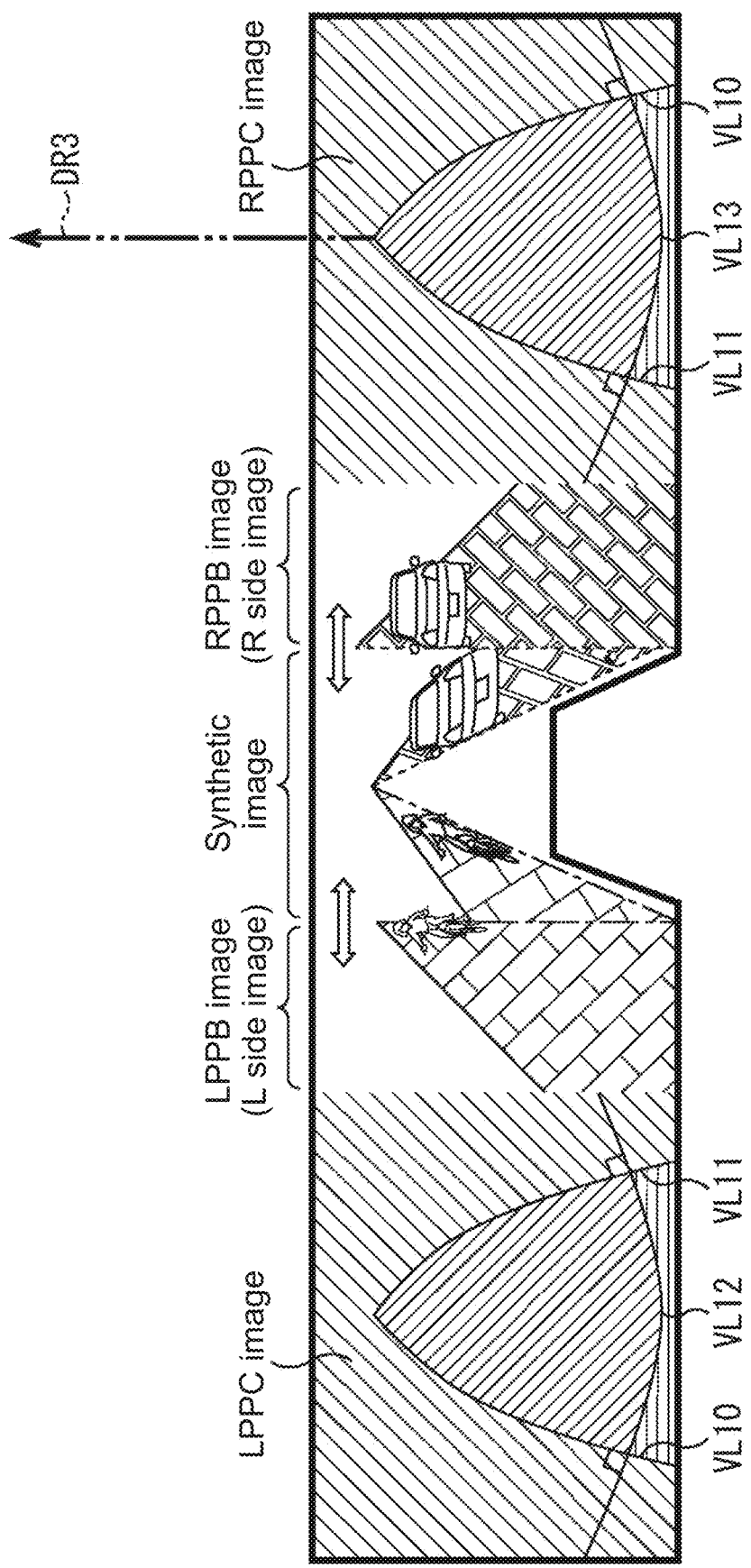
FIG. 25 is a diagram illustrating a fifth example of an integrated image serving as a medium-speed CMS image.

FIG. 25 is a diagram illustrating a fifth example of the integrated image serving as the medium-speed CMS image.

In the integrated image of FIG. 25, the virtual boundary lines VL10 to VL13 are superimposed on the LPPC image and the RPPC image of the cylindrical projection, and the integrated image of FIG. 25 differs from the example of FIG. 20.

According to the integrated image of FIG. 25, the driver can understand a relative positional relation between the object on the road and the vehicle 10 by the virtual boundary lines VL10 to VL13.

Although the high speed CMS image, the medium-speed CMS image, and the low-speed CMS image have been described above, in the CMS installed in the vehicle 10, the display of the CMS image can be appropriately switched to the high speed CMS image, the medium-speed CMS image, or the low-speed CMS image.

The switching of the CMS image can be performed in accordance with a state of the vehicle 10 (vehicle state) such as the speed of the vehicle 10. Further, the switching of the CMS image can also be performed in accordance with, for example, a manipulation of the driver or the like on the vehicle 10 or the state of the driver (driver state) such as the head position or the posture of the driver.

Here, the manipulation of the vehicle 10 includes, for example, a manipulation by voice or gesture in addition to a manipulation on a steering (handle), a shift lever, other mechanical manipulation devices.

For example, in a case in which the vehicle gets out of a narrow road or the vehicle takes out from a parking lot, or the like, the driver consciously moves forwards from the posture in which the upper body is seated stably (hereinafter also referred to as a "stable posture") and checks the left side and the right side in front of the vehicle.

The forward and backward movements of the upper body of the driver are different from actions which the driver is likely to unconsciously perform such as actions of moving the head up and down and are actions which the driver is likely to perform with clear consciousness for checking the left side and the right side in front of the vehicle or the like.

Further, the forward and backward movements of the upper body of the driver are highly likely to be performed in a state in which the driver holds the steering, are so-called standard actions with little variation in action, and can be detected with a relative high degree of accuracy.

In this regard, the forward movement of the upper part of the driver is detected as the driver state, and in a case in which the forward movement of the upper part of the driver is detected, for example, when the vehicles gets out of a narrow road, the display of the CMS image can be switched to the medium-speed CMS image or the low-speed CMS image which is useful for checking the left side and the right side in front of the vehicle.

Note that, as a method of detecting the forward and backward movements of the upper body of the driver as the driver state, there are a method of detecting an absolute movement amount and a method of detecting a relative movement amount within a short period of time at intervals of predetermined short periods of time. In order to detect the forward and backward movements of the upper body of the driver in a case in which the display of the CMS image is switched to the medium-speed CMS image or the low-speed CMS image, for example, the method of detecting the relative movement amount at intervals of short periods of time can be employed.

<One Embodiment of Vehicle to which Present Technology is Applied>

Figure 26:
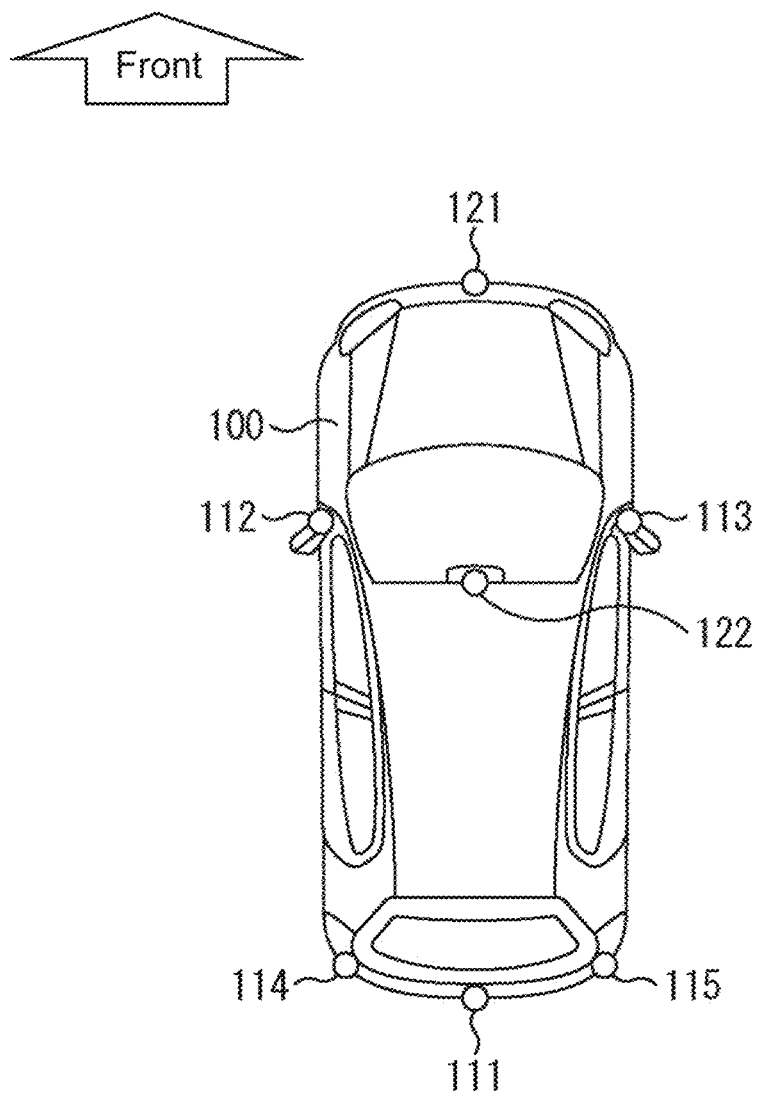
FIG. 26 is a plane view illustrating an overview of a configuration example of an external appearance of an embodiment of a vehicle to which the present technology is applied.

FIG. 26 is a plane view illustrating an overview of a configuration example of an external appearance of one embodiment of a vehicle to which the present technology is applied.

For example, the CMS is installed in a (its own) vehicle 100 which is an automobile or the like. Further, a rear camera 111, an L side camera 112, an R side camera 113, an L rear side camera 114, an R rear side camera 115, a front camera 121, an interior camera 122, and the like constituting the CMS are installed in the vehicle 100.

For example, the rear camera 111 is installed in a rear part of the vehicle 100, similarly to the rear camera 11 of FIG. 3. Further, for example, similarly to the rear camera of FIG. 3, the rear camera 111 images a view behind (just behind) the vehicle 100 at a predetermined frame rate and outputs a rear image of the center projection in which a rear situation is shown.

For example, similarly to the L side camera 22 of FIG. 19, the L side camera 112 is installed at a left side mirror position of the vehicle 100. Further, the L side camera 112 is a spherical camera capable of performing (almost) omnidirectional imaging and is installed so that an optical axis faces in the left direction of the vehicle 10, for example, similarly to the L side camera 22 of FIG. 19. Therefore, similarly to the L side camera 22 of FIG. 19, the L side camera 112 captures an image in which an omnidirectional situation around an axis extending in the left direction of the vehicle 10 is shown at a predetermined frame rate, and outputs the image as the L side image.

The R side camera 113 is installed at a right side mirror position of the vehicle 100, for example, similarly to the R side camera 23 of FIG. 19. Further, for example, the R side camera 113 is a spherical camera capable of performing omnidirectional imaging and is installed so that an optical axis faces in the left direction of the vehicle 10, for example, similarly to the R side camera 23 of FIG. 19. Therefore, similarly to the L side camera 23 of FIG. 19, the R side camera 113 captures an image in which an omnidirectional situation around an axis extending in the right direction of the vehicle 100 is shown at a predetermined frame rate, and outputs the image as the R side image.

For example, similarly to the L rear side camera 14 of FIGS. 15 and 16, for example, the L rear side camera 114 is installed at a left rear position of the vehicle 10 which is an opposite side to a right rear direction which is an imaging direction of the L rear side camera 114 so that an optical axis faces in the imaging direction (the right rear direction). Further, for example, similarly to the L rear side camera 14 of FIGS. 15 and 16, the L rear side camera 114 captures an image of the center projection having the horizontal angle of view of about 90° to 100° at a predetermined frame rate, and outputs an L rear side image obtained accordingly.

For example, similarly to the R rear side camera 15 of FIG. 15 and FIG. 16, the R rear side camera 115 is installed at a right rear position of the vehicle 10 which is an opposite side to a left rear direction which is an imaging direction of the R rear side camera 115 so that an optical axis faces in the imaging direction (the left rear direction). Further, for example, similarly to the R rear side camera 15 of FIG. 15 and FIG. 16, the R rear side camera 115 captures an image of the center projection having a horizontal angle of view of about 90° to 100° at a predetermined frame rate, and outputs an R rear side image obtained accordingly.

For example, the front camera 121 is installed in the front part of the vehicle 100. The front camera 121 images a front view of the vehicle 100 at a predetermined frame rate and outputs a front image in which a front situation is shown.

For example, the interior camera 122 is installed at a position of the rearview mirror or a position of a shaft upper part of a steering wheel. For example, the interior camera 122 images the driver steering (driving) the vehicle 100 at a predetermined frame rate, and outputs an image obtained accordingly.

Note that, in addition to the rear camera 111, the L side camera 112, the R side camera 113, the L rear side camera 114, the R rear side camera 115, the front camera 121, and the interior camera 122, a camera can be installed in the vehicle 100.

<Configuration Example of CMS Installed in Vehicle 100>

Figure 27:
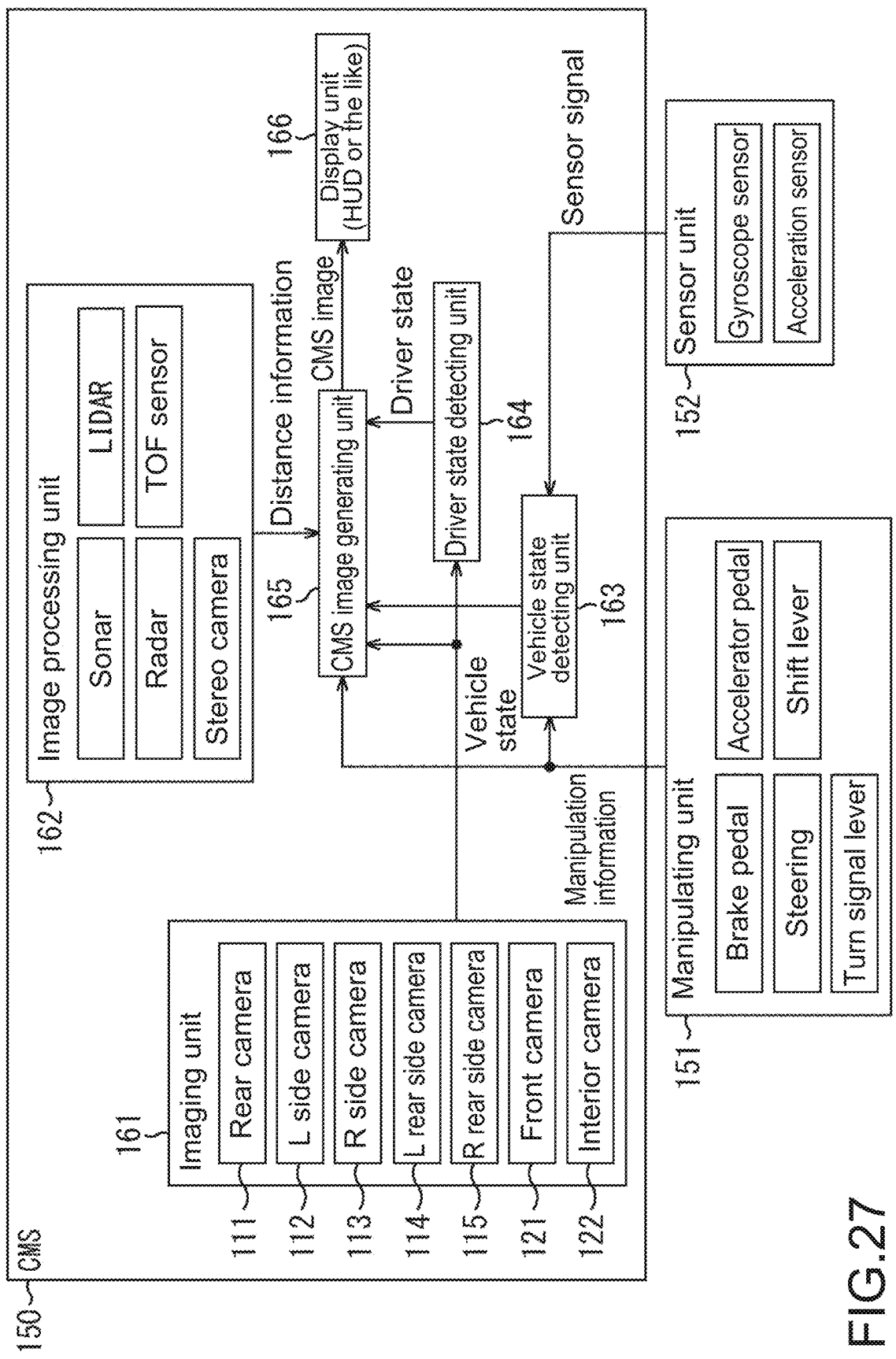
FIG. 27 is a block diagram illustrating a configuration example of a CMS installed in a vehicle 100.

FIG. 27 is a block diagram illustrating a configuration example of the CMS installed in the vehicle 100.

In FIG. 27, a CMS 150 includes an imaging unit 161, a distance detecting unit 162, a vehicle state detecting unit 163, a driver state detecting unit 164, a CMS image generating unit 165, and a display unit 166.

The imaging unit 161 includes a rear camera 111, an L side camera 112, an R side camera 113, an L rear side camera 114, an R rear side camera 115, a front camera 121, an interior camera 122, and the like.

The images (the rear image, the L side image, the R side image, the L rear side image, the R rear side image, the front image, the image obtained by imaging the driver, and the like) captured by the rear camera 111, the L side camera 112, the R side camera 113, the L rear side camera 114, the R rear side camera 115, the front camera 121, and the interior camera 122 in the imaging unit 161 are supplied to the driver state detecting unit 164 or the CMS image generating unit 165 if necessary.

The distance detecting unit 162 includes, for example, a sonar, a radar, a stereo camera, an LIDAR, a TOF sensor, or other ranging sensors. The distance detecting unit 162 detects a distance to the standing object or other objects near the vehicle 100 using an output of the ranging sensor and supplies distance information indicating the distance to the CMS image generating unit 165. Further, distance estimation may be performed by a camera alone using image processing.

Manipulation information from a manipulating unit 151 and a sensor signal from a sensor unit 162 are supplied to the vehicle state detecting unit 163.

Here, the manipulating unit 151 includes various kinds of manipulation devices which are installed in the vehicle 100 and managed for the driver or the like to steer the vehicle 100 such as, for example, a brake pedal, a steering wheel, a turn signal lever, an accelerator pedal, or a shift lever. Further, although not illustrated, the manipulation of the driver may be detected or recognized by other switchers or gesture sensors.

The manipulating unit 151 is manipulated by the driver or the like, and supplies manipulation information corresponding to the manipulation to the vehicle state detecting unit 163 and the CMS image generating unit 165.

A sensor unit 152 includes various kinds of sensors for sensing various kinds of physical quantities related to the vehicle 100 such as a gyroscope sensor and an acceleration sensor, and supplies sensor signals output from various kinds of sensors to the vehicle state detecting unit 163.

The vehicle state detecting unit 163 detects a vehicle state of the vehicle 100 on the basis of the manipulation information from the manipulating unit 151 or the sensor signal from the sensor unit 152 and supplies the vehicle state to the CMS image generating unit 165.

Examples of the vehicle state of the vehicle 100 include a speed range in which the vehicle 100 is traveling among the low speed, the medium speed, and the high speed and whether the vehicle 100 is moving forward or backward.

The image obtained by imaging the driver (driver seat) is supplied from the interior camera 122 of the imaging unit 161 to the driver state detecting unit 164.

The driver state detecting unit 164 detects the driver state of the driver, that is, the position of the head of the driver, the movement (rotation) of the head, the line of sight, the posture, the position of the upper body, the movement of the upper body, or the like from the image of the interior camera 122, and supplies the detected driver state to the CMS image generating unit 165. In addition, the state of the driver may be detected using the gesture sensor or the ToF sensor.

As described above, the manipulation information from the manipulating unit 151, the vehicle state from the vehicle state detecting unit 163, and the driver state from the driver state detecting unit 164 are supplied to the CMS image generating unit 165.

Further, the CMS image generating unit 165 receives the rear image, the L side image, the R side image, the L rear side image, the R rear side image, and the front image supplied from the rear camera 111, the L side camera 112, the R side camera 113, the L rear side camera 114, the R rear side camera 115, and the front camera 121 of the imaging unit 161.

The CMS image generating unit 165 sets a display mode in accordance with the manipulation information from the manipulating unit 151, the vehicle state from the vehicle state detecting unit 163, or the driver state from the driver state detecting unit 164.

Further, the CMS image generating unit 165 generates the integrated image serving as the CMS image corresponding to the display mode using the rear image, the L side image, the R side image, the L rear side image, the R rear side image, and the front image from the imaging unit 161, and supplies the integrated image to the display unit 166.

The display unit 166 is, for example, a Head Up Display (HUD) that displays an image on a windshield of the vehicle 100, a display installed in the dashboard, or the like, and displays the integrated image or the like serving as the CMS image from the CMS image generating unit 165.

<Display Mode>

Figure 28:
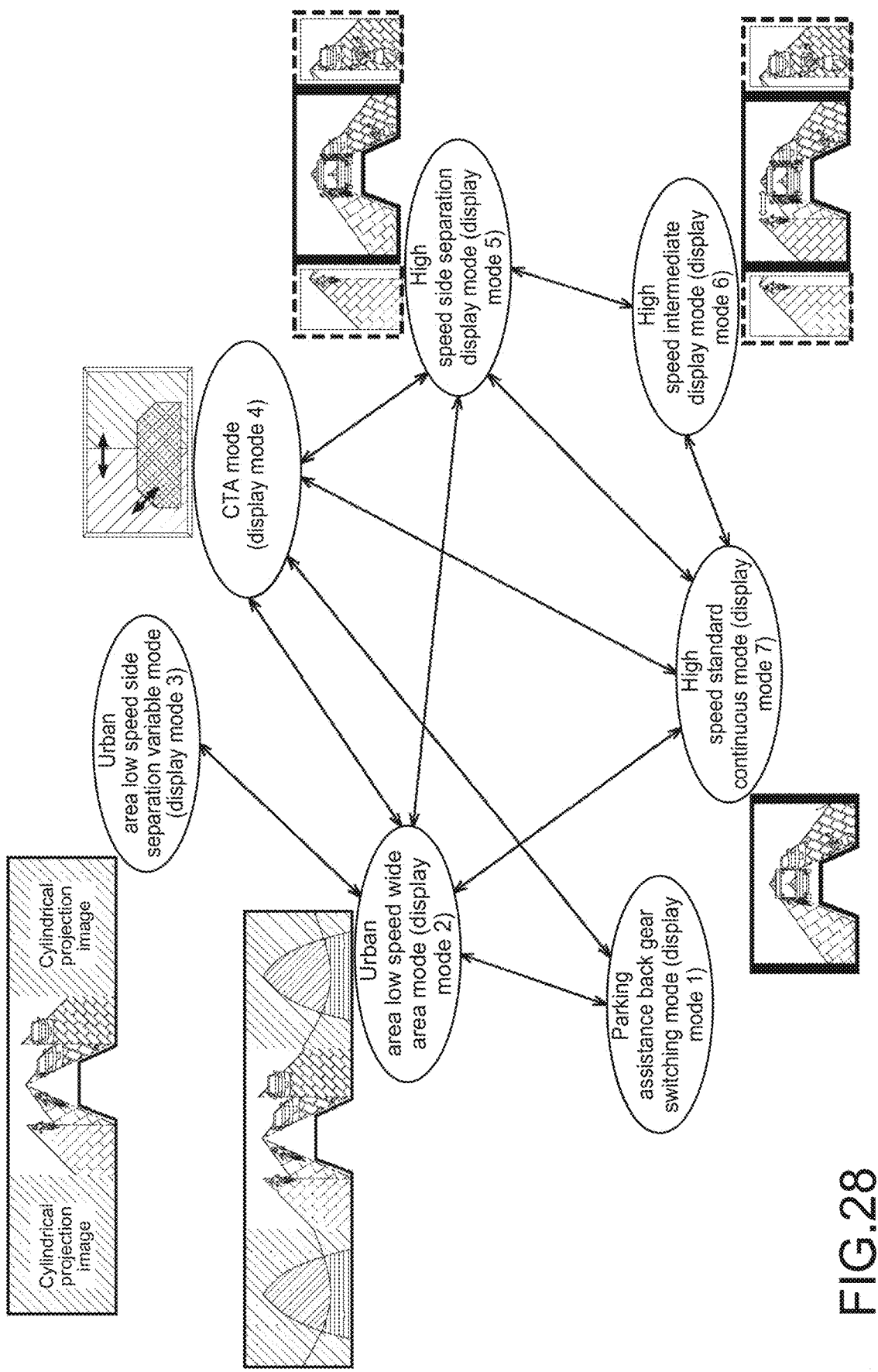
FIG. 28 is a diagram illustrating an example of a display mode set by a CMS image generating unit 165.

FIG. 28 is a diagram illustrating an example of the display mode set by the CMS image generating unit 165.

In FIG. 28, examples of the display mode include a parking assistance back gear switching mode, an urban area low speed wide area mode, an urban are low speed side separation variable mode, a CTA mode, a high speed side separation display mode, a high speed intermediate display mode, and a high speed standard continuous mode.

Further, in FIG. 28, transition of the display mode is limited to transitions indicated by arrows in the drawing. However, the transition of the display mode is not limited to the transitions indicated by the arrows in FIG. 28. In other words, for example, the display mode can perform transition from an arbitrary display mode to another arbitrary display mode.

Here, the parking assistance back gear switching mode, the urban area low speed wide area mode, the urban area low speed side separation variable mode, the CTA mode, the high speed side separation display mode, the high speed intermediate display mode, and the high speed standard continuous mode are also referred to as display modes 1, 2, 3, 4, 5, and 6, In the display mode 1, the CMS image generating unit 165 generates an image of a bird view or a surround view (bird's eye view image) in which an arear around the vehicle 100 including the vehicle 100 is overlooked from above the vehicle 100 as an image of the display mode 1, and outputs the generated image as the CMS image.

In the display mode 2 or 3, the CMS image generating unit 165 generates and outputs the integrated image serving as the medium-speed CMS image described with reference to FIGS. 19 to 25.

In other words, in the display mode 2, the CMS image generating unit 165 generates, for example, the integrated image of FIG. 25 as an integrated image of the display mode 2, and outputs the integrated image of the display mode 2 as the CMS image.

In the display mode 3, the CMS image generating unit 165 generates, for example, the integrated image of FIG. 22 as an integrated image of the display mode 3, and outputs the integrated image of the display mode 3 as the CMS image.

In the display mode 4, the CMS image generating unit 165 generates and outputs the integrated image serving as the low-speed CMS image described with reference to FIGS. 15 to 18.

In other words, in the display mode 4, the CMS image generating unit 165 generates, for example, the integrated image of FIG. 18 as an integrated image of the display mode 4, and outputs the integrated image of the display mode 4 as the CMS image.

In the display modes 5, 6, or 7, the CMS image generating unit 165 generates and outputs the integrated image serving as the high speed CMS image described with reference to FIGS. 12 to 14.

In other words, in the display mode 5, the CMS image generating unit 165 generates, for example, the integrated image of FIG. 13 as an integrated image of the display mode 5, and outputs the integrated image of the display mode 5 as the CMS image.

In the display mode 6, the CMS image generating unit 165 generates, for example, the integrated image of FIG. 14 as an integrated image of the display mode 6, and outputs the integrated image of the display mode 6 as the CMS image.

In the display mode 7, the CMS image generating unit 165 generates, for example, the integrated image of FIG. 12 as an integrated image of the display mode 7, and outputs the integrated image of the display mode 7 as the CMS image.

The CMS image generating unit 165 sets the display mode in accordance with the manipulation information from the manipulating unit 151, the vehicle state from the vehicle state detecting unit 163, or the driver state from the driver state detecting unit 164.

For example, in a case in which the manipulation information from the manipulating unit 151 indicates that the shift lever of the manipulating unit 151 (FIG. 27) is a back gear, the CMS image generating unit 165 can set the display mode 1 as the display mode.

Further, for example, in a case in which the vehicle state from the vehicle state detecting unit 163 indicates that the vehicle 100 is traveling at a medium speed, the CMS image generating unit 165 can set the display mode 2 or 3 as the display mode.

Further, for example, in a case in which the vehicle state from the vehicle state detecting unit 163 indicates that the vehicle 100 is traveling at a low speed, the CMS image generating unit 165 can set the display mode 4 as the display mode.

Further, for example, in a case in which the vehicle state from the vehicle state detecting unit 163 indicates that the vehicle 100 is traveling at a high speed, the CMS image generating unit 165 sets the display mode 5, 6, or 7 as the display mode. For example, the vehicle state indicating that the vehicle 100 is traveling at a low speed for parking or the like, the vehicle state indicating that the vehicle 100 is traveling at a medium speed for urban area traveling or the like, and the vehicle state indicating that the vehicle 100 is traveling at a high speed in a freeway or the like can be detected using Global Navigation Satellite System (GNSS), navigation, or navigation planning information appropriately.

Further, for example, in a case in which the manipulation information from the manipulating unit 151 indicates that the manipulating unit 151 is manipulated to designate a predetermined display mode, the CMS image generating unit 165 can set the predetermined display mode according to the manipulation of the manipulating unit 151 as the display mode.

Further, for example, in a case in which the driver state from the driver state detecting unit 164 indicates that the driver takes a stable posture, the CMS image generating unit 165 can set the display mode 5, 6, or 7 as the display mode.

Further, for example, in a case in which the driver state from the driver state detecting unit 164 indicates that the upper body of the driver moves forward, the CMS image generating unit 165 can set the display mode 2, 3, or 4 as the display mode.

<Configuration Example of CMS Image Generating Unit 165>

Figure 29:
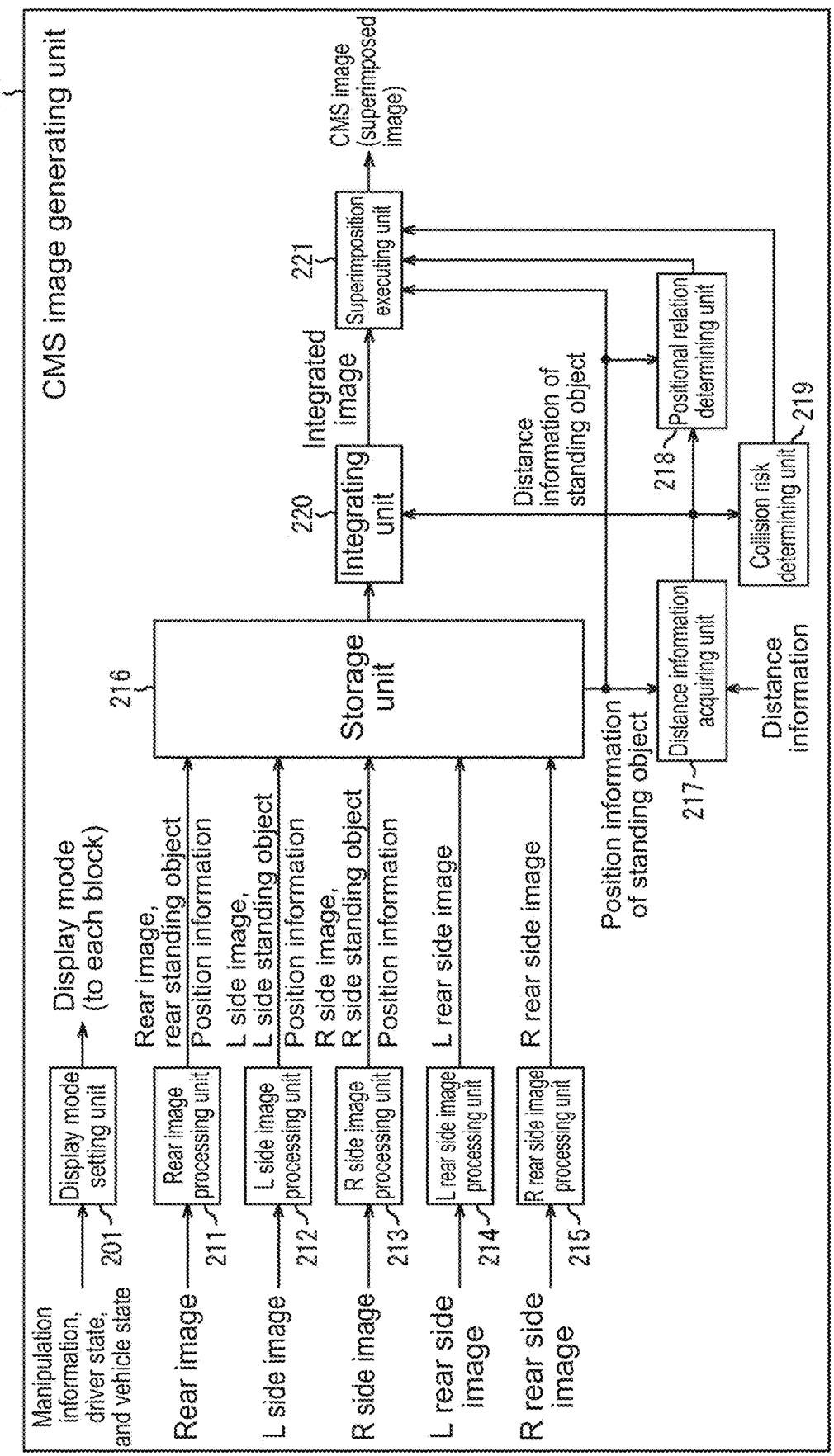
FIG. 29 is a block diagram illustrating a configuration example of a CMS image generating unit 165.

FIG. 29 is a block diagram illustrating a configuration example of the CMS image generating unit 165 of FIG. 27.

In FIG. 29, the CMS image generating unit 165 includes a display mode setting unit 201, a rear image processing unit 211, an L side image processing unit 212, an R side image processing unit 213, an L rear side image processing unit 214, an R rear side image processing unit 215, a storage unit 216, a distance information acquiring unit 217, a positional relation determining unit 218, a collision risk determining unit 219, an integrating unit 220, and a superimposition executing unit 221.

The manipulation information from the manipulating unit 151 (FIG. 27) is supplied to display mode setting unit 201. Further, the vehicle state from the vehicle state detecting unit 163 (FIG. 27) and the driver state from the driver state detecting unit 164 (FIG. 27) are supplied to the display mode setting unit 201.

The display mode setting unit 201 sets a display mode related to the display of the integrated image in accordance with at least one of the manipulation information from the manipulating unit 151, the vehicle state from the vehicle state detecting unit 163, or the driver state from the driver state detecting unit 164, and supplies it to the integrating unit 220 and other necessary blocks.

The rear image is supplied from the rear camera 111 (FIG. 27) to the rear image processing unit 211. The rear image processing unit 211 performs image processing corresponding to the display mode on (each frame of) the rear image supplied from the rear camera 111, and supplies the rear image which has undergone the image processing, the standing object (rear standing object) shown in the rear image, and the position information indicating the position of the rear standing object on the rear image to the storage unit 216.

The L side image is supplied from the L side camera 112 (FIG. 27) to the L side image processing unit 212. The L side image processing unit 212 performs image processing corresponding to the display mode on (each frame of) the L side image supplied from the L side camera 112, and supplies the L side image which has undergone the image processing, the standing object (L side standing object) shown in the L side image, and the position information indicating the position of the L side standing object on the L side image to the storage unit 216.

The R side image is supplied from the R side camera 113 (FIG. 27) to the R side image processing unit 213. The R side image processing unit 213 performs image processing corresponding to the display mode on (each frame of) the R side image supplied from the R side camera 113, and supplies the R side image which has undergone the image processing, the standing object (R side standing object) shown in the R side image, and the position information indicating the position of the R side standing object on the R side image to the storage unit 216.

The L rear side image is supplied from the L rear side camera 114 (FIG. 27) to the L rear side image processing unit 214. The L side image processing unit 214 performs image processing corresponding to the display mode on (each frame of) the L rear side image supplied from the L rear side camera 114 and supplies the L rear side image which has undergone the image processing to the storage unit 216.

The R rear side image is supplied from the R rear side camera 115 (FIG. 27) to the R rear side image processing unit 215. The R side image processing unit 215 performs image processing corresponding to the display mode on (each frame of) the R rear side image supplied from the R rear side camera 115 and supplies the R rear side image which has undergone the image processing to the storage unit 216.

The storage unit 216 stores the rear image, (the image of) the rear standing object, and the position information of the rear standing object from the rear image processing unit 211. Further, the storage unit 216 stores the L side image, (the image of) the L side standing object, and the position information of the L side standing object from the L side image processing unit 212. Further, the storage unit 216 stores the R side image, (the image of) the R side standing object, and the position information of the R side standing object from the R side image processing unit 213. Further, the storage unit 216 stores the L rear side image from the L rear side image processing unit 214 and the R rear side image from the R rear side image processing unit 215.

The distance information indicating the distance to the object near the vehicle 100 is supplied from the distance detecting unit 162 (FIG. 27) to the distance information acquiring unit 217. The distance information acquiring unit 217 acquires the distance information of the standing object (the rear standing object and the L/R side standing object) being present at the position indicated by the position information stored in the storage unit 216 from the distance information supplied from the distance detecting unit 162, and supplies the distance information to the positional relation determining unit 218, the collision risk determining unit 219, and the integrating unit 220.

The positional relation determining unit 218 performs anteroposterior relation determination of determining an anteroposterior relation between the rear standing object and the L/R side standing object on the basis of the distance information of the standing object from the distance information acquiring unit 217. Further, the positional relation determining unit 218 performs occlusion determination of whether or not the L/R side standing object is hidden by the rear standing object in the synthetic image on the basis of the distance information of the standing object from the distance information acquiring unit 217 and the position information of the standing object stored in the storage unit 216.

Further, the positional relation determining unit 218 supplies a determination result of the anteroposterior relation determination and a determination result of the occlusion determination to the superimposition executing unit 221 as positional relation information.

Based on the distance information of the L/R side standing object from the distance information acquiring unit 217, The collision risk determining unit 219 performs collision risk determination of determining whether or not the vehicle 100 collides with the R side standing object if the vehicle 100 changes the course to the left or the right on the basis of the distance information of the L/R side standing object from the distance information acquiring unit 217.

In other words, for example, the collision risk determining unit 219 obtains a relative speed of the L/R side standing object from the distance information of the L/R side standing object from the distance information acquiring unit 217. Further, the collision risk determining unit 219 estimates a time required for collision until the vehicle 10 collides with the L/R side standing object if the vehicle 10 changes the course to the left or the right from the distance to the L/R side standing object indicated by the distance information of the L/R side standing object and the relative speed of the L/R side standing object.

The collision risk determining unit 219 supplies a determination result of the collision risk determination to the superimposition executing unit 221.

Depending on the display mode, the integrating unit 220 generates the integrated image by integrating necessary images among the rear image, the L/R side images, the L/R rear side image, rear standing object, and the L/R side standing object stored in the storage unit 216, and supplies the integrated image to the superimposition executing unit 221.

Note that, in a case in which the layer synthesis is performed on the rear standing object and the L/R side standing object in (the synthetic image constituting) the generation of the integrated image, the integrating unit 220 synthesizes the rear standing object and the L/R side standing object so that the standing object on the far side is overwritten on the standing object on the rear side in the overlapping part of the rear standing object and the L/R side standing object in accordance with the distance information of the standing object from the distance information acquiring unit 217.

Depending on the display mode, the superimposition executing unit 221 causes the alert marks such as the alert marks AM1 and AM2 (FIG. 12) or the virtual boundary lines VL10, VL11, VL12, and VL13 (FIGS. 24 and 25) surrounding the periphery of the vehicle 100 to be superimposed on the integrated image from the integrating unit 220, and outputs a superimposed image obtained accordingly to the display unit 166 (FIG. 27) as the CMS image.

In other words, in a case in which the display mode (FIG. 28) is the display mode 1, 3, or 4, the superimposition executing unit 221 outputs the integrated image from the integrating unit 220 as the CMS image without change.

Further, in a case in which the display mode is the display mode 2, the superimposition executing unit 221 causes (the lines corresponding to) the virtual boundary lines VL10, VL11, VL12, and VL13 surrounding the periphery of the vehicle 100, and outputs a superimposed image obtained accordingly as the CMS image.

Further, in a case in which the display mode is the display mode 5, 6, or 7, the superimposition executing unit 221 performs alert determination of determining whether or not an alert indicating that the L/R side standing object is approaching is given to the driver in accordance with the positional relation information from the positional relation determining unit 218 and the determination result of the collision risk determination from the collision risk determining unit 219.

Then, in a case in which it is determined in the alert determination that the alert is unnecessary, the superimposition executing unit 221 outputs the integrated image from the integrating unit 220 as the CMS image without change.

Further, in a case in which it is determined in the alert determination that the alert is unnecessary, the superimposition executing unit 221 causes the alert mark to be superimposed on the position at which the L/R side standing object is located in the integrated image from the integrating unit 220, and outputs a superimposed image obtained accordingly as the CMS image.

Note that the superimposition executing unit 221 recognizes the position at which the L/R side standing object is present and the alert mark is superimposed on the integrated image from the position information of the L/R side standing object stored in the storage unit 216.

Figure 30:
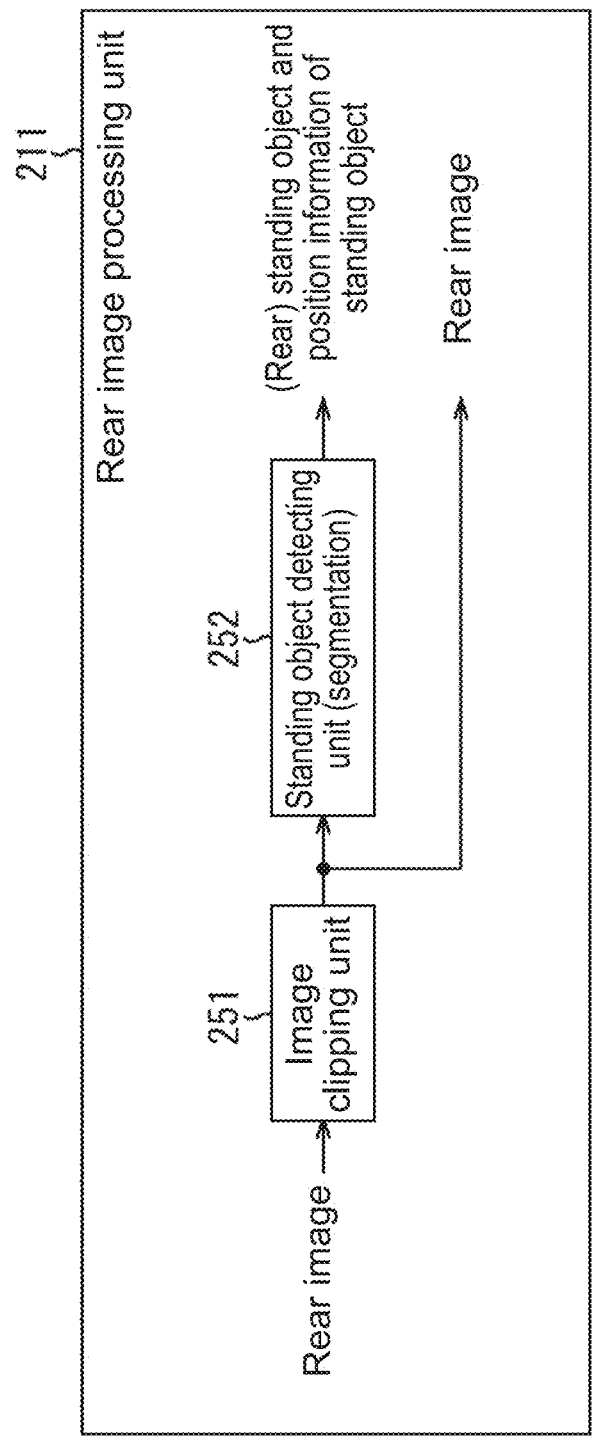
FIG. 30 is a block diagram illustrating a configuration example of a rear image processing unit 211.

FIG. 30 is a block diagram illustrating a configuration example of the rear image processing unit 211 of FIG. 29.

The rear image processing unit 211 includes an image clipping unit 251 and a standing object detecting unit 252.

The rear image is supplied from the rear camera 111 (FIG. 27) to the image clipping unit 251.

The image clipping unit 251 clips a range necessary for generating the integrated image of the display mode from the rear image (also referred to as an "original rear image") supplied from the rear camera 111 in accordance with the display mode, and supplies the rear image of the range to the standing object detecting unit 252 and the storage unit 216 (FIG. 29).

The standing object detecting unit 252 performs segmentation on the area of the rear standing object shown in the rear image by performing optical flow analysis, texture analysis, or the like on the rear image from the image clipping unit 251.

The standing object detecting unit 252 detects (the image of) the rear standing object shown in the rear image and the position information indicating the position on the rear image of the rear standing object through the segmentation, and supplies the rear standing object and the position information to the storage unit 216. Here, in the segmentation, area extraction of a standing object which is a non-road surface is performed. The lowest end portion of the boundary of the area extracted by segmentation can be regarded as a ground contact point. A standing object being moving necessarily has a ground contact point.

Figure 31:
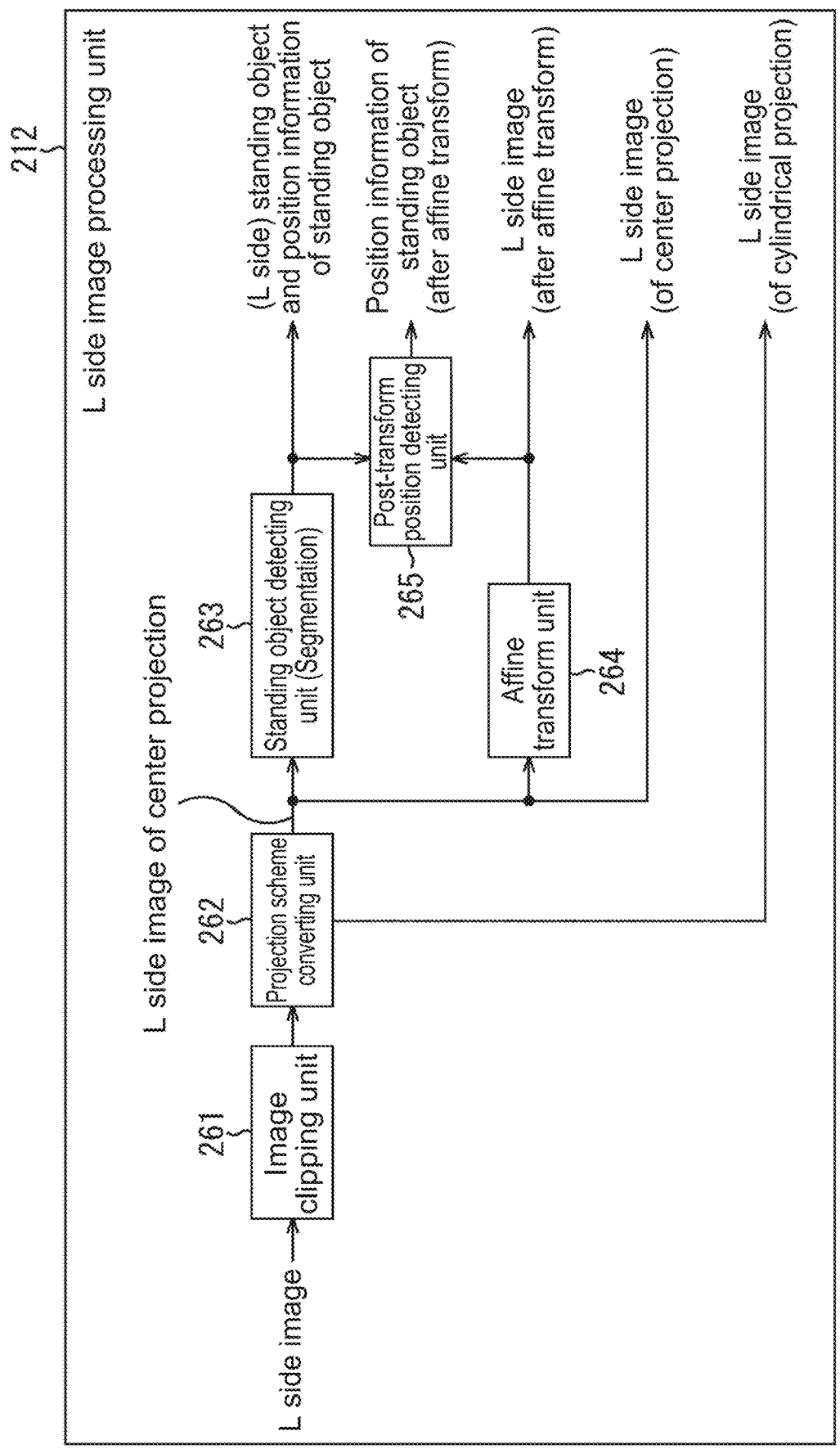
FIG. 31 is a block diagram illustrating a configuration example of an L side image processing unit 212.

FIG. 31 is a block diagram illustrating a configuration example of the L side image processing unit 212 of FIG. 29.

The L side image processing unit 212 includes an image clipping unit 261, a projection scheme converting unit 262, a standing object detecting unit 263, an affine transform unit 264, and a post-transform position detecting unit 265.

The L side image is supplied from the L side camera 112 (FIG. 27) to the image clipping unit 261.

The image clipping unit 261 clips a range necessary for generating the integrated image of the display mode from the L side image (also referred to as an "original L side image") supplied from the L side camera 112 in accordance with the display mode, and supplies the L side image of the range to the projection scheme converting unit 262.

The projection scheme converting unit 262 performs projection scheme conversion for converting the L side image from the image clipping unit 261 to the L side image of the center projection or the L side image of the cylindrical projection in accordance with the display mode.

Here, in the present embodiment, the L side camera 112 is a spherical camera, and the (original) L side image captured by the L side camera 112 is an image of the projection scheme employed in the omnidirectional imaging such as, for example, equidistant projection or the like.

The projection scheme converting unit 262 converts the L side image of the equidistant projection described above into (either or both of) the L side image of the center projection and the L side image of the cylindrical projection.

The projection scheme converting unit 262 supplies the L side image of the center projection to the standing object detecting unit 263, the affine transform unit 264, and the storage unit 216 (FIG. 29), and supplies the L side image of the cylindrical projection into the storage unit 216.

The standing object detecting unit 263 performs segmentation on the area of the L side standing object shown in the L side image by performing the optical flow analysis, the texture analysis, or the like on the L side image from the projection scheme converting unit 262.

The standing object detecting unit 263 detects (the image of) the L side standing object shown in the L side image and the position information indicating the position of the L side standing object on the L side image through the segmentation, and supplies the L side standing object and the position information to the post-transform position detecting unit 265 and the storage unit 216.

For example, the affine transform unit 264 performs the affine transform on the L side image from the projection scheme converting unit 262 so that the infinite point of the L side image from the projection scheme converting unit 262 coincides with the infinite point of the rear image.

Then, the affine transform unit 264 supplies the L side image which has undergone the affine transform which is obtained by the affine transform to the storage unit 216.

Note that, in the affine transform unit 264, instead of performing the affine transform of causing the infinite point of the L side image to coincide with the infinite point of the rear image, for example, it is possible to perform affine transform of adjusting a degree in which the infinite point of L side image which has undergone the affine transform coincides with the infinite point of the rear image in accordance with the state of the driver.

Further, the affine transform unit 264 generates a conversion table in which positions of pixels of the L side image before the affine transform are associated with positions of pixels of the L side image which has undergone the affine transform are associated with each other in the affine transform. The conversion table of the affine transform is supplied from the affine transform unit 264 to the post-transform position detecting unit 265.

The post-transform position detecting unit 265 detects the position information of the L side standing object shown in the L side image which has undergone the affine transform from the position information of the L side standing object from the standing object detecting unit 263 (the position information of the standing object shown in the L side image before the affine transform) using the conversion table from the affine transform unit 264, and supplies the position information of the L side standing object to the storage unit 216.

Figure 32:
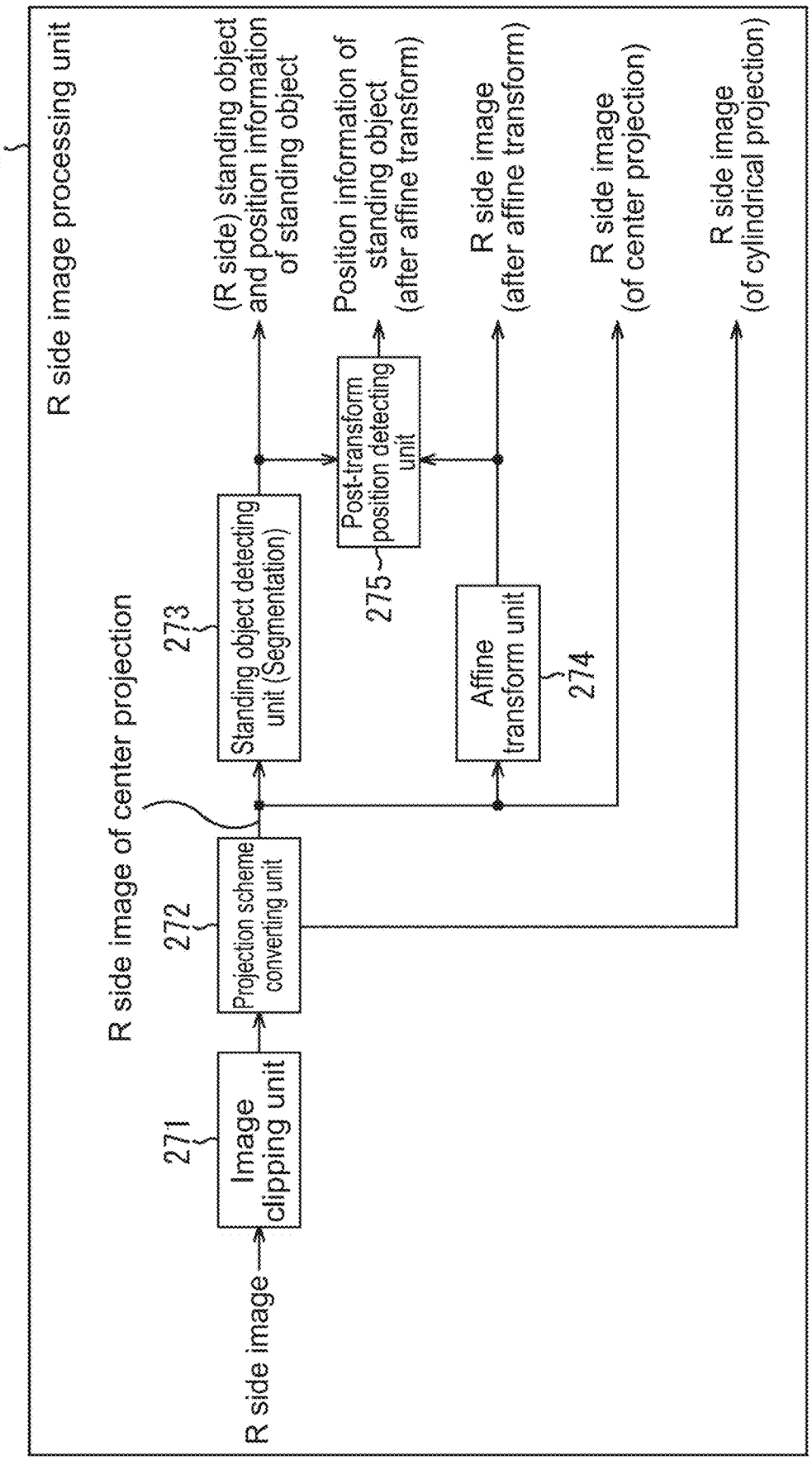
FIG. 32 is a block diagram illustrating a configuration example of an R side image processing unit 213.

FIG. 32 is a block diagram illustrating a configuration example of the R side image processing unit 213 of FIG. 29.

The R side image processing unit 213 includes an image clipping unit 271, a projection scheme converting unit 272, a standing object detecting unit 273, an affine transform unit 274, and a post-transform position detecting unit 275.

The image clipping unit 271 to the post-transform position detecting unit 275 are configured similarly to the image clipping unit 261 to the post-transform position detecting unit 265 of FIG. 31, respectively.

In the image clipping unit 271 to the post-transform position detecting unit 275, similar processes to those of the image clipping unit 261 and the post-transform position detecting unit 265 are performed except that the processes are performed on the R side image (hereinafter also referred to as an "original R side image") supplied from the R side camera 113.

Figure 33:
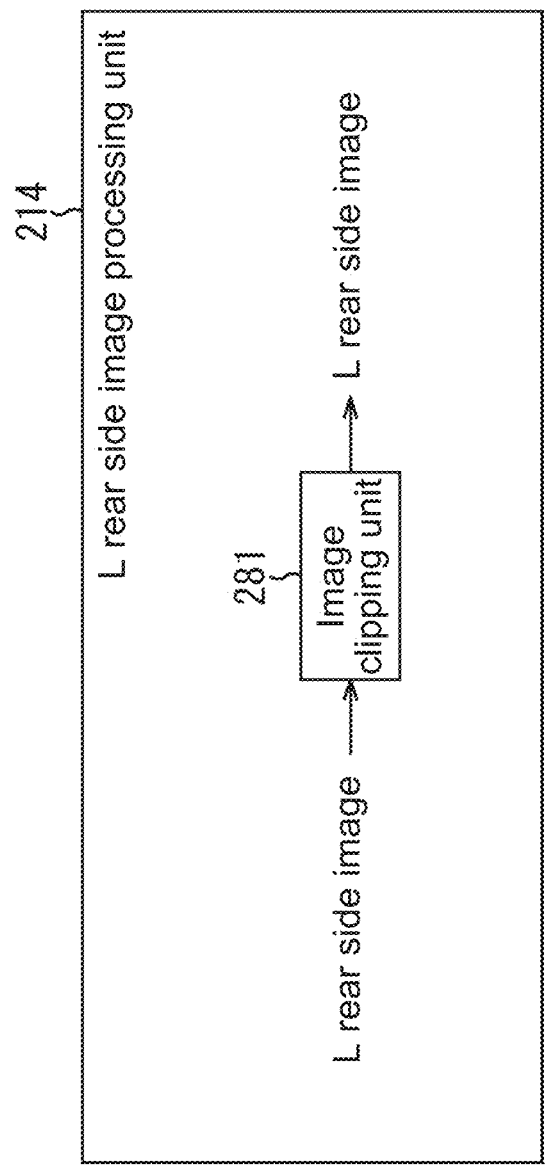
FIG. 33 is a block diagram illustrating a configuration example of an L rear side image processing unit 214.

FIG. 33 is a block diagram illustrating a configuration example of the L rear side image processing unit 214 of FIG. 29.

The L rear side image processing unit 214 includes an image clipping unit 281.

The L rear side image is supplied from the L rear side camera 114 (FIG. 27) to the image clipping unit 281.

The image clipping unit 281 clips a range necessary for generating the integrated image of the display mode from the L rear side image (hereinafter also referred to as an "original L rear side image") supplied from the L rear side camera 114 in accordance with the display mode, and supplies the L rear side image of the range to the storage unit 216 (FIG. 29).

Figure 34:
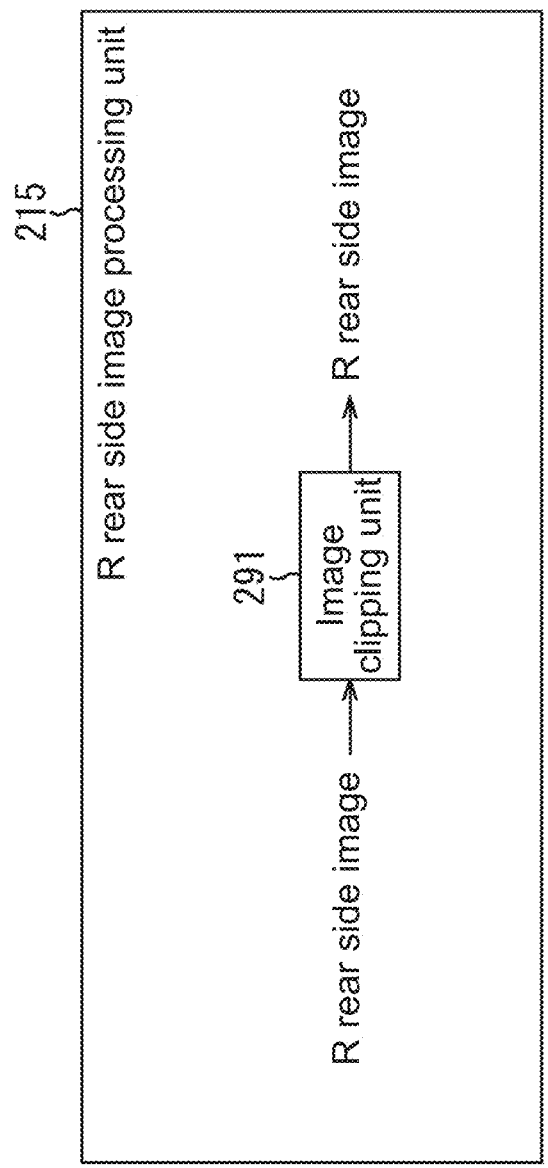
FIG. 34 is a block diagram illustrating a configuration example of an R rear side image processing unit 215.

FIG. 34 is a block diagram illustrating a configuration example of the R rear side image processing unit 215 of FIG. 29.

The R rear side image processing unit 215 includes an image clipping unit 291.

The R rear side image is supplied from the R rear side camera 115 (FIG. 27) to the image clipping unit 291.

The image clipping unit 281 clips a range necessary for generating the integrated image of the display mode from the R rear side image (hereinafter also referred to as an "original R rear side image") supplied from the R rear side camera 115 in accordance with the display mode, and supplies the R rear side image of the range to the storage unit 216 (FIG. 29).

Figure 35:
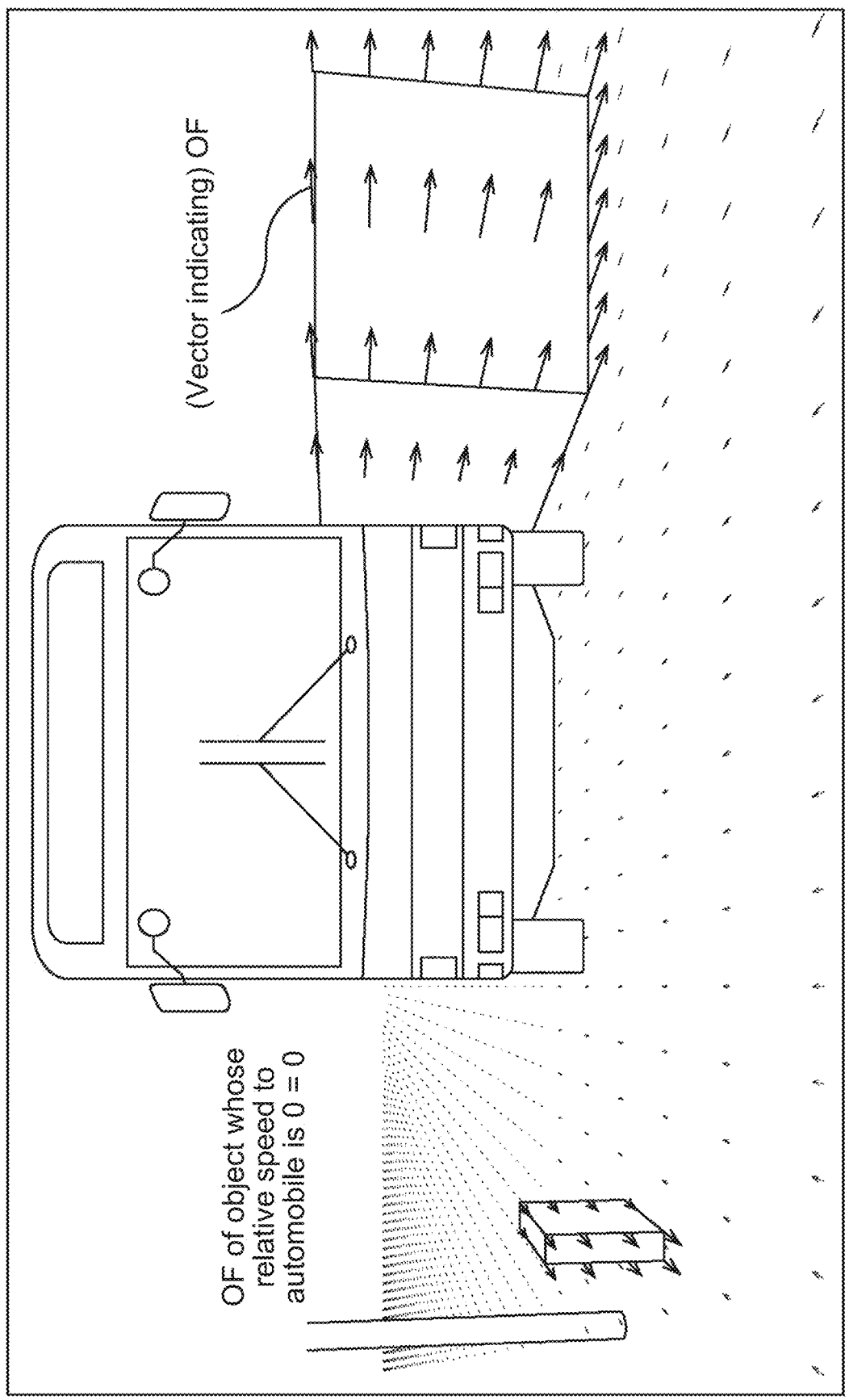
FIG. 35 is a diagram for describing an overview of segmentation performed for detection of a standing object in a standing object detecting unit 252.

FIG. 35 is a diagram for describing an overview of the segmentation performed for the detection of the standing object in the standing object detecting unit 252 of FIG. 30.

In other words, FIG. 35 illustrates an example of the rear image.

In FIG. 35, arrows indicate (vectors indicating) Optical Flow (OF) obtained by performing the optical flow analysis on the rear image.

In the rear image, the OF of an object shown in the rear image depends on a relative speed of the object with respect to the vehicle 100. Therefore, for example, the OF of a stationary object such as a road differs from the OF of a standing object being moving such as a vehicle other than the vehicle 100.

For example, the OF of the road has a vector which has a size corresponding to the speed of the vehicle 100 and faces in the rear direction (the far side of the rear image). Further, for example, the OF of the standing object approaching the vehicle 100 has a vector which faces in the front direction (the rear side of the rear image), and the OF of the standing object traveling behind the vehicle 100 at the same speed as the vehicle 100 has a 0 vector.

Therefore, a probability that consecutive areas with similar OFs in the rear image constitute one object (aggregate) having a similar texture such as, for example, an automobile, a motorcycle, a pedestrian, or the like is very high.

In this regard, in the rear image, the standing object detecting unit 252 performs segmentation of dividing the rear image into a set of areas in which similar OFs different from an OF of a road which faces in the rear direction with a size corresponding to the speed of the vehicle 100 in the rear image are distributed.

Then, the standing object detecting unit 252 detects a set of areas obtained by the segmentation as the standing object (area).

The standing object detecting unit 263 of FIG. 31 and the standing object detecting unit 273 of FIG. 32 also perform the segmentation similarly to the standing object detecting unit 252 and detect the standing object. For the area of the standing object extracted by segmentation, a relative positional relation with its own vehicle 100 is important, and the closest point which is a point closest to its own vehicle 100 is most important. Further, the standing object is assumed to be upright at a position of the bottom of the boundary of the area of the standing object. Note that, for vehicles with special shapes such as crane trucks, a road contact point of the vehicle may be drawn in as compared with the area (standing object) detected by the segmentation (not the bottom of the boundary of the area of the standing object). In this case, if the bottom of the boundary of the area of the standing object is assumed to be the road contact point of the vehicle, the road contact point contains an error. In this regard, in a case in which the road contact point of the vehicle is detected, vehicle identification may be carried out, and, for example, a process of applying an offset for actively reducing the error of the road contact point of the vehicle may be performed in accordance with an identification result.

<CMS Image Generation Process>

Figure 36:
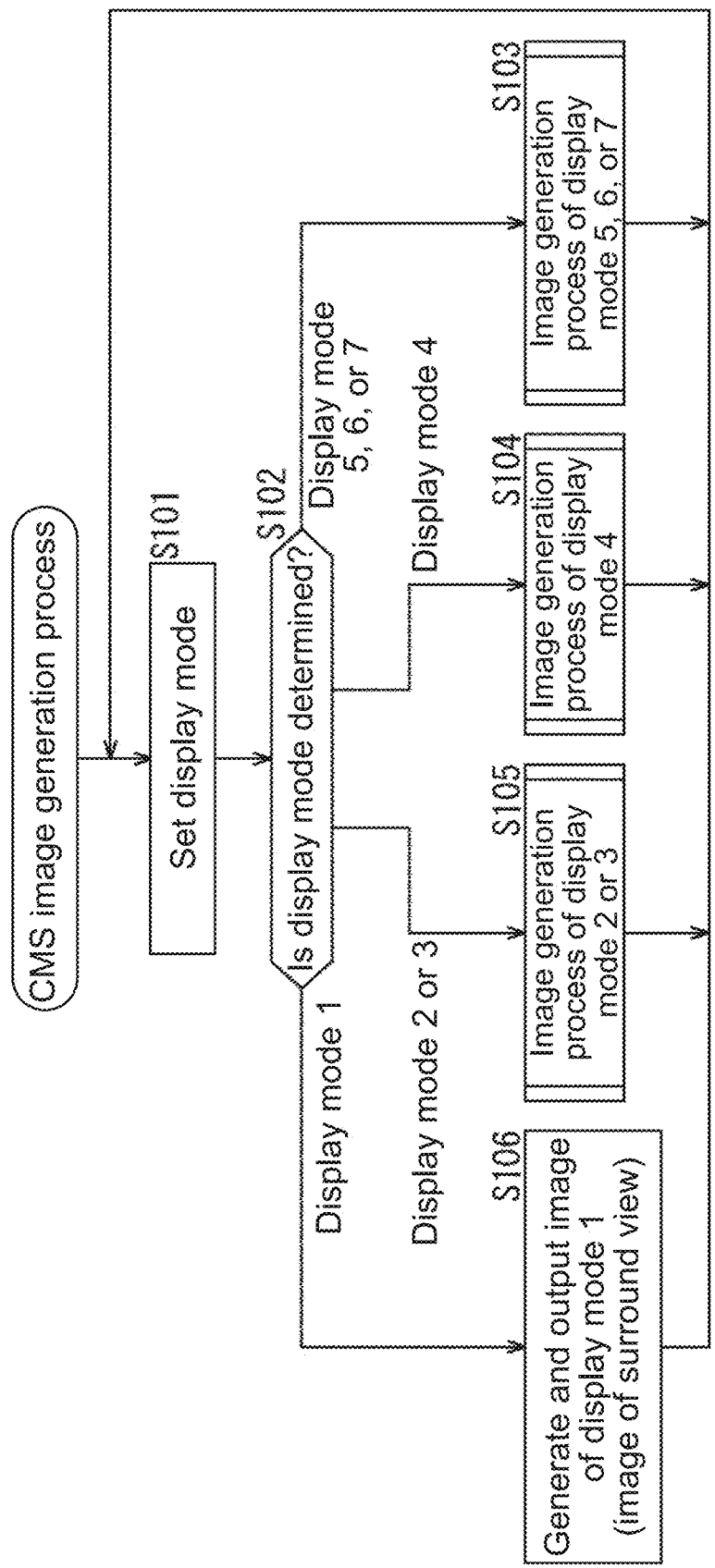
FIG. 36 is a flowchart for describing an example of a CMS image generation process performed by a CMS image generating unit 165.

FIG. 36 is a flowchart illustrating an example of the CMS image generation process performed by the CMS image generating unit 165 of FIG. 29.

In step S101, the display mode setting unit 201 sets the display mode in accordance with the manipulation information from the manipulating unit 151, the vehicle state from the vehicle state detecting unit 163, and the driver state from the driver state detecting unit 164, supplies it to the integrating unit 220 and other necessary blocks, and the process proceeds to step S102.

In step S102, (each block of) the CMS image generating unit 165 determines the display mode.

In a case in which it is determined in step S102 that the display mode is the display mode 5, 6, or 7, the process proceeds to step S103, the CMS image generating unit 165 performs the image generation processes of the display modes 5, 6, and 7, and the process returns to step S101.

In a case in which it is determined in step S102 that the display mode is the display mode 4, the process proceeds to step S104, the CMS image generating unit 165 performs the image generation process of the display mode 4, and the process returns to step S101.

In a case in which it is determined in step S102 that the display mode is the display mode 2 or 3, the process proceeds to step S105, the CMS image generating unit 165 performs the image generation process of the display modes 2 and 3, and the process returns to S101.

In a case in which it is determined in step S102 that the display mode is the display mode 1, the process proceeds to step S106, and the CMS image generating unit 165 generates the image of the display mode 1, that is, the image of the surround view using the image supplied from the imaging unit 161 appropriately.

Then, the CMS image generating unit 165 outputs the image of the surround view as the CMS image (to the display unit 166), and the process returns from step S106 to step S101.

Figure 37:
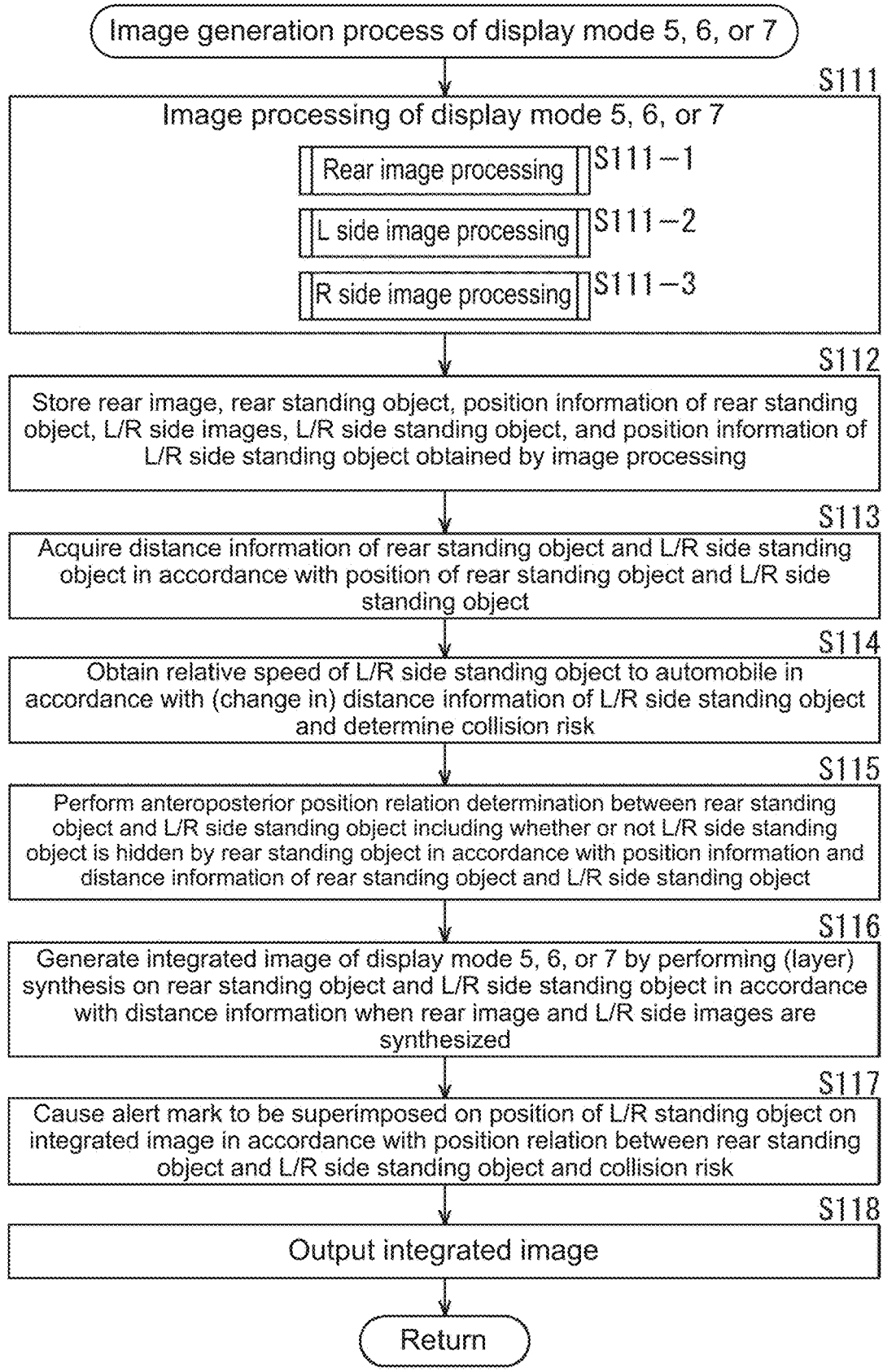
FIG. 37 is a flowchart for describing an example of an image generation process of display mode 5, 6, or 7 performed in step S103.

FIG. 37 is a flowchart illustrating an example of the image generation process of the display modes 5, 6, or 7 performed in step S103 of FIG. 36.

In step S111, image processing of the display modes 5, 6, or 7 is performed, and the process proceeds to step S112.

Here, as the image processing of the display modes 5, 6, or 7, in step S111-1, the rear image processing unit 211 performs rear image processing. Further, in step S111-2, the L side image processing unit 212 performs L side image processing, and in step S111-3, the R side image processing unit 213 performs R side image processing.

In step S111-1, the rear image processing unit 211 obtains the rear image, the rear standing object, and the position information of the rear standing object to be used for generating the integrated images of the display mode 5, 6, or 7 (the integrated image of FIG. 13, FIG. 14, or FIG. 12) by performing the rear image processing, and outputs the rear image, the rear standing object, and the position information of the rear standing object.

In step S111-2, the L side image processing unit 212 obtains the L side image, the L side standing object, and the position information of the L side standing object used for generating the integrated images of the display mode 5, 6, or 7 by performing the L side image processing, and outputs the L side image, the L side standing object, and the position information of the L side standing object.

In step S111-3, the R side image processing unit 213 obtains the R side image, the R side standing object, and the position information of the R side standing object used for generating the integrated images of the display mode 5, 6, or 7 by performing the R side image processing, and outputs the R side image, the R side standing object, and the position information of the R side standing object.

In step S112, the storage unit 216 stores the rear image, the rear standing object, and the position information of the rear standing object and the L/R side images, the L/R side standing object, and the position information of the L/R side images obtained by the image processing of the display modes 5, 6, or 7 in previous step S111, and the process proceeds to step S113.

In step S113, the distance information acquiring unit 217 acquires the distance information of the rear standing object and the L/R side standing object being present at the positions indicated by the position information stored in the storage unit 216 from the distance information supplied from the distance detecting unit 162 (FIG. 27). Further, the distance information acquiring unit 217 supplies the distance information of the rear standing object and the L/R side standing object to the positional relation determining unit 218, the collision risk determining unit 219, and the integrating unit 220, and the process proceeds from step S113 to step S114.

In step S114, the collision risk determining unit 219 obtains the relative speed of the L/R side standing object (the relative speed to the vehicle 100) from (a change in) the distance information of the L/R side standing object from the distance information acquiring unit 217. Further, the collision risk determining unit 219 performs the collision risk determination on the basis of the distance to the L/R side standing object indicated by the distance information of the L/R side standing object and the relative speeds of the L/R side standing object, and the process proceeds to step S115.

In step S115, the positional relation determining unit 218 performs the anteroposterior relation determination and the occlusion determination on the basis of the distance information of the rear standing object and the L/R side standing object from the distance information acquiring unit 217 and the position information of the rear standing object and the L/R side standing object stored in the storage unit 216.

Further, the positional relation determining unit 218 supplies the determination result of the anteroposterior relation determination and the determination result of the occlusion determination to the superimposition executing unit 221 as the positional relation information, and the process proceeds from step S115 to step S116.

In step S116, the integrating unit 220 generates the integrated image of the display mode 5, 6, or 7 (the integrated image of FIG. 13, FIG. 14, or FIG. 12) using the rear image, the L/R side images, the rear standing object, and the L/R side standing object stored in the storage unit 216.

In other words, the integrating unit 220 generates the synthetic image by synthesizing the rear image stored in the storage unit 216 and the L/R side images which have undergone the affine transform, and performing the layer synthesis of synthesizing the rear standing object and the L/R side standing object stored in the storage unit 216 into on the synthetic image obtained accordingly in accordance with the distance information of the rear standing object and the L/R side standing object from the distance information acquiring unit 217.

Note that, here, the fourth display method is assumed to be employed as the display method of the CMS image described with reference to FIG. 10. In this case, in the layer synthesis, the L/R side standing object before the affine transform is synthesized at the position indicated by the position information of the L/R side standing object after the affine transform (the L/R side standing object shown in the L/R side images which have undergone the affine transform).

After the synthetic image is generated as described above, the integrating unit 220 generates the integrated image of the display mode 5, 6, or 7 by combining the L/R side images before the affine transform stored in the storage unit 216 with the synthetic image if necessary.

Further, the integrating unit 220 supplies the integrated image of the display mode 5, 6, or 7 to the superimposition executing unit 221, and the process proceeds from step S116 to step S117.

In step S117, the superimposition executing unit 221 performs alert determination of determining whether or not an alert indicating that the L/R side standing object is approaching is given to the driver in accordance with the positional relation information from the positional relation determining unit 218 and the determination result of the collision risk determination from the collision risk determining unit 219.

In a case in which it is determined in the alert determination that the alert is unnecessary, that is, for example, in a case in which at least a part of the rear standing object is hidden by the rear standing object in the synthetic image in which the L/R standing objects are farther than the rear standing object, and the vehicle 10 is likely to collide with the L/R side standing object if the vehicle 10 changes the course to the left or the right, the superimposition executing unit 221 causes the alert mark to be superimposed on the integrated image from the integrating unit 220.

In other words, the superimposition executing unit 221 causes the alert mark to be superimposed at the position at which the L/R side standing object of the integrated image from the integrating unit 220 is present in accordance with the position information of the L/R side standing object (which has undergone the affine transform) stored in the storage unit 216, and the process proceeds from step S117 to step S118.

In step S118, the superimposition executing unit 221 outputs the superimposed image obtained by the superimposition of the alert mark as the CMS image, and the process returns.

Note that, in a case in which it is determined in step S117 that the alert is unnecessary, the process proceeds to step S118, and the superimposition executing unit 221 outputs the integrated image from the integrating unit 220 as the CMS image without change.

Figure 38:
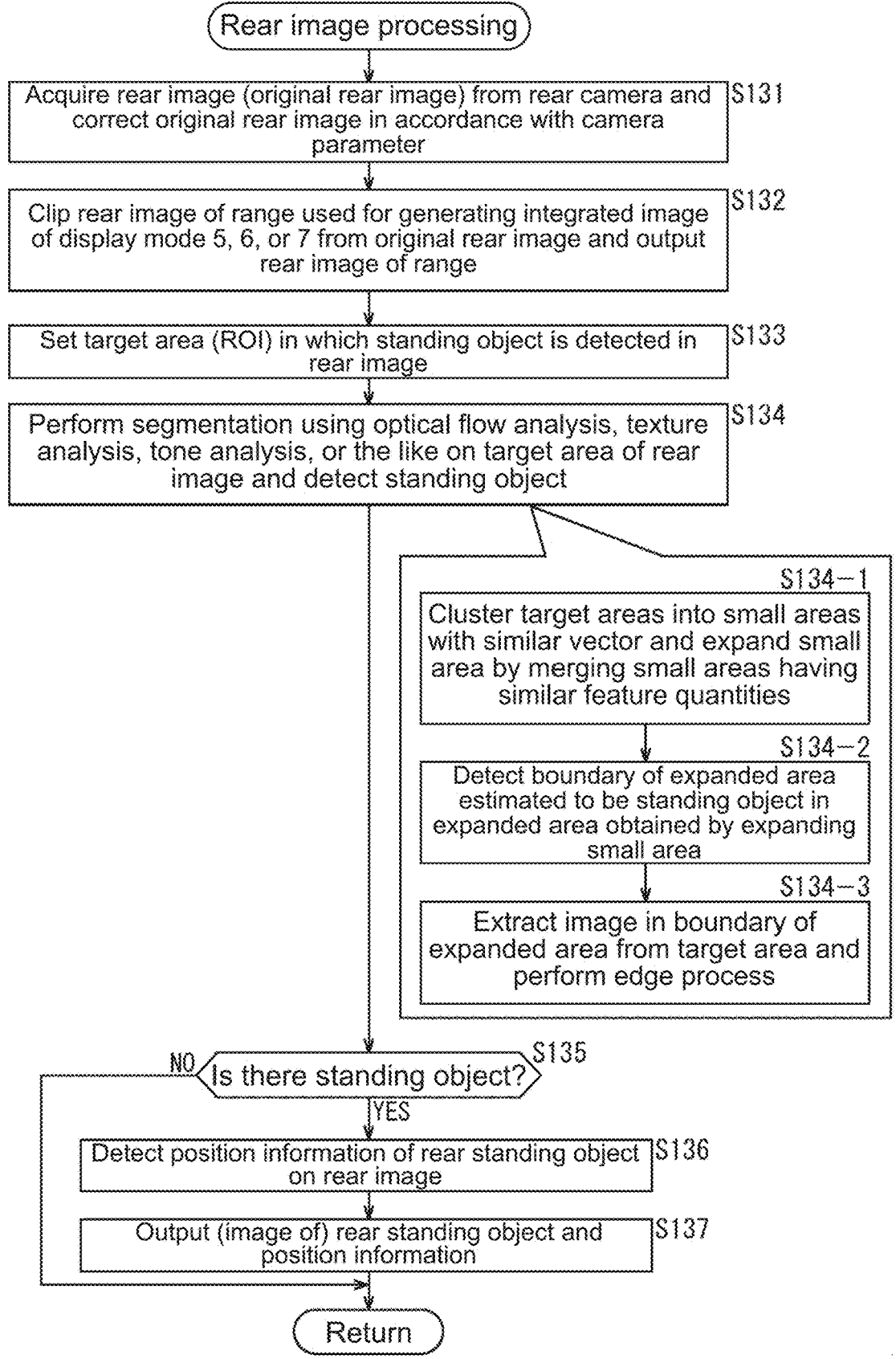
FIG. 38 is a flowchart for describing an example of rear image processing performed by a rear image processing unit 211 in step S111-1.

FIG. 38 is a flowchart illustrating an example of the rear image processing performed by the rear image processing unit 211 in step S111-1 of FIG. 37.

In step S131, the image clipping unit 251 of the rear image processing unit 211 (FIG. 30) acquires the original rear image supplied from the rear camera 111.

Then, the image clipping unit 251 corrects the original rear image in accordance with a camera parameter of the rear camera 111, and the process proceeds to step S132.

In step S132, the image clipping unit 251 clips a rear image of a range used for generating the integrated images of the display mode 5, 6, or 7 from the original rear image, outputs the clipped rear image to the standing object detecting unit 252 and the storage unit 216 (FIG. 29), and the process proceeds to step S133.

In step S133, the standing object detecting unit 252 sets a Region Of Interest (ROI) serving as a target area in which the standing object is detected in the rear image from the image clipping unit 251, and the process proceeds to step S134.

In step S134, the standing object detecting unit 252 performs the segmentation using the optical flow analysis, the texture analysis, the tone analysis, or the like on the target area of the rear image from the image clipping unit 251, performs detection of the rear standing object shown in the target area of the rear image (attempts detection of the rear standing object), and the process proceeds to step S135.

In other words, in step S134, for example, first, in step S134-1, the standing object detecting unit 252 performs the optical flow analysis on the target area of the rear image.

Further, the standing object detecting unit 252 clusters the target areas into small areas which are similar in the vectors indicating the OF obtained by the optical flow analysis.

Further, the standing object detecting unit 252 obtains a feature quantity of each small area by performing the texture analysis, the tone analysis, or the like on each small area obtained by clustering the target areas, expands the small area by merging the adjacent small areas having similar feature quantities, and the process proceeds from step S134-1 to step S134-2.

In step S134-2, the standing object detecting unit 252 detects the boundary of the expanded area estimated to be the rear standing object among the expanded areas obtained by expanding the small area obtained in step S134-1, and the process proceeds to step S134-3.

In step S134-3, the standing object detecting unit 252 extracts an image in the expanded area in which the boundary is detected in step S134-2 as the image of the rear standing object from the target area, performs an edge process of smoothing the boundary of the image, and the process of step S134 ends.

In step S135, the standing object detecting unit 252 determines whether or not the rear standing object is shown in the rear image.

In other words, in step S135, the standing object detecting unit 252 determines whether or not the rear standing object is able to be detected from the rear image through the segmentation in previous step S134.

In a case in which it is determined in step S135 that the rear standing object is not able to be detected, the process skips steps S136 and S137 and returns.

In this case, the standing object detecting unit 252 does not output (is unable to output) the rear standing object and the position information of the rear standing object.

On the other hand, in a case in which it is determined in step S135 that the rear standing object is able to be detected, the process proceeds to step S136, and the standing object detecting unit 252 detects the position information indicating the position of the rear standing object on the rear image, and the process proceeds to step S137.

In step S137, the standing object detecting unit 252 outputs the rear standing object detected in step S134 and the position information of the rear standing object detected in step S136 to the storage unit 216 (FIG. 29), and the process returns.

Figure 39:
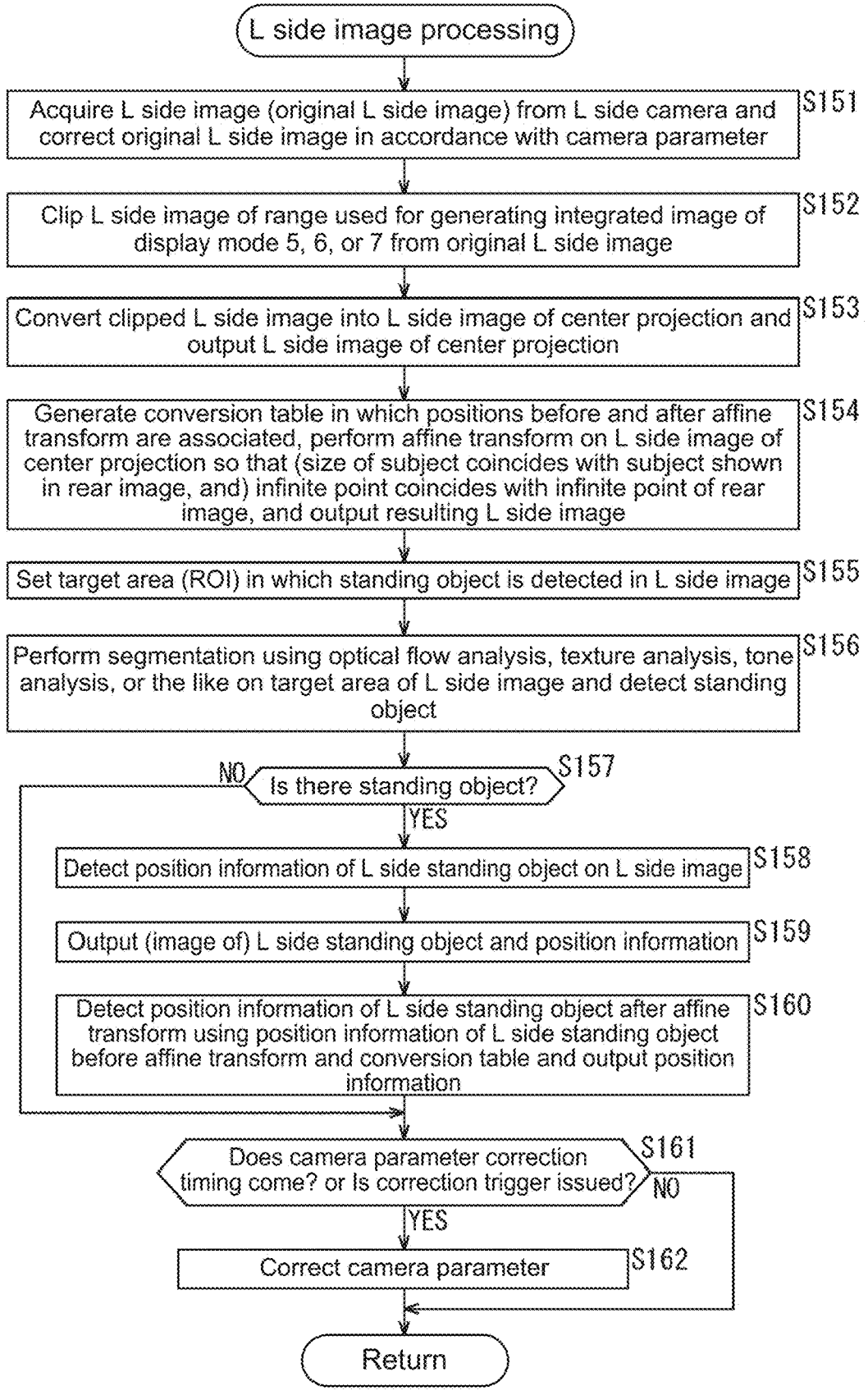
FIG. 39 is a flowchart for describing an example of L side image processing performed by an L side image processing unit 212 in step S111-2.

FIG. 39 is a flowchart illustrating an example of L side image processing performed by the L side image processing unit 212 in step S111-2 of FIG. 37.

In step S151, the image clipping unit 261 of the L side image processing unit 212 (FIG. 31) acquires the original L side image supplied from the L side camera 112.

Then, the image clipping unit 261 corrects the original L side image in accordance with the camera parameter of the L side camera 112, and the process proceeds to step S152.

In step S152, the image clipping unit 261 clips an L side image of a range used for generating the integrated image of the display mode 5, 6 or 7 from the original L side image, and supplies the L side image of the range to the projection scheme converting unit 262, and the process proceeds to step S153.

In step S153, the projection scheme converting unit 262 converts the clipped L side image from the image clipping unit 261 into the L side image of the center projection and outputs the L side image of the center projection to the standing object detecting unit 263, the affine transform unit 264, and the storage unit 216 (FIG. 29), and the process proceeds to step S154.

In step S154, the affine transform unit 264 generates a conversion table in which positions of pixels of the L side image before the affine transform are associated with positions of pixels of the L side image which has undergone the affine transform are associated with each other for the affine transform to be performed on the L side image from the projection scheme converting unit 262 so that the infinite point of the L side image from the projection scheme converting unit 262 coincides with the infinite point of the rear image.

Further, the affine transform unit 264 performs the affine transform on the L side image from the projection scheme converting unit 262 in accordance with the conversion table, and outputs the L side image which has undergone the affine transform to the storage unit 216 (FIG. 29).

Further, the affine transform unit 264 supplies the conversion table to the post-transform position detecting unit 265, and the process proceeds from step S154 to step S155.

Note that, in a case in which the display mode 6 is set as the display mode, when the degree in which the infinite points of the L/R side images which have undergone the affine transform coincide with the infinite point of the rear image in the synthetic image is seamlessly changed in accordance with the movement of the head of the driver, the affine transform unit 264 adjusts the degree in which the infinite point of the L side image which has undergone the affine transform coincides with the infinite point of the rear image in accordance with the driver state supplied from the driver state detecting unit 164 (FIG. 27) to the CMS image generating unit 165, and then performs the affine transform as described with reference to FIG. 14.

In step S155, the standing object detecting unit 263 sets the ROI serving as the target area in which the standing object is detected in the L side image from the projection scheme converting unit 262, and the process proceeds to step S156.

In step S156, the standing object detecting unit 263 performs the segmentation similar to step S134 of FIG. 38 on the target area of the L side image from the projection scheme converting unit 262, and performs the detection of the L side standing object shown in the target area of the L side image (attempts detection of the L side standing object), and the process proceeds to step S157.

In step S157, the standing object detecting unit 263 determines whether or not the L side standing object is shown in the L side image.

In other words, in step S157, the standing object detecting unit 263 determines whether or not the L side standing object is able to be detected from the L side image through the segmentation in previous step S156.

In a case in which it is determined in step S157 that the L side standing object is not able to be detected, the process skips steps S158 to S160 and proceeds to step S161.

In this case, the standing object detecting unit 263 does not output (is unable to output) the L side standing object and the position information of the L side standing object (before the affine transform). Further, the post-transform position detecting unit 265 does not output the position information of the L side standing object (which has undergone the affine transform) similarly.

On the other hand, in a case in which it is determined in step S157 that the L side standing object is able to be detected, the process proceeds to step S158, and the standing object detecting unit 263 detects the position information indicating the position of the L side standing object on the L side image, and the process proceeds to step S159.

In step S159, the standing object detecting unit 263 outputs the L side standing object detected in step S158 and the position information of the L side standing object detected in step S158 to the post-transform position detecting unit 265 and the storage unit 216 (FIG. 29), and the process proceeds to step S160.

In step S160, the post-transform position detecting unit 265 detects the position information of the L side standing object (the L side standing object after the affine transform) shown in the L side image which has undergone the affine transform from the position information of the L side standing object from the standing object detecting unit 263 (the position information of the standing object shown in the L side image before the affine transform) using the conversion table from the affine transform unit 264. Then, the post-transform position detecting unit 265 outputs the position information of the L side standing object after the affine transform to the storage unit 216, and the process proceeds to step S161.

In step S161, the CMS image generating unit 165 determines whether or not a camera parameter correction timing for correcting the camera parameters of the rear camera 111 to the interior camera 122 constituting the imaging unit 161 comes or whether or not a correction trigger for correcting the camera parameters is issued from a block (not illustrated).

In a case in which it is determined in step S161 that the camera parameter correction timing does not come or that the correction trigger is not issued, the process skips step S162 and returns.

Further, in a case in which it is determined in step S161 that the camera parameter correction timing comes or that the correction trigger is issued, the process proceeds to step S162.

In step S163, the CMS image generating unit 165 corrects the camera parameters of the rear camera 111 to the interior camera 122 constituting the imaging unit 161 using a predetermined method, and the process returns.

Note that the R side image processing performed by the R side image processing unit 213 in step S111-3 of FIG. 37 is similar to the L side image processing of FIG. 39 except that the process is performed on the R side image instead of the L side image, and thus description thereof is omitted.

Figure 40:
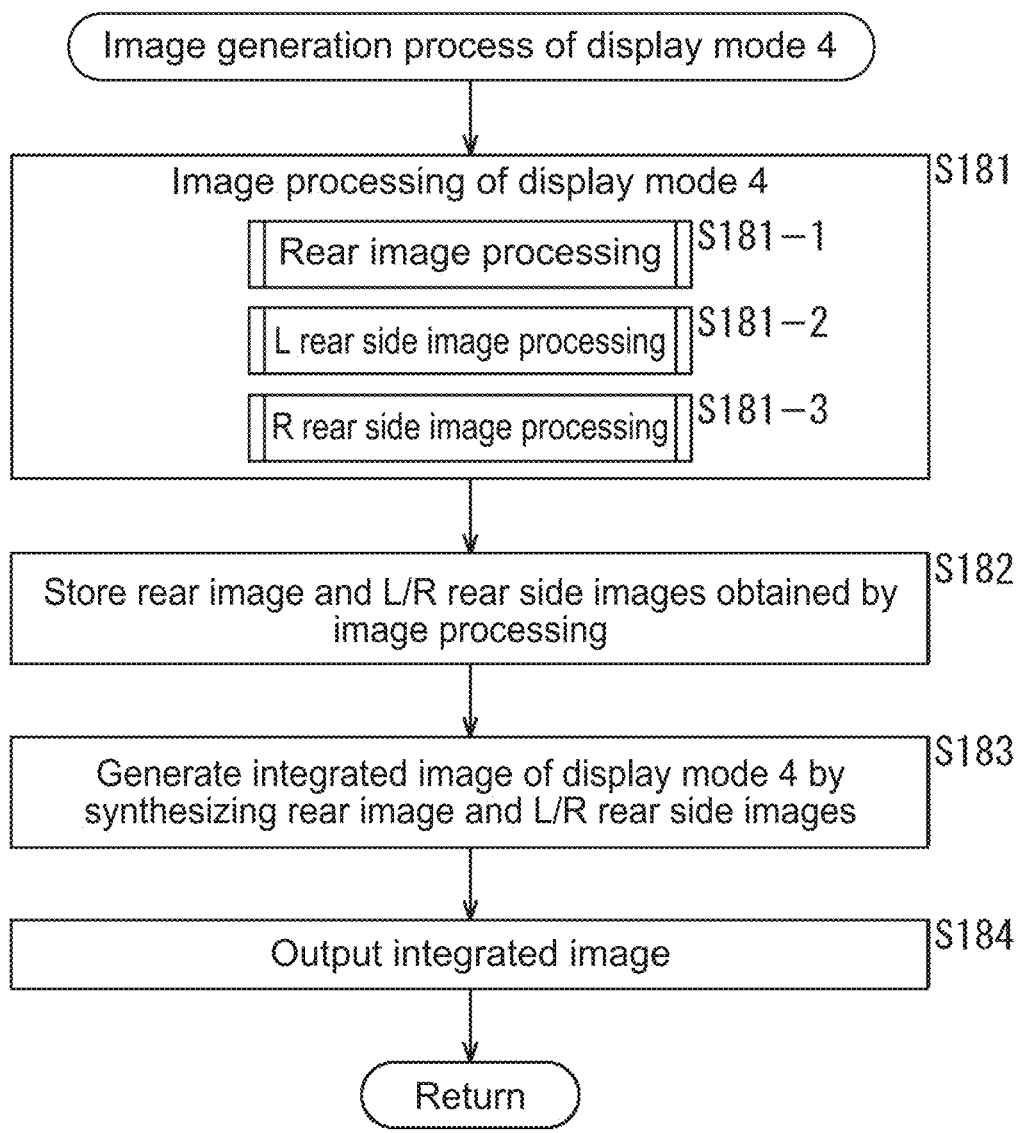
FIG. 40 is a flowchart for describing an example of an image generation process of a display mode 4 performed in step S104.

FIG. 40 is a flowchart for describing an example of an image generation process of the display mode 4 performed in step S104 of FIG. 36.

In step S181, image processing of the display mode 4 is performed, and the process proceeds to step S182.

Here, in step S181-1, the rear image processing unit 211 performs rear image processing as the image processing of the display mode 4. Further, in step S181-2, the L rear side image processing unit 214 performs the L rear side image processing, and in step S181-3, the R rear side image processing unit 215 performs the R rear side image processing.

In step S181-1, the rear image processing unit 211 obtains the rear image used for generating the integrated image of the display mode 4 (the integrated image of FIG. 18) by the performing rear image processing, and outputs the obtained rear image.

In step S181-2, the L rear side image processing unit 214 obtains the L rear side image used for generating the integrated image of the display mode 4 by performing the L rear side image processing, and outputs the obtained L rear side image.

In step S181-3, the R rear side image processing unit 215 obtains the R rear side image used for generating the integrated image of the display mode 4 by performing the R rear side image processing, and outputs the obtained R rear side image.

In step S182, the storage unit 216 stores the rear image and the L/R rear side image obtained by the image processing of the display mode 4 in previous step S181, and the process proceeds to step S183.

In step S183, the integrating unit 220 integrates the rear image and the L/R rear side image stored in the storage unit 216, and generates the integrated image of the display mode (the integrated image of FIG. 18).

In other words, as described with reference to FIG. 18, the integrating unit 220 generates a combined image by arranging the R rear side image and the L rear side image stored in the storage unit 216 on the left side and the right side and combining the R rear side image and the L rear side image. Further, the integrating unit 220 causes the rear image stored in the storage unit 216 to be combined (superimposed) at the center of the combined image, and generates the integrated image of the display mode 4 (the integrated image of FIG. 18).

Further, the integrating unit 220 supplies the integrated image of the display mode 4 to the superimposition executing unit 221, and the process proceeds to step S184.

In step S184, the superimposition executing unit 221 outputs the integrated image of the display mode 4 from the integrating unit 220 as the CMS image, and the process returns.

Figure 41:
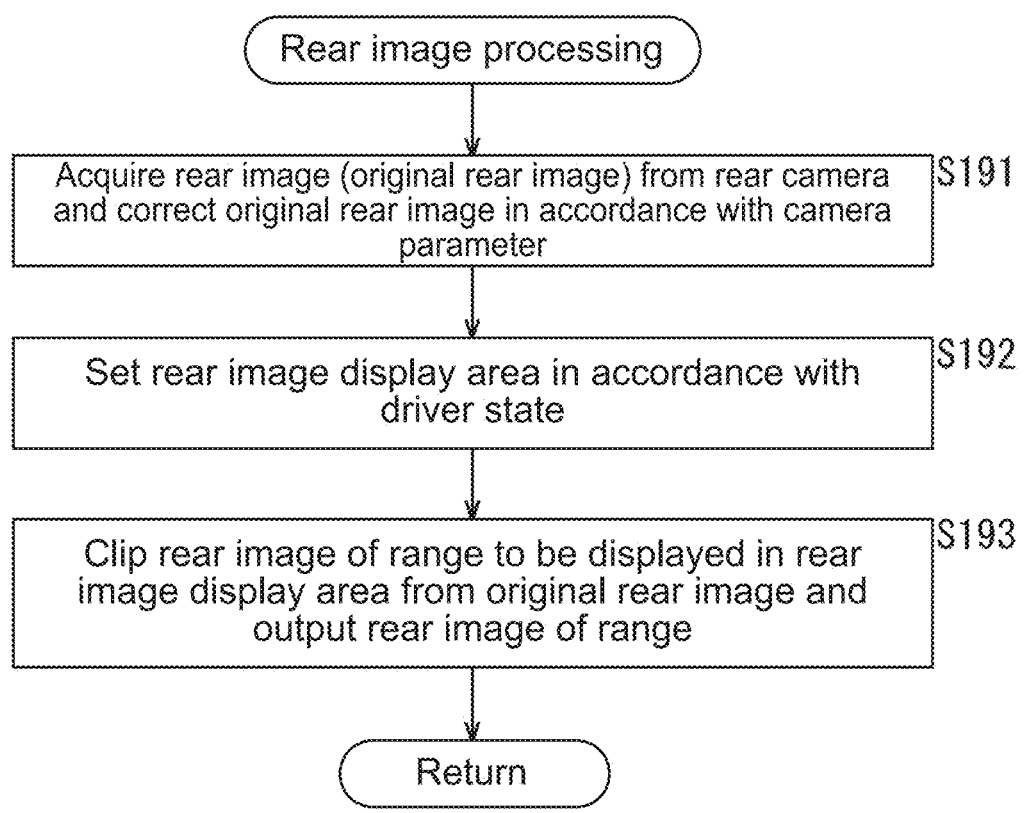
FIG. 41 is a flowchart for describing an example of rear image processing performed by a rear image processing unit 211 in step S181-1.

FIG. 41 is a flowchart illustrating an example of the rear image processing performed by the rear image processing unit 211 in step S181-1 of FIG. 40.

In step S191, the image clipping unit 251 of the rear image processing unit 211 (FIG. 30) acquires the original rear image supplied from the rear camera 111.

Then, the image clipping unit 251 corrects the original rear image in accordance with the camera parameter of the rear camera 111, and the process proceeds to step S192.

In step S192, the image clipping unit 251 sets the rear image display area of the integrated image (FIG. 18) of the display mode 4 in accordance with the driver state supplied from the driver state detecting unit 164 (FIG. 27) to the CMS image generating unit 165, and the process proceeds to step S193.

In step S193, the image clipping unit 251 clips a rear image of a range to be displayed in the rear image display area set in previous step S192 from the original rear image and outputs the rear image of the range to the storage unit 216 (FIG. 29), and the process returns.

Figure 42:
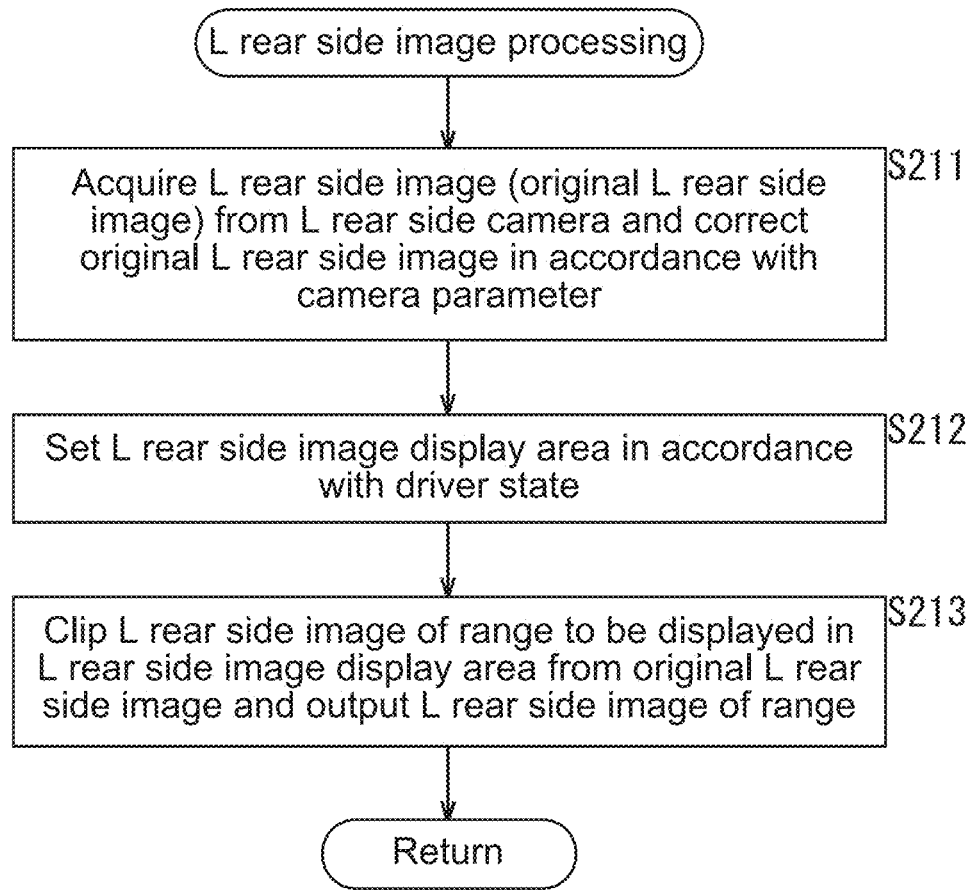
FIG. 42 is a flowchart for describing an example of L rear side image processing performed by an L rear side image processing unit 214 in step S181-2.

FIG. 42 is a flowchart for describing an example of the L rear side image processing performed by the L rear side image processing unit 214 in step S181-2 of FIG. 40.

In step S211, the image clipping unit 281 of the L rear side image processing unit 214 (FIG. 33) acquires the L rear side image supplied from the L rear side camera 114.

Then, the image clipping unit 281 corrects the original L rear side image in accordance with the camera parameter of the L rear side camera 114, and the process proceeds to step S212.

In step S212, the image clipping unit 281 sets the L rear side image display area of the integrated image (FIG. 18) of the display mode 4 area in accordance with the driver state supplied from the driver state detecting unit 164 (FIG. 27) to the CMS image generating unit 165, and the process proceeds to step S213.

In step S213, the image clipping unit 281 clips an L rear side image of a range to be displayed in the L rear side image display area set in previous step S212 from the original L rear side image, and outputs the L rear side image of the range in the storage unit 216 (FIG. 29), and the process returns.

Note that the R rear side image processing performed by the R rear side image processing unit 215 (FIG. 35) in step S181-3 of FIG. 40 is similar to the L rear side image processing of FIG. 42 except that the process is performed on the R rear side image instead of the L rear side image, and thus description thereof is omitted.

Figure 43:
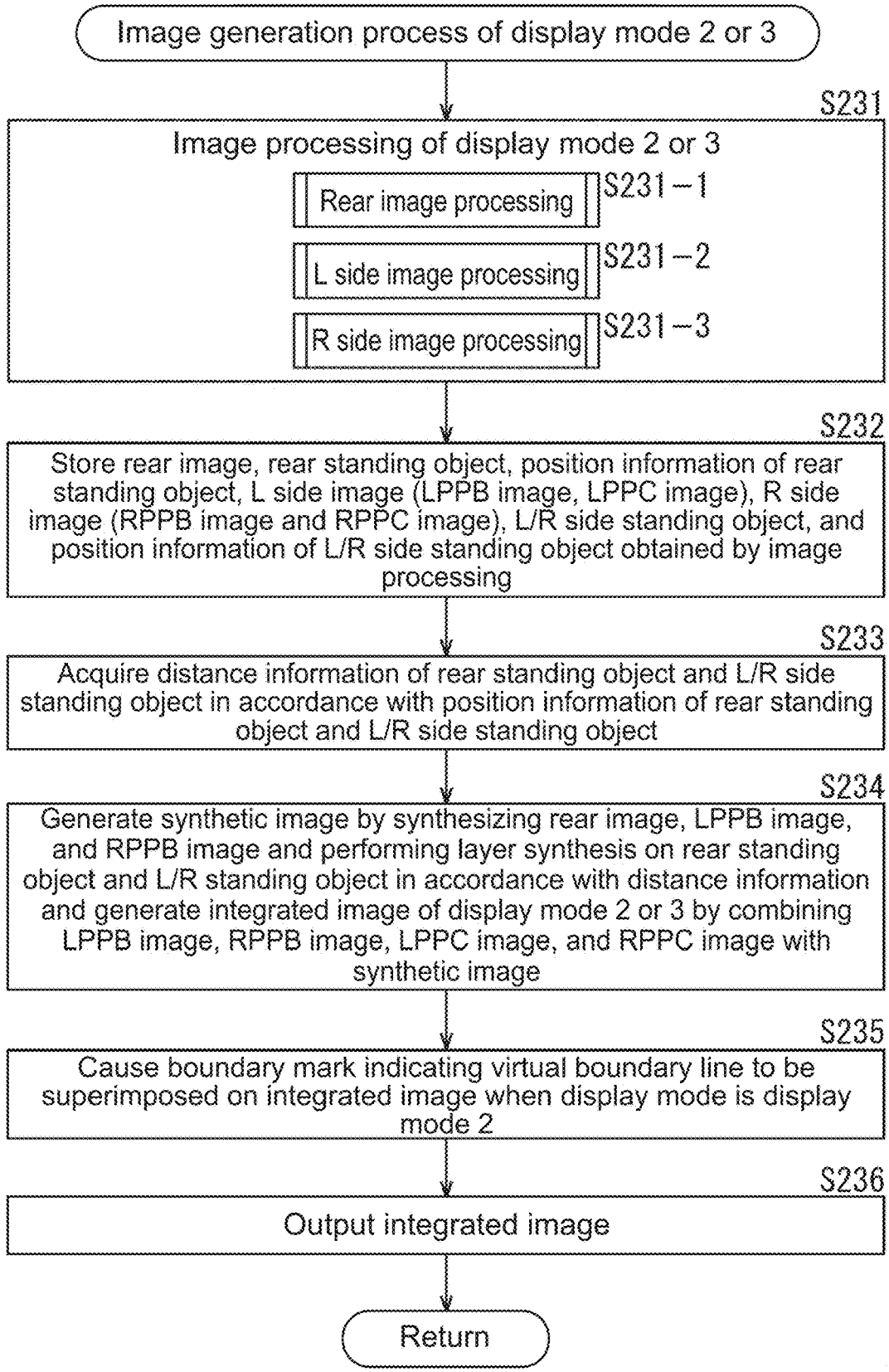
FIG. 43 is a flowchart for describing an example of an image generation process of display mode 2 or 3 performed in step S105.

FIG. 43 is a flowchart for describing an example of the image generation process of the display mode 2 or 3 performed in step S105 of FIG. 36.

In step S231, image processing of the display mode 2 or 3 is performed, and the process proceeds to step S232.

Here, in step S231-1, the rear image processing unit 211 performs the rear image processing similar to that of FIG. 38 as the image processing of the display mode 2 or 3. Further, in step S231-2, the L side image processing unit 212 performs the L side image processing, and in step S231-3, the R side image processing unit 213 performs the R side image processing.

In step S231-1, the rear image processing unit 211 obtains the rear image serving as the PPA image (FIG. 19), the rear standing object, and the position information of the rear standing object used for generating the synthetic image included in the integrated image (the integrated image of FIG. 25 or FIG. 22) of the display mode 2 or 3 by performing the rear image processing, and outputs the rear image, the rear standing object, and the position information of the rear standing object.

In step S231-2, the L side image processing unit 212 obtains the L side image, the L side standing object, and the position information of the L side standing object used for generating the integrated image of the display mode 2 or 3 by performing the L side image processing, and outputs the L side image, the L side standing object, and the position information of the L side standing object.

Here, the L side image used for generating the integrated image of the display mode 2 or 3 includes the LPPB image and the LPPC image described with reference to FIGS. 19 and 20 and the like. Further, the L side standing object used for generating the integrated image of the display mode 2 or 3 means the standing object shown in the LPPB image.

In step S231-3, the R side image processing unit 213 obtains the R side image, the R side standing object, and the position information of the R side standing object used for generating the integrated image of the display mode 2 or 3 by performing the R side image processing, and outputs the R side image, the R side standing object, and the position information of the R side standing object.

Here, the R side image used for generating the integrated image of the display mode 2 or 3 includes the RPPB image and the RPPC image described with reference to FIGS. 19 and 20 and the like. Further, the R side standing object used for generating the integrated image of the display mode 2 or 3 means the standing object shown in the RPPB image.

In step S232, the storage unit 216 stores the rear image serving as the PPA image, the rear standing object, and the position information of the rear standing object and the L/R side images (the LPPB image, the LPPC image, the RPPB image, and the RPPC image), the L/R side standing objects, and the position information of the L/R side images obtained by performing the image processing of the display mode 2 or 3 in previous step S231, and the process proceeds to step S233.

In step S233, the distance information acquiring unit 217 acquires the distance information of the rear standing object and the L/R side standing object being present at the positions indicated by the position information stored in the storage unit 216 from the distance information supplied from the distance detecting unit 162 (FIG. 27). Then, the distance information acquiring unit 217 supplies the position information of the rear standing object and the L/R side standing object to the positional relation determining unit 218 and the integrating unit 220, and the process proceeds from step 233 to step S234.

In step S234, the integrating unit 220 generates the integrated image of the display mode 2 or 3 (the integrated image of FIG. 25 or 22) using the rear image serving as the PPA image, the L/R side images (the LPPB image, the LPPC image, the RPPB image, and the RPPC image), the rear standing object, and the L/R side standing object stored in the storage unit 216.

In other words, the integrating unit 220 generates the synthetic image similarly to the image generation process (FIG. 37) of the display mode 5, 6, or 7.

Specifically, the integrating unit 220 generates the synthetic image by synthesizing the rear image serving as the PPA image stored in the storage unit 216 and the LPPB image and the RPPB image which have undergone the affine transform and performing the layer synthesis of synthesizing the synthetic image obtained accordingly and the rear standing object and the L/R side standing object stored in the storage unit 216 in accordance with the distance information of the rear standing object and the L/R side standing object from the distance information acquiring unit 217.

After the synthetic image is generated as described above, the integrating unit 220 generates the integrated image of the display mode 2 or 3 (the integrated image of FIG. 25 or 22) by combining the LPPB image and the RPPB image before the affine transform stored in the storage unit 216 such that they are adjacent to the synthetic image and further combining the LPPC image and the RPPC image stored in the storage unit 216 such that they are adjacent to the LPPB image and the RPPB image which are combined.

Further, the integrating unit 220 supplies the integrated image of the display mode 2 or 3 to the superimposition executing unit 221, and the process proceeds from step S234 to step S235.

In step S235, in a case in which the display mode is the display mode 2 out of the display mode 2 and 3 (FIGS. 24 and 25), the superimposition executing unit 221 causes boundary marks (FIGS. 24 and 25) to be superimposed on the integrated image from the integrating unit 220 as lines corresponding to the virtual boundary lines VL10, VL11, VL12, and VL13 surrounding the periphery of the vehicle 100, and the process proceeds from step S235 to step S236.

In step S236, the superimposition executing unit 221 outputs the superimposed image obtained by the superposition of the boundary mark as the CMS image, and the process returns.

Note that, in a case in which the display mode is the display mode 3, in step S236, the superimposition executing unit 221 outputs the integrated image as the CMS image without change without causing the boundary mark to be superimposed on the integrated image from the integrating unit 220 in step S235.

Figure 44:
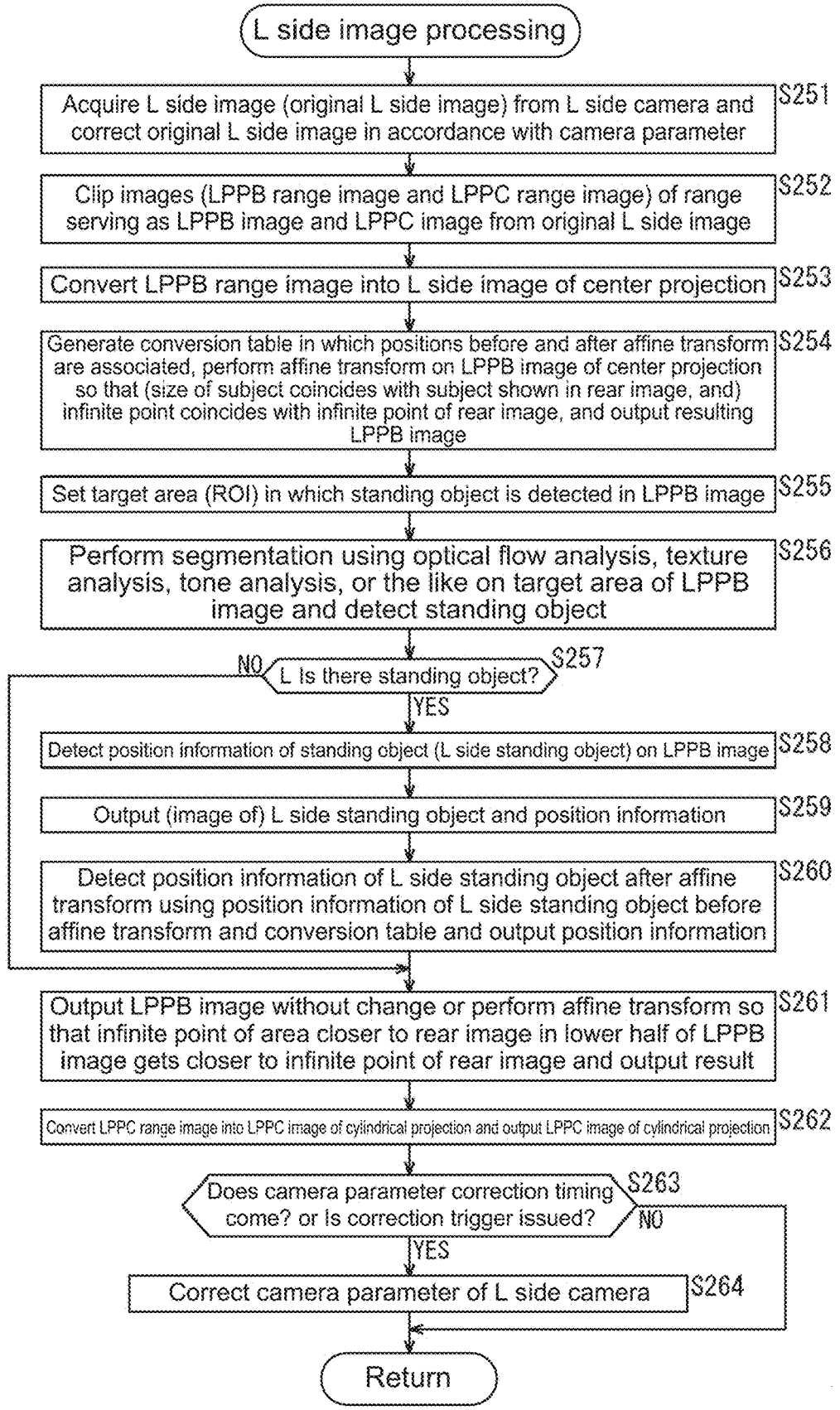
FIG. 44 is a flowchart for describing an example of L side image processing performed by an L side image processing unit 212 in step S231-2.

FIG. 44 is a flowchart illustrating an example of the L side image processing performed by the L side image processing unit 212 in step S231-2 of FIG. 43.

In step S251, the image clipping unit 261 of the L side image processing unit 212 (FIG. 31) acquires the original L side image supplied from the L side camera 112.

Then, the image clipping unit 261 corrects the original L side image in accordance with the camera parameter of the L side camera 112, and the process proceeds to step S252.

In step S252, the image clipping unit 261 clips an image of a range serving as the LPPB image and the LPPC image used for generating the integrated image of the display mode 2 or 3 from the original L side image as an LPPB range image and an LPPC range image, and supplies the image of the range to the projection scheme converting unit 262, and the process proceeds to step S253.

In step S253, the projection scheme converting unit 262 converts the LPPB range image from the image clipping unit 261 into the LPPB image of the center projection, and supplies the LPPB image of the center projection to the standing object detecting unit 263 and the affine transform unit 264, and the process proceeds to step S254.

In step S254, the affine transform unit 264 generates the conversion table in which positions of pixels of the LPPB image before the affine transform are associated with position of pixels of the LPPB image which has undergone the affine transform for the affine transform to be performed on the LPPB image from the projection scheme converting unit 262 so that the infinite point of the LPPB image from the projection scheme converting unit 262 coincides with the infinite point of the rear image.

Further, the affine transform unit 264 performs the affine transform on the LPPB image from the projection scheme converting unit 262 in accordance with the conversion table, and outputs the LPPB image which has undergone the affine transform to the storage unit 216 as (a sort of) the L side image.

Further, the affine transform unit 264 supplies the conversion table to the post-transform position detecting unit 265, and the process proceeds from step S254 to step S255.

Here, in step S254, the LPPB image which has undergone the affine transform output from the affine transform unit 264 to the storage unit 216 is used for generating the synthetic image in step S234 of FIG. 43.

In step S255, the standing object detecting unit 263 sets the ROI serving as the target area in which the standing object is detected in the LPPB image from the projection scheme converting unit 262, and the process proceeds to step S256.

In step S256, the standing object detecting unit 263 performs detection of the L side standing object (attempts detection of the L side standing object) shown in the target area of the LPPB image by performing the segmentation similar to step S134 of FIG. 38 on the target area of the LPPB image from the projection scheme converting unit 262, and the process proceeds to step S257.

In step S257, the standing object detecting unit 263 determines whether or not the L side standing object is shown in the LPPB image.

In other words, in step S257, the standing object detecting unit 263 determines whether or not the L side standing object is able to be detected from the LPPB image through the segmentation in previous step S256.

In a case in which it is determined in step S257 that the L side standing object is not able to be detected, the process skips steps S258 to S260 and then proceeds to step S261.

In this case, the standing object detecting unit 263 does not output (is unable to output) the L side standing object and the position information of the L side standing object (before the affine transform). Further, the post-transform position detecting unit 265 does not output the position information of the L side standing object (which has undergone the affine transform) similarly.

On the other hand, in a case in which it is determined in step S257 that the L side standing object is able to be detected, the process proceeds to step S258, and the standing object detecting unit 263 detects the position information indicating the position of the L side standing object on the LPPB image, and the process proceeds to step S259.

In step S259, the standing object detecting unit 263 outputs the L side standing object detected in step S256 and the position information of the L side standing object detected in step S258 to the storage unit 216 (FIG. 29), and the process proceeds to step S260.

In step S260, the post-transform position detecting unit 265 detects the position information of the L side standing object shown in the LPPB image which has undergone the affine transform (the L side standing object after the affine transform) from the position information of the L side standing object from the standing object detecting unit 264 (the position information of the standing object shown in the LPPB image before the affine transform) using the conversion table from the affine transform unit 264. Then, the post-transform position detecting unit 265 outputs the position information of the L side standing object after the affine transform to the storage unit 216, and the process proceeds to step S261.

In step S260, the position information of the L side standing object after the affine transform output from the post-transform position detecting unit 265 to the storage unit 216 is used when the layer synthesis of the L side standing object (before the affine transform) is performed in the generation of the synthetic image in step S234 of FIG. 43.

In step S261, the projection scheme converting unit 262 outputs the LPPB image (before the affine transform) to the storage unit 216 as the L side image without change.

Alternatively, in step S261, the projection scheme converting unit 262 causes the affine transform unit 264 to perform the stripe affine transform described above with reference to FIG. 23 (the affine transform in which the infinite point of the area closer to the PPA image in the lower half of the LPPB image gets closer to the infinite point of the PPA image), and causes affine transform unit 264 to output the LPPB image which has undergone the strip affine transform to the storage unit 216 as the L side image.

Here, in step S261, the LPPB image before the affine transform output from the projection scheme converting unit 262 to the storage unit 216 or the LPPB image which has undergone the stripe affine transform output from the affine transform unit 264 to the storage unit 216 is arranged (combined) at a position adjacent to the synthetic image in the generation of the display mode 2 or 3 integrated image in step S234 of FIG. 43 (the integrated image of FIG. 25 or 22).

After step S261, the process proceeds to step S262, and the projection scheme converting unit 262 converts the LPPC range image from the image clipping unit 261 into the LPPC image of the cylindrical projection, and outputs (a sort of) the L side image to the storage unit 216, and the process proceeds to step S263.

In step S262, the LPPC image of the cylindrical projection output from the projection scheme converting unit 262 to the storage unit 216 is arranged (combined) at a position adjacent to the LPPB image in the generation of the integrated image of the display mode 2 or 3 in step S234 of FIG. 43 (the integrated image of FIG. 25 or 22).

In steps S263 and S264, processes similar to steps S161 and S162 of FIG. 39 are performed, and the process returns.

Although the present technology has been described as being applied to the vehicle 100 which is an automobile (including a gasoline car, an electric car, a hybrid car, and the like), the present technology is also applicable to a certain type of mobile object such as, for example, a motorcycle, a bicycle, a personal mobility, an airplane, a drone, a ship, or a robot, a device for steering such a mobile object, and the like. Further, the stereo camera, the RADAR, the LIDAR, the TOF sensor, or the like can be used for detecting the distance and the standing object, but in a case in which the stereo camera is used, for example, a stereo camera can be installed such that optical axes of two cameras constituting the stereo camera are apart from each other in the vertical direction. In other words, in general, the stereo camera is arranged such that optical axes of two cameras constituting the stereo camera are apart from each other in the horizontal direction in accordance with an arrangement of human eyes. The stereo camera used in the present technology may be arranged such that the optical axes of the two cameras constituting the stereo camera are apart from each other in the horizontal direction or may be arranged such that the optical axes of the two cameras are apart from each other in the vertical direction.

<Description of Computer to which Present Technology is Applied>

Next, a series of processes described above can be performed by means of hardware or software. In a case in which a series of processes is performed by means of software, a program constituting the software is installed in a general-purpose computer or the like.

Figure 45:
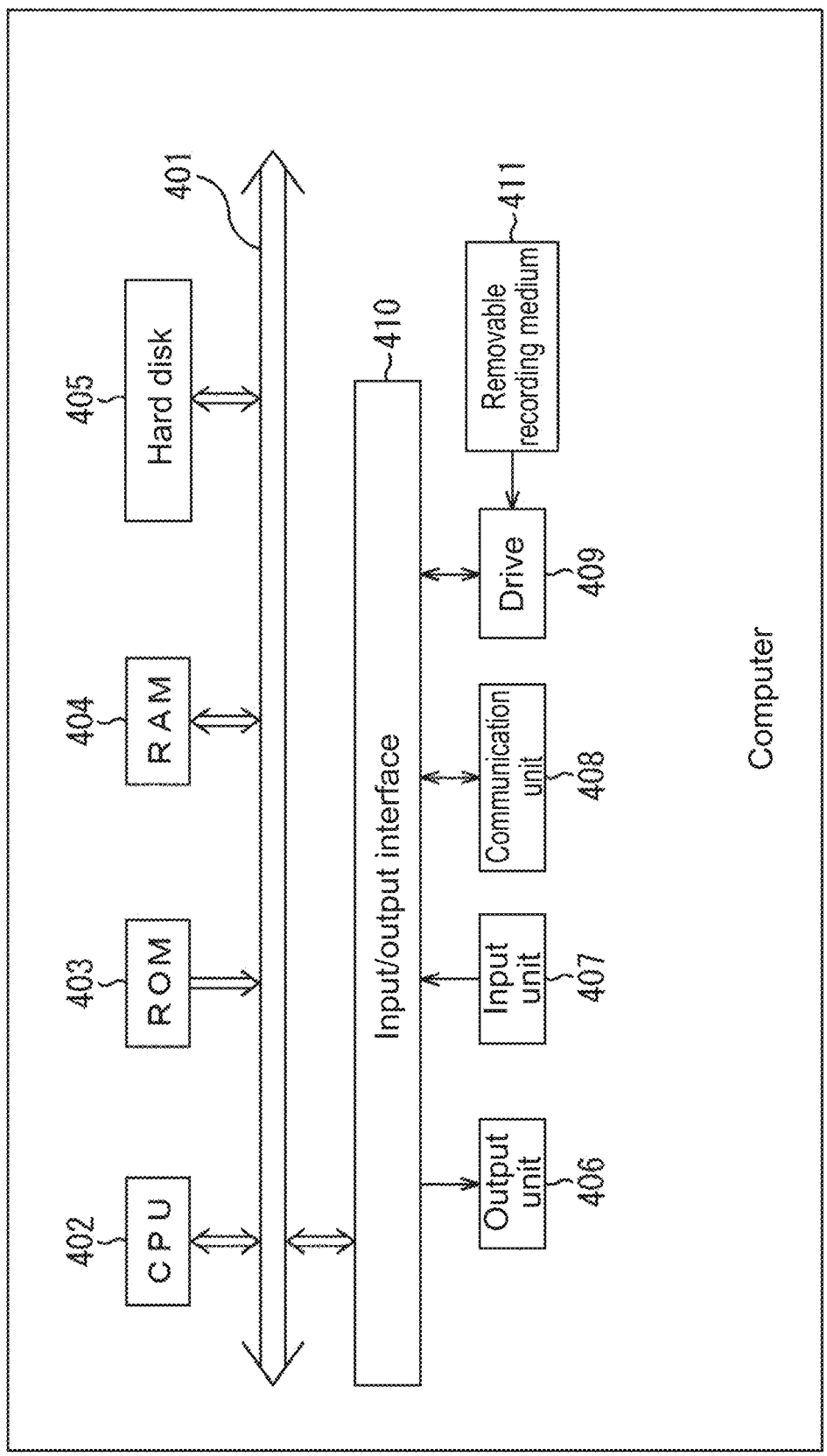
FIG. 45 is a block diagram illustrating a configuration example of an embodiment of a computer to which the present technology is applied.

FIG. 45 is a block diagram illustrating a configuration example of one embodiment of a computer in which a program for executing a series of processes described above is installed.

The program can be prerecorded in a hard disk 405 or a read only memory (ROM) 403 serving as a recording medium installed in the computer.

Alternatively, the program can be stored (recorded) in a removable recording medium 411. The removable recording medium 411 can be provided as so-called package software. Examples of the removable recording medium 411 include a flexible disk, a Compact Disc Read Only Memory (CD-ROM), a Magneto Optical (MO) disk, a Digital Versatile Disc (DVD), a magnetic disk, and a semiconductor memory.

Note that, although the program can be installed in the computer from the removable recording medium 411 as described above, the program can be downloaded to a computer via a communication network or a broadcast network and installed in the internal hard disk 405. In other words, the program can be wirelessly transferred from a download site to a computer via an artificial satellite for digital satellite broadcasting or can be transferred to a computer via a network such as a Local Area Network (LAN) or the Internet in a wired manner.

The computer includes an internal Central Processing Unit (CPU) 402, and an input/output interface 410 is connected to the CPU 402 via a bus 401.

The CPU 402 executes a program stored in the ROM 403 in accordance with a command input when the user manipulates an input unit 407 or the like through the input/output interface 410. Alternatively, the CPU 402 loads a program stored in the hard disk 405 onto a Random Access Memory (RAM) 404 and executes the program.

Accordingly, the CPU 402 performs the processes according to the above-described flowcharts or the processes performed by the configurations of the above-described block diagrams. Then, the CPU 402 causes an output unit 406 to output a processing result if necessary, for example, via the input/output interface 410, causes a communication unit 408 to transmit the processing result, or causes the processing result to be recorded in the hard disk 405.

Note that the input unit 407 includes a keyboard, a mouse, a microphone, or the like. Further, the output unit 406 includes a Liquid Crystal Display (LCD), a speaker, or the like.

Here, in this specification, the processes which the computer performs in accordance with the program need not be necessarily performed chronologically in accordance with the order described as the flowchart. In other words, the processes which the computer performs in accordance with the program include processes which are executed in parallel or individually as well (for example, a parallel process or an object-based process).

Further, the program may be processed by a single computer (processor) or may be shared and processed by a plurality of computers. Further, the program may be transferred to a computer at a remote site and executed.

Further, in this specification, a system means a set of a plurality of components (apparatuses, modules (parts), or the like), and it does not matter whether or not all the components are in a single housing. Therefore, a plurality of apparatuses which are accommodated in separate housings and connected via a network and a single apparatus in which a plurality of modules are accommodated in a single housing are both systems.

Note that the embodiment of the present technology is not limited to the above-described embodiment, and various modifications can be made without departing from the gist of the present technology.

For example, the present technology can take a configuration of cloud computing in which one function is shared and processed by a plurality of apparatuses via a network.

Further, the respective steps described in the flowchart described above can be executed by a single apparatus or can be shared and executed by a plurality of apparatuses.

Further, in a case in which a plurality of processes are included in one step, a plurality of processes included in one step can be executed by a single apparatus or shared and executed by a plurality of apparatuses.

Further, the effects described in this specification are merely examples and not limited, and other effects may be included.

Note that the present technology can have the following configurations.

<1>
An image generating device, comprising:
an integrating unit that integrates a first image and a second image and generates an integrated image; and
a superimposition executing unit that causes an alert mark to be superimposed on the integrated image and generates a superimposed image in a case in which an object shown in the second image is positioned on a farther side than an object shown in the first image.

<2>
The image generating device according to <1>, in which
the superimposition executing unit causes the alert mark to be superimposed on the integrated image in a case in which the object shown in the second image is positioned on the farther side than the object shown in the first image in the integrated image, and at least a part of the object shown in the second image is hidden by the object shown in the first image.

<3>
The image generating device according to <1> or <2>, in which
the alert mark is an image having a transparent part.

<4>
The image generating device according to <3>, in which
the alert mark is an image in which the transparent part is moved.

<5>
The image generating device according to <3> or <4>, in which
the alert mark is an image of a stripe pattern.

<6>
The image generating device according to any one of <1> to <5>, in which
the first image and the second image are images of different viewpoints, and
the integrating unit generates an image including a synthetic image obtained by synthesizing the first image and the second image which has undergone affine transform such that an infinite point of the second image coincides with an infinite point of the first image as the integrated image.

<7>
The image generating device according to <6>, in which
the first image and the second image are images of different viewpoints, and
the integrating unit generates an image in which the synthetic image and the second image before the affine transform are arranged as the integrated image.

<8>
The image generating device according to <7>, in which
the integrated image has a boundary line of a predetermined width between the synthetic image and the second image before the affine transform.

<9>
The image generating device according to any one of <1> to <5>, in which
the first image and the second image are images of different viewpoints,
the integrating unit generates an image including a synthetic image obtained by synthesizing the first image and the second image as the integrated image, and
the second image which has undergone affine transform in which a degree in which an infinite point of the second image coincides with an infinite point of the first image changes is synthesized with the synthetic image.

<10>
The image generating device according to <9>, in which
the first image and the second image are images obtained by imaging a rear view of a vehicle, and
the degree in which the infinite point of the second image after the affine transform coincides with the infinite point of the first image changes depending on a state of a user who steers the vehicle.

<11>
The image generating device according to any one of <1> to <5>, in which
the first image and the second image are images of different viewpoints,
the integrating unit generates an image including a synthetic image obtained by synthesizing the first image and the second image as the integrated image, and
the second image which has undergone the affine transform such that an infinite point of the second image coincides with an infinite point of the first image or the second image before the affine transform is synthesized with the synthetic image.

<12>
The image generating device according to <11>, in which
the first image and the second image are images obtained by imaging a rear view of a vehicle, and
the second image which has undergone the affine transform such that an infinite point of the second image coincides with an infinite point of the first image or the second image before the affine transform is synthesized with the synthetic image depending on a state of a user who steers the vehicle.

<13>
The image generating device according to any one of <1> to <12>, in which
the first image is an image obtained by imaging a rear view of a vehicle from a position of a rear part of the vehicle,
the second image is an image obtained by imaging the rear view of the vehicle from a position shifted from the position of the rear part in a traverse direction, and
the superimposition executing unit causes the alert mark to be superimposed on the integrated image in a case in which a standing object which is shown in the second image and stands on a road on which the vehicle travels is on a farther side than a standing object which is shown in the first image and stands on the road.

<14>
The image generating device according to <13>, in which
the integrating unit generates the integrated image by
synthesizing the first image and the second image which has undergone affine transform such that an infinite point of the second image coincides with an infinite point of the first image, and
synthesizing the standing object extracted from the first image and the standing object extracted from the second image with a synthetic image obtained by synthesizing the first image and the second image in accordance with a distance from the vehicle to the standing object.

<15>
The image generating device according to <14>, in which
the integrating unit synthesizes the standing object extracted from the second image before the affine transform at a position corresponding to a position of the standing object shown in the second image after the affine transform in the synthetic image obtained by synthesizing the first image and the second image.

<16>

The image generating device according to any one of <13> to <15>, in which
the integrating unit generates, as the integrated image,
an image obtained by integrating the first image and the second image,
an image obtained by integrating an image obtained by imaging a right rear view of the vehicle from a left rear position of the vehicle and an image obtained by imaging a left rear view of the vehicle from a right rear position of the vehicle, or
an image obtained by integrating the first image and an image of cylindrical projection obtained by imaging the vehicle in a traverse direction,
in accordance with a display mode set in accordance with at least one of a state of the vehicle, a state of a user who steers the vehicle, or manipulation information related to manipulation on the vehicle.

<17>

The image generating device according to <16>, in which
the integrating unit generates an image obtained by arranging the image obtained by imaging the right rear view of the vehicle from the left rear position of the vehicle in a right area and arranging the image obtained by imaging the left rear view of the vehicle from the right rear position of the vehicle in a left area as the integrated image, and
a boundary between the left area and the right area is moved left or right in accordance with the state of the user.

<18>

The image generating device according to <16>, in which
the superimposition executing unit causes virtual boundary lines surrounding a periphery of the vehicle to be superimposed on the image of the cylindrical projection of the integrated image.

<19>

An image generating method, comprising:
integrating a first image and a second image and generates an integrated image; and
causing an alert mark to be superimposed on the integrated image and generating a superimposed image in a case in which an object shown in the second image is positioned on a farther side than an object shown in the first image.

<20>

A program causing a computer to function as:
an integrating unit that integrates a first image and a second image and generates an integrated image; and
a superimposition executing unit that causes an alert mark to be superimposed on the integrated image and generates a superimposed image in a case in which an object shown in the second image is positioned on a farther side than an object shown in the first image.

REFERENCE SIGNS LIST 10 vehicle
11 rear camera
12 L side camera
13 R side camera
14 L rear side camera
15 R rear side camera
22 L side camera
23 R side camera
100 vehicle
111 rear camera
112 L side camera
113 R side camera
114 L rear side camera
115 R rear side camera
150 CMS
151 manipulating unit
152 sensor unit
161 imaging unit
162 distance detecting unit
163 vehicle state detecting unit
164 driver state detecting unit
165 CMS image generating unit
166 display unit
201 display mode setting unit
211 rear image processing unit
212 L side image processing unit
213 R side image processing unit
214 L rear side image processing unit
215 R rear side image processing unit
216 storage unit
217 distance information acquiring unit
218 positional relation determining unit
219 collision risk determining unit
220 integrating unit
221 superimposition executing unit
251 image clipping unit
252 standing object detecting unit
261 image clipping unit
262 projection scheme converting unit
263 standing object detecting unit
264 affine transform unit
265 post-transform position detecting unit
271 image clipping unit
272 projection scheme converting unit
273 standing object detecting unit
274 affine transform unit
275 post-transform position detecting unit
281, 291 image clipping unit
401 bus
402 CPU
403 ROM
404 RAM
405 hard disk
406 output unit
407 input unit
408 communication unit
409 drive
410 input/output interface
411 removable recording medium

The invention claimed is:

1. An image generating device, comprising a computer processor coupled to memory storing program code for at least:
an integrating process that integrates a first image and a second image and generates an integrated image, which is a single image that combines the first image and the second image via an affine transformation to cause a same portion appearing in the first and second images to coincide with each other in the integrated image, the first image being an image obtained by imaging a rear view of a vehicle from a position of a rear part of the vehicle, and the second image being an image obtained by imaging the rear view of the vehicle from a position shifted from the position of the rear part in a traverse direction, wherein the integrating process includes:

an extraction process that extracts from the second image an image feature appearing in the second image, a transformation process that performs the affine transformation on the second image to produce a transformed second image, and a synthesis process that produces a synthesized second image in which the transformed second image is overwritten with the image feature extracted from the second image before the affine transformation is performed, such that in the synthesized second image the image feature appears without having undergone affine transformation; and a superimposition executing process that causes an alert mark to be superimposed on the integrated image and generates a superimposed image in a case in which an object appearing in the second image is positioned on a farther side than an object appearing in the first image.

2. The image generating device according to claim 1, wherein the superimposition executing process causes the alert mark to be superimposed on the integrated image in a case in which the object appearing in the second image is positioned on the farther side than the object appearing in the first image in the integrated image, and at least a part of the object shown in the second image is hidden by the object appearing in the first image.

3. The image generating device according to claim 1, wherein the alert mark is an image having a transparent part.

4. The image generating device according to claim 3, wherein the alert mark is an image in which the transparent part is moved.

5. The image generating device according to claim 3, wherein the alert mark is an image of a stripe pattern.

6. The image generating device according to claim 1, wherein the first image and the second image are images of different viewpoints, and the integrating process generates, as the integrated image, an image including a synthetic image obtained by synthesizing the first image and the second image which has undergone the affine transformation, such that an infinite point of the second image coincides with an infinite point of the first image.

7. The image generating device according to claim 6, wherein the first image and the second image are images of different viewpoints, and the integrating process generates, as the integrated image, an image in which are arranged the synthetic image and the second image before the affine transformation.

8. The image generating device according to claim 7, wherein the integrated image has a boundary line of a predetermined width between the synthetic image and the second image before the affine transformation.

9. The image generating device according to claim 1, wherein the first image and the second image are images of different viewpoints, the integrating process generates, as the integrated image, an image including a synthetic image obtained by synthesizing the first image and the second image, and the second image, which has undergone the affine transformation in which a degree in which an infinite point of the second image coincides with an infinite point of the first image changes, is synthesized with the synthetic image.

10. The image generating device according to claim 9, wherein the degree in which the infinite point of the second image after the affine transformation coincides with the infinite point of the first image changes depending on a state of a user who steers the vehicle.

11. The image generating device according to claim 1, wherein the first image and the second image are images of different viewpoints, the integrating process generates, as the integrated image, an image including a synthetic image obtained by synthesizing the first image and the second image, and the second image, which has undergone the affine transformation such that an infinite point of the second image coincides with an infinite point of the first image or the second image before the affine transformation, is synthesized with the synthetic image.

12. The image generating device according to claim 11, wherein the second image, which has undergone the affine transformation such that an infinite point of the second image coincides with an infinite point of the first image or the second image before the affine transformation, is synthesized with the synthetic image depending on a state of a user who steers the vehicle.

13. The image generating device according to claim 1, wherein the superimposition executing process causes the alert mark to be superimposed on the integrated image in a case in which a standing object that appears in the second image and stands on a road on which the vehicle travels is on a farther side than a standing object that appears in the first image and stands on the road.

14. The image generating device according to claim 13, wherein the integrating process generates the integrated image by synthesizing the first image and the second image, which has undergone the affine transformation, such that an infinite point of the second image coincides with an infinite point of the first image, and synthesizing the standing object extracted from the first image and the standing object extracted from the second image with a synthetic image obtained by synthesizing the first image and the second image in accordance with a distance from the vehicle to one of: the standing object that appears in the first image and the standing object that appears in the second image.

15. The image generating device according to claim 13, wherein the integrating process generates, as the integrated image, an image obtained by integrating the first image and the second image, or an image obtained by integrating an image obtained by imaging a right rear view of the vehicle from a left rear position of the vehicle and an image obtained by imaging a left rear view of the vehicle from a right rear position of the vehicle, or an image obtained by integrating the first image and an image of cylindrical projection obtained by imaging the vehicle in a traverse direction, in accordance with a display mode set in accordance with at least one of: a state of the vehicle, a state of a user who steers the vehicle, and manipulation information related to a manipulation performed on the vehicle.

16. The image generating device according to claim 15, wherein the integrating process generates an image obtained by arranging the image obtained by imaging the right rear view of the vehicle from the left rear position of the vehicle in a right area and arranging the image obtained by imaging the left rear view of the vehicle from the right rear position of the vehicle in a left area as the integrated image, and a boundary between the left area and the right area is moved left or right in accordance with the state of the user.

17. The image generating device according to claim 15, wherein the superimposition executing process causes virtual boundary lines surrounding a periphery of the vehicle to be superimposed on the image of the cylindrical projection.

18. An image generating method, comprising:
   integrating a first image and a second image and generating an integrated image, which is a single image that combines the first image and the second image via an affine transformation to cause a same portion appearing in the first and second images to coincide with each other in the integrated image, the first image being an image obtained by imaging a rear view of a vehicle from a position of a rear part of the vehicle, and the second image being an image obtained by imaging the rear view of the vehicle from a position shifted from the position of the rear part in a traverse direction, wherein the integrating includes:
      extracting from the second image an image feature appearing in the second image,
      performing the affine transformation on the second image to produce a transformed second image, and
      overwriting a portion of the transformed second image with the image feature extracted from the second image before the affine transformation is performed; and
   causing an alert mark to be superimposed on the integrated image and generating a superimposed image in a case in which an object appearing in the second image is positioned on a farther side than an object appearing in the first image.

19. A computer-readable storage medium storing a program comprising code that, when executed, causes a computer to perform an image generating method, wherein the method comprises:
   integrating a first image and a second image and generating an integrated image, which is a single image that combines the first image and the second image via an affine transformation to cause a same portion appearing in the first and second images to coincide with each other in the integrated image, the first image being an image obtained by imaging a rear view of a vehicle from a position of a rear part of the vehicle, and the second image being an image obtained by imaging the rear view of the vehicle from a position shifted from the position of the rear part in a traverse direction, wherein the integrating includes:
      extracting from the second image an image feature appearing in the second image,
      performing the affine transformation on the second image to produce a transformed second image, and
      overwriting a portion of the transformed second image with the image feature extracted from the second image before the affine transformation is performed; and
   causing an alert mark to be superimposed on the integrated image and generating a superimposed image in a case in which an object appearing in the second image is positioned on a farther side than an object appearing in the first image.

\* \* \* \* \*